United States Patent
Hornback et al.

(10) Patent No.: US 8,253,867 B2
(45) Date of Patent: Aug. 28, 2012

(54) REMOTE CONTROL AND METHOD OF USING SAME FOR CONTROLLING ENTERTAINMENT EQUIPMENT

(75) Inventors: Donald L. Hornback, Indianapolis, IN (US); Joseph Craig Engle, Carmel, IN (US); Harold Metcalfe, Franklin, IN (US); John Roberts, Chicago, IL (US); Matthew Dickinson, Chicago, IL (US)

(73) Assignee: Audiovox Corporation, Hauppauge, NY (US)

( * ) Notice: Subject to any disclaimer, the term of this patent is extended or adjusted under 35 U.S.C. 154(b) by 906 days.

(21) Appl. No.: 12/313,129

(22) Filed: Nov. 17, 2008

(65) Prior Publication Data

US 2009/0237573 A1 Sep. 24, 2009

Related U.S. Application Data

(60) Provisional application No. 61/003,545, filed on Nov. 16, 2007.

(51) Int. Cl.
*H04N 5/44* (2011.01)
(52) U.S. Cl. .................................. 348/734; 348/552
(58) Field of Classification Search .................. 348/734, 348/569, 552, 553–555, 460–461, 465, 468, 348/725; *H04N 5/44*
See application file for complete search history.

(56) References Cited

U.S. PATENT DOCUMENTS

| | | | |
|---|---|---|---|
| 5,481,296 A | 1/1996 | Cragun et al. | 348/13 |
| 6,160,491 A * | 12/2000 | Kitao et al. | 340/12.28 |
| 6,597,374 B1 | 7/2003 | Baker et al. | 345/717 |
| 7,135,985 B2 * | 11/2006 | Woolgar et al. | 340/4.3 |
| 7,973,648 B2 * | 7/2011 | Kawakita | 340/13.24 |

OTHER PUBLICATIONS

Patent Cooperation Treaty (PCT) Notification of Transmittal of the International Search Report and the Written Opinion of the International Searching Authority, or the Declaration.
Patent Cooperation Treaty (PCT) International Search Report; and.
Patent Cooperation Treaty (PCT) Written Opinion of the International Searching Authority.

* cited by examiner

*Primary Examiner* — Trang U Tran
(74) *Attorney, Agent, or Firm* — Gerald T. Bodner

(57) ABSTRACT

A universal smart remote control includes intelligence software and algorithms that have been programmed into the remote control's microprocessor memory, and a large display which is used to prompt the user to take certain actions. The remote control provides guidance to the user in setting up and operating the various components of his or her entertainment system, and asks the user non-technical questions that are understandable to the user.

8 Claims, 41 Drawing Sheets

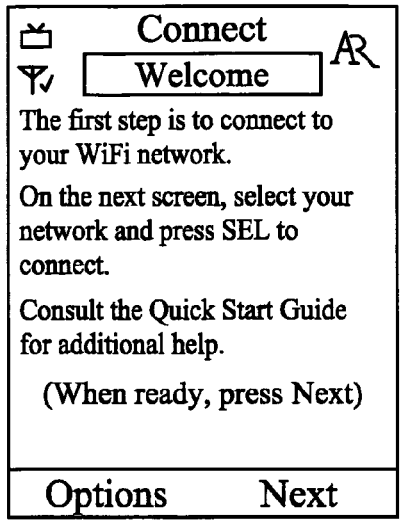
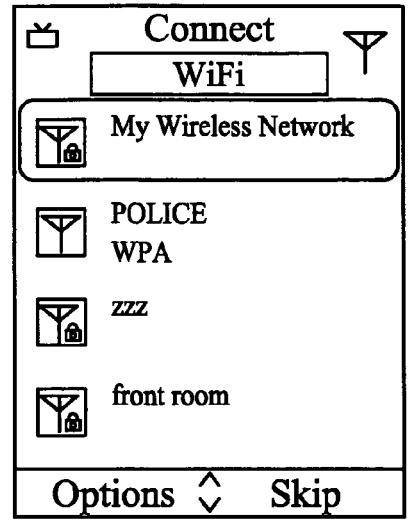
FIGURE 3          FIGURE 4
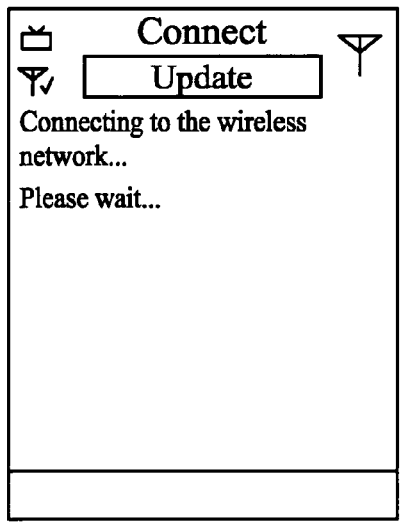
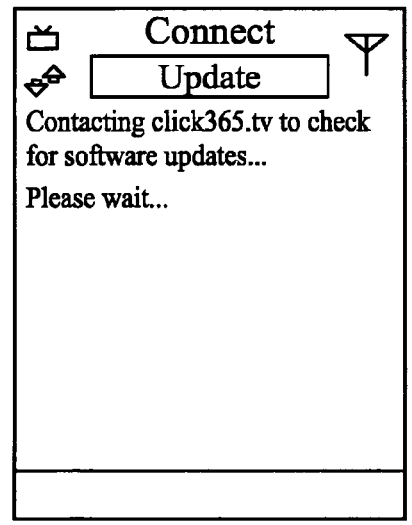
FIGURE 5          FIGURE 6
  
FIGURE 5(a)   FIGURE 5(b)   FIGURE 5(c)

FIGURE 7

Connect
Location
Country: United States
Time Zone: Eastern Time
Zip Code: 46208
Options   Next

FIGURE 8

Add Provider
US, 46208
- DISH Indianapolis — Indianapolis
- DIRECTV Indianapolis — Indianapolis
- Broadcast — 462xx
- Bright House Networks — Indianapolis
Select   Skip

FIGURE 9

Connect
Please wait...

FIGURE 10

New Device
Device Type
- TV
- Cable
- Satellite
- DVD
- DVR
Options   Cancel

FLOWCHART FOR GUIDED PLAYBACK of WATCH TV-NO AUDIO/RECEIVER (Watch Case 1)

| TV xx Input Switching1 |
|---|
| Please show me how you switch inputs on TV xx -Using the keypad, switch TV xx input by one position.<br>-Press Next when done<br><br>Next- goto TV xx Input Switching2<br>Quit- goto SETUP-ACTIVITIES |

FIGURE 30

| TV xx Input Switching2 |
|---|
| Detect command sequence:<br>(e.g.) Input, xxxx, xxxx....<br>Is this correct?<br><br>Y- goto TV xx Input1<br>N- goto TV Input Switching1 |

FIGURE 31

| TV xx Power |
|---|
| -If TV xx is off, press SEL to turn it ON.<br>-Press Next when TV xx is powered on.<br><br>Next- goto XX xx Power (turn on next device)<br>Quit- goto SETUP-ACTVITIES<br>(note: "Watch STB xx" is in the Activities list) |

FIGURE 47

| Audio xx Power |
|---|
| -If Audio xx is off, press SEL to turn it ON.<br>-Press Next when Audio xx is powered on.<br><br>Next- goto TV xx Input Switching1<br>Quit- goto SETUP-ACTVITIES<br>(note: "Watch STB xx" is in the Activities list) |

FIGURE 48

| TV xx Input Switching1 |
|---|
| Please show me how you switch inputs on TV xx<br><br>-Using the keypad, switch TV xx input<br>by one position.<br>-Press Next when done.<br><br>Next- goto TV xx Input Switching2<br>Quit- goto SETUP-ACTIVITIES |

FIGURE 49

(flashes this screen:)

```
          Determining Input Switching
Press SELECT to test "Input, Right Arrow, Clear"

Did the TV/Monitor video switch?

Yes- exit, use the above IR commands
to switch inputs

No- goto next screen
```

FIGURE 67

```
          Determining Input Switching
Press SELECT to test "Input, Down Arrow, Clear"

Did the TV/Monitor video switch?

Yes- exit, use the above IR commands
to switch inputs

No- goto next screen
```

FIGURE 68

```
          Determining Input Switching
You have tested the included TV/Monitor input
key sequences Press RETRY to try again, Press NEXT to proceed
to customizing the required input key sequence
for your TV/Monitor of one of the above
sequences did not work Next- goto customization screen.

Retry- goto the first "Determining
Input Switching" screen
```

FIGURE 69

REMOTE CONTROL AND METHOD OF USING SAME FOR CONTROLLING ENTERTAINMENT EQUIPMENT

CROSS-REFERENCE TO RELATED APPLICATION

This application is related to U.S. Provisional Application Ser. No. 61/003,545, filed on Nov. 16, 2007, and entitled "Non-Technical Guided Activities and One Touch/Guided Activities on a Remote Control", the disclosure of which is incorporated herein by reference. This application claims the benefit of priority under 35 U.S.C. 119 and/or 35 U.S.C. 120 to the aforementioned related provisional application.

COPYRIGHT NOTICE

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise reserves all copyright rights whatsoever.

BACKGROUND OF THE INVENTION

1. Field of the Invention

The present invention relates to remote controls to control entertainment equipment including, but not limited to, televisions, digital video devices, video cassette recorders, set top boxes, monitors, audio receiver/amplifiers and the like. More specifically, the present invention relates to universal remote controls and their operation.

2. Description of the Prior Art

Entertainment systems are becoming increasingly complex and hence frequently more difficult to control and use. Very often, each piece of equipment requires the use of a separate remote control. There are universal remote controls that have the capability of controlling one or more components of an entertainment system. However, setting up such a remote control to operate with multiple entertainment components, such as a television, digital video device, video cassette recorder, set top box, monitor, audio receiver/amplifier and the like, can be both time consuming and confusing to the user. The programming of conventional remote controls requires the answering of technical questions, which often must be answered by technicians at the manufacturer of the remote control. Furthermore, some prior art remote controls require an internet connection and web server to receive answers to questions, as well as a personal computer, a personal computer keyboard, and a universal serial bus connection to the personal computer. It is desirable to be able to make the operation and programming of a remote control as easy as possible for the user who oftentimes is not technically inclined.

OBJECTS AND SUMMARY OF THE INVENTION

It is an object of the present invention to provide a remote control for entertainment equipment in which the setup of the entertainment equipment is completely accomplished with the remote control, requiring no internet connection, website access, personal computer, personal computer keyboard, or a universal serial bus connection to a personal computer.

It is another object of the present invention to provide a remote control which is very user friendly and which provides the user with non-technical questions to guide the user in the setup and control of his or her entertainment system.

It is a further object of the present invention to provide a remote control which is simple to operate in that it requires fewer programming steps than conventional remote controls.

It is still a further object of the present invention to provide a remote control which, once programmed to know the components of the user's entertainment system, can provide guidance information to the user for setting up his or her entertainment system and can provide at "one touch" capability which allows the user to operate the components of the entertainment system with minimal effort.

It is yet another object of the present invention to provide a remote control for controlling an entertainment system which includes intelligence software, programs and algorithms and microprocessor power which simplify the process for setting up and controlling an entertainment system having one or several components.

A remote control formed in accordance with the present invention has the ability to control most if not all of the components of an entertainment system. The remote control includes intelligence software and algorithms that have been programmed into the remote control's microprocessor memory. The remote control includes a relatively large display, which is used to prompt the user to take certain actions, to provide guidance to the user in setting up and operating the various components of his or her entertainment system, and to ask the user questions in a non-technical manner so that they are understandable to the user, for example: "Is the television on?"

The remote control includes a keyboard having key switches which the user may press on the remote control to answer questions the user views on the remote control's display.

The remote control's software and algorithms preferably rely on the user's ability to see the desired video content on, for example, a television screen from, for example, a broadcast television antenna or cable, a digital video device, a set top box, and the like, connected to the television. Also, the remote control's software and algorithms preferably rely on the user's ability to hear the desired audio from the television or an audio amplifier or receiver in the remote control's process of setting up the entertainment system for use by the user.

When the user presses certain keys on the remote control, the remote control will send infrared (IR) or radio frequency (RF) commands to the various components of the entertainment system, such as the television, audio receiver or amplifier, and the like. The remote control intelligently controls these components using IR or RF command signals The remote control of the present invention and the method of using the remote control to control the various components of a user's entertainment system does not use the television to display any questions from the remote control. All questions are posed to the user by displaying the same on the remote control's display. Furthermore, neither the audio receiver or amplifier, nor the television, of a user's entertainment system is used to reproduce any audio signal sent by the remote control to these components.

There are two principal modes of operation that the remote control uses, with user interaction, to set up and operate the various components of the user's entertainment system. These two main principals of operation make the control of the entertainment system easier for the user.

One principal mode of operation of the remote control is referred to herein as "guided only". The "guided only" mode of operation is a process where the remote control prompts the user through various steps needed to achieve the user's goal of watching video or listening to audio using the various components of his or her entertainment system. For example, if the user wishes to watch a digital video disk (DVD), but had no idea what television input to select (for example, Antenna (Tuner), VID1, VID2, VID3, or the like, the "guided only" mode would guide the user through a process, prompting the user with questions and where the user enters his observations into the remote control in response to the questions, where in the end, the DVD will play on the user's television for viewing by the user.

The other principal mode in which the remote control sets up and operates the entertainment system is referred to herein as the "guided/one-touch" mode. The "guided/one-touch" mode ultimately, after the entertainment system is set up using guided instructions and prompts from the remote control to the user, allows the user to press one push button switch (i.e., key) on the remote control to achieve the user's intended purpose, for example, watching a DVD. In the "guided/one-touch" mode, the remote control initially prompts the user through each step required to watch or listen to a desired activity, and records in memory the particular configuration of the user's entertainment system and the components forming parts thereof, and the particular input set up procedures to achieve the user's desired goal, and then automatically requires the user to press only a single push button switch on the remote control (hence, "one-touch"), upon subsequent requests by the user to achieve a desired visual or audio activity.

These two principal modes of operation of the remote control of the present invention, that is, the "guided only" mode and the "guided/one-touch" mode, are user selectable and carried out by the software and algorithms programmed into the remote control's electronic circuitry.

The remote control of the present invention, and the method of using the remote control to set up and operate the components of an entertainment system, especially the "guided only" and "guided/one-touch" modes of the remote control, overcome many disadvantages of conventional remote controls. With the remote control of the present invention, the user never has to go behind the equipment to determine the manufacturer's model number or understand the audio and video cabling configurations of his system and the interconnection of the components thereof. There is no need for the user to check the cable types (that is, composite, component, HDMI, and the like). With the remote control of the present invention, the user is not required to have any technical knowledge. Furthermore, no computer is needed, no universal serial bus (USB) cable or interface is needed, and no external website is needed. All that is required with the remote control of the present invention is the remote control, the user and the entertainment system.

In accordance with one form of the present invention, a universal smart remote control for controlling at least one component of an entertainment system is provided. The at least one component includes electronic circuitry and at least a first signal input and a second signal input selectively coupled to the electronic circuitry. The at least first signal input and the second signal input are switchable to selectively provide a signal thereon to the electronic circuitry of the at least one component. The remote control preferable has a display for displaying messages for viewing by the user, a microprocessor operatively coupled to the display, a memory operatively coupled to the microprocessor and having stored therein operational command codes associated with the at least one component for operating the at least one component, a plurality of push button switches operatively coupled to the microprocessor and a transmitter operatively coupled to the microprocessor for transmitting command signals corresponding to the command codes stored in the memory to the at least one component of the entertainment system.

An operational method of a remote control for controlling the at least one component of an entertainment system of a user includes the steps of displaying on the display a list of activities from which the user may select a desired activity by pressing a first push button switch of the plurality of push button switches, and detecting by the microprocessor the pressing of the first push button switch by the user, the pressed first push button switch indicating the desired activity selected by the user from the displayed list of activities. The operational method further includes the steps of retrieving by the microprocessor from the memory the operation command codes associated with the at least one component for operating the at least one component and displaying on the display a message to the user to press a second push button switch of the plurality of push button switches to energize the at least one component if the at least one component is not energized.

Furthermore, the operational method of the remote control includes the additional steps of detecting by the microprocessor the pressing of the second push button switch by the user and transmitting by the transmitter a command signal corresponding to one of the operational command codes retrieved from the memory to the at least one component to energize the at least one component in response to the detection of the pressing of the second push button switch by the user to energize the at least one component. Also, the operational method includes the steps of displaying on the display a message to the user to press a third push button switch of the plurality of push button switches if the user determines that the at least one component is energized and detecting by the microprocessor the pressing of the third push button switch by the user.

The remote control operational method, in one form, further includes the steps of displaying on the display a message to the user to press a fourth push button switch of the plurality of push button switches if the desired activity has been achieved or to press a fifth push bottom switch of the plurality of push button switches if the desired activity has not been achieved, detecting by the microprocessor the pressing of one of the fourth push button switch and the fifth push button switch by the user, and transmitting by the transmitter a command signal corresponding to one of the operational command codes retrieved from the memory to the least one component to switch between the at least first signal input and the second signal input in response to the detection of the pressing of the fifth push button switch by the user.

In another form of the present invention, an operational method of a remote control for controlling one or more components of an entertainment system of a user, where the remote control has a display and a plurality of push button switches, includes the steps of displaying on the display messages to the user to achieve a desired activity of the entertainment system using the one or more of the components thereof, the desired activity involving at least one of viewing video and hearing audio on the one or more of the components of the entertainment system, the user observing at least one of whether the user is able to view video and whether the user is able to hear audio on the one or more of the components of the entertainment system, the user pressing one or more push button switches in response to at least one of whether the user is able to view video and whether the user is able to hear audio, detecting the pressing of one or more push button switches of the plurality of push button switches in response to the user observing at least one of whether the user is able to view video and whether the user is able to hear audio on one or more of the components of the entertainment system, and transmitting command signals to the one or more of the components of the entertainment system in response to the detection of the pressing of the one or more push button switches.

In an even more preferred embodiment, the remote control controls at least one of the components of the entertainment system that includes electronic circuitry and signal inputs which may be selectively operatively coupled to the electronic circuitry to provide a video or audio signal to the electronic circuitry for the user to view video or hear audio on his entertainment system, the signal inputs being switchable in an endless loop by the remote control transmitting command signals to the at least one component to selectively operatively couple a selected signal input to the electronic circuitry. In this regard, the operational method of the remote control further includes the step of determining the number of signal inputs on the at least one component by counting the number of times it requires to switch signal inputs on the at least one component from a first time that the user is able to view video or hear audio on the user's entertainment system for a selected input to a second time that the user is able to view the same video or hear the same audio on the user's entertainment system for a selected input.

More preferably, the video viewed by the user or audio heard by the user on the entertainment system corresponds to a video or audio signal provided on a particular selectable signal input when the particular selectable signal input is operatively coupled to the electronic circuitry of the at least one component. The operational method further preferably includes the steps of detecting the pressing by the user of one or more push button switches on the remote control in response to the user desiring to view the video or hear the audio on the entertainment system associated with the video or audio signal provided on the particular signal input, and transmitting command signals to the at least one component to switch inputs from a selectable signal input currently operatively coupled to the electronic circuitry of the at least one component to the particular signal input based on the number of signal inputs on the at least one component determined by the remote control so that the user may view the video or hear the audio on the entertainment system that corresponds to the video or audio signal provided on the particular signal input.

In an even more preferred embodiment, the remote control includes a signal input counter for counting the number of signal inputs on the at least one component of the entertainment system, and the operational method of the remote control more specifically, in the step of determining the number of signal inputs on the at least one component, includes the substeps of a) transmitting a command signal to the at least one component to cause the at least one component to switch inputs so that a selected input is operatively coupled to the electronic circuitry of the at least one component, b) displaying on the display a message to the user to observe at least one of whether the user is able to view video and whether the user is able to hear audio on the user's entertainment system and to press one or more of the push button switches in response to at least one of whether the user is able to view video and whether the user is able to hear audio on the user's entertainment system, c) detecting the pressing of the one or more push button switches in response to the user observing at least one of whether the user is able to view video and whether the user is able to hear audio on the user's entertainment system for a selected input operatively coupled to the electronic circuitry of the at least one component, d) determining from the detection of the pressing of the one or more push button switches in substep c) for a selected input operatively coupled to the electronic circuitry of the at least one component that the user can view video or hear audio on the user's entertainment system, e) setting the signal input counter to a reference count number if from substep d) it is determined for a first time that the user can view video or hear audio on the user's entertainment system for a selected input operatively coupled to the electronic circuitry of the at least one component, and f) repeating substeps a)-d) and incrementing the signal input counter by one to a current count number each time the signal inputs are switched on the at least one component to select a signal input to be operatively coupled to the electronic circuitry of the at least one component until the user is able to view the same video or hear the same audio on the user's entertainment system for a second time, the difference between the current count number and the reference count number being equal to the number of signal inputs on the at least one component of the user's entertainment system.

An even more preferred form of the remote control operational method of the present invention includes the further steps of associating the reference count number from the signal input counter with a selectable signal input on the at least one component which allows the user to view video or hear audio on the user's entertainment system from a video or audio signal provided on the signal input associated with the reference count number, associating an intermediate count number relative to the reference count number with each selectable signal input on the at least one component which is different from the selectable signal input that is associated with the reference count number and that allows the user to view video or hear audio on the user's entertainment system, detecting the pressing by the user of one or more push button switches on the remote control in response to the user desiring to view the video or hear the audio on the user's entertainment system associated with the video or audio signal provided on the signal input associated with the reference count number, determining the intermediate count number associated with a selected signal input currently operatively coupled to the electronic circuit of the at least one component, calculating a difference count number corresponding to the difference between the reference count number and the intermediate count number associated with the selected signal input currently operatively coupled to the electronic circuitry of the at least one component, and transmitting command signals to the at least one component to switch inputs based on the difference count number so that, in response to the transmitted command signals, the signal input associated with the reference count number will be operatively coupled to the electronic circuitry of the at least one component, thereby allowing the user to view the video or hear the audio on the user's entertainment system corresponding to the video or audio signal provided to the signal input associated with the reference count number.

In another form of the present invention, the remote control includes a memory, and the operational method further includes the steps of storing in memory a list of preferred push button switch sequences, detecting the pressing of one or more push button switches in response to the user desiring to view video or hear audio on one or more of the components of the entertainment system, retrieving from the memory at least one of the push button switch sequences from the list of preferred push button switch sequences stored in the memory to define a retrieved at least one push button switch sequence, and transmitting command signals corresponding to the retrieved at least one push button switch sequence to the one or more of the components of the entertainment system in response to the detection of the pressing of the one or more push button switches.

Even more preferably, the step of retrieving from memory at least one of the push button switch sequences from the list of preferred push button switch sequences stored in the memory includes the further step of retrieving from the memory at least one of the push button switch sequences in an order of preference corresponding to which push button switch sequences are most often used with the components of the entertainment system or components that are generally available to the user or other persons for use in an entertainment system.

Even more preferably, the operational method of a remote control in accordance with the present invention includes the further step of arranging in a preferred order in the list the preferred push button switch sequences stored in the memory relative to one another corresponding to which push button switch sequences are most often used with the components of the entertainment system or components that are generally available to the user or other persons for use in an entertainment system, and in the step of retrieving from the memory at least one of the push button switch sequences, the operational method includes the further step of retrieving from the memory at least one of the push button switch sequences in an order in which the at least one push button switch sequence is listed in the preferred order in the list to define the retrieved at least one push button switch sequence.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 3 is an illustration of a screen displayed by the remote control of the present invention used to guide the user in setting up or operating the remote control and the user's entertainment system.

FIG. 4 is an illustration of a screen displayed by the remote control of the present invention used to guide the user in setting up or operating the remote control and the user's entertainment system.

FIGS. 5 and 5 (a)-(c) are illustrations of a screen and symbols displayed by the remote control of the present invention used to guide the user in setting up or operating the remote control and the user's entertainment system.

FIG. 6 is an illustration of a screen displayed by the remote control of the present invention used to guide the user in setting up or operating the remote control and the user's entertainment system.

FIG. 7 is an illustration of a screen displayed by the remote control of the present invention used to guide the user in setting up or operating the remote control and the user's entertainment system.

FIG. 8 is an illustration of a screen displayed by the remote control of the present invention used to guide the user in setting up or operating the remote control and the user's entertainment system.

FIG. 9 is an illustration of a screen displayed by the remote control of the present invention used to guide the user in setting up or operating the remote control and the user's entertainment system.

FIG. 10 is an illustration of a screen displayed by the remote control of the present invention used to guide the user in setting up or operating the remote control and the user's entertainment system.

FIG. 30 is an illustration of a screen displayed by the remote control of the present invention.

FIG. 31 is an illustration of a screen displayed by the remote control of the present invention.

FIG. 47 is an illustration of a screen displayed by the remote control of the present invention in the "guided/one-touch" mode of operation.

FIG. 48 is an illustration of a screen displayed by the remote control of the present invention in the "guided/one-touch" mode of operation.

FIG. 49 is an illustration of a screen displayed by the remote control of the present invention in the "guided/one-touch" mode of operation.

FIG. 67 is an illustration of a screen displayed by the remote control of the present invention used in a procedure for finding a correct key sequence that works with a TV or monitor.

FIG. 68 is an illustration of a screen displayed by the remote control of the present invention used in a procedure for finding a correct key sequence that works with a TV or monitor.

FIG. 69 is an illustration of a screen displayed by the remote control of the present invention used in a procedure for finding a correct key sequence that works with a TV or monitor.

DETAILED DESCRIPTION OF THE PREFERRED EMBODIMENTS

Figure 1A:
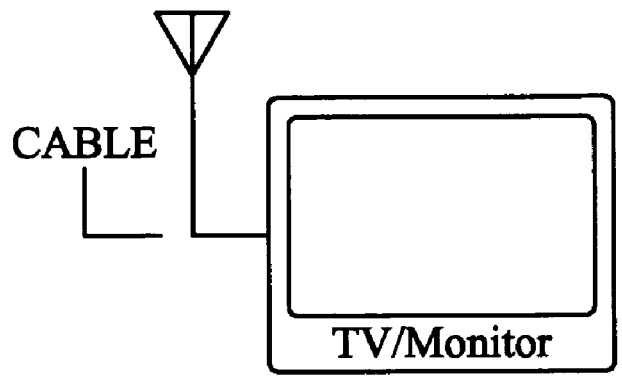
FIG. 1(a) is a pictorial illustration of an arrangement of components in an entertainment system which the remote control of the present invention can control, and which arrangement is referred to herein as "Watch Case 1".

The remote control of the present invention works with many different types of entertainment components. Examples of such devices include a television (TV), a digital video disk (DVD) player, a video cassette recorder (VCR), a set top box (STB), a monitor, an audio amplifier or receiver, and the like. Generally, the user will have one or more of these components existing in his entertainment system, but the remote control of the present invention is adaptable to newly added components to the system.

The circuitry and software of the remote control of the present invention run what is referred to as the "guided only" mode or process and the "guided/one-touch" mode or process. The "guided only" mode may be selected to prompt the user through each step needed to watch or listen to a desired activity, such as watching TV, watching a DVD, listening to a CD (compact disk), and other "watch" and "listen" activities. The "guided/one-touch" mode refers to initially prompting the user through each step needed to watch or listen to an activity, just like the "guided only" mode, but then automatically becomes a "one-touch" set up upon subsequent activity executions, where the user may simply press a single push button switch on the remote control ("one-touch"), and the remote control will automatically set up the components and inputs required to effect the user's desired activity (for example, watching a DVD).

There are a number of terms which are used herein in describing the capabilities and operation of the remote control of the present invention. At the outset, such often-used terms will now be defined.

DEFINITIONS

Aamp—Same as Audio Receiver/Amplifier.
Activity—An automated sequence that the remote performs for routine setups of a home entertainment system.
Audio Receiver/Amplifier—Same as Aamp. Same as Receiver. An audio receiver with speakers and presumably audio and video switched inputs.
Audio Stack—The audio stack is the memory structure that the programmer allocates to the audio receiver/amplifier inputs. Each device will be one "block" of memory on this stack. This block may store which audio input it represents (on the audio receiver/amplifier), what device is associated with it (e.g., a CD player), possibly how many input steps there are to the next device in the stack (e.g., two more steps to the MP3 block), etc. The number of blocks, or slots in this structure may be the same as the audio input loop length, though this is programmer implementation dependent.
Device—A component in the entertainment system. For example a TV or DVD player, or cable box or audio receiver.
Direct addressing—This term is related to video or audio device input switching modes. This is where each input of a device has a separate IR command. For example, a device with three video inputs, might have the hex command xA1 select the first input, xA2 selects the second input, and xA3 might select the third input. The opposite of direct addressing is where one IR command is sent to increment to the next input. For example the INPUT IR command might be x00. So, for such a three input device, that is currently on the first input, it will switch to the second input when x00 is received. If x00 is received again, the device will switch to the third input. If x00 is received again, the device will switch to the first input, and so on.
Display device—a TV or monitor. Used to watch video.
Entertainment system—A TV/monitor and/or audio receiver, and optionally other components (DVD, cable box, VCR, etc.). In the context of this patent, the assumption is that they are all IR controllable with the remote control.
Guided Activity—The user interacts via questions and answers with the remote and while watching and hearing the entertainment system, to get to a desired setup of the home entertainment system. For example, the desired setup might be to watch a DVD, so the remote would guide the user to turn on the DVD player, get to the correct TV input, etc. until the user is watching the DVD.
Guided Only mode—a process where the remote prompts the user through various steps needed to achieve the user's goal of watching some video or listen to some audio. For example, if the user wanted to watch a DVD, but had no idea what TV input to select, the Guided Only mode would guide the user through a process, where in the end, the user would be watching and listening to the DVD.
Input Loop—TVs and monitors generally have multiple video inputs. Typically, TVs and monitors have one IR command that is used to switch to the next input. This is called an INPUT command. Each time the TV/monitor receives an INPUT command, it goes to the next input. This input sequencing is implemented in the TV/monitor software as a loop. When the TV/monitor is on the last video input, and the INPUT command is received, it switches to the first video input. If another INPUT command is received, then it will switch to the second video input, and so on. Repeated receptions of the INPUT command cause the inputs to be cycled through in a loop fashion. This is called the "input loop". Tuners may or may not be in the "Input loop", and so the remote control has to handle both situations. Generally, tuners are in the loop, but not always.
Some audio/receivers have one IR INPUT command, and the inputs loop, like the TV/monitors, as described. But most audio receivers use direct addressing. The remote can implement the direct addresses internally as a loop.
IR—Infrared.
IR control—a common medium for controlling consumer electronics devices.
Listen Cases—These are the various use cases that exist for a user that is 'listening' to audio only on an entertainment system. For example, if a user has an MP3 player connected to an audio receiver, this is "Listen Case 2".
Monitor—TV or monitor. Can be considered the same for this invention.
Navigate—User uses the arrow keys etc. to get to a particular menu or folder on the remote.

One-Touch activity—An automated sequence that the remote performs for routine setups of a home entertainment system. These automated sequences are called "One-Touch Activities". Typical activities might be to automatically setup the TV and DVD player to watch a DVD, or to watch a VCR, or just watch a satellite channel. For example, to watch a DVD, the user may need to turn on the TV and DVD and audio receiver, make sure the DVD picture (video) is going to the correct TV input, and the DVD sound is going to the right audio receiver input. An activity would do all that automatically, by pressing one button, hence the name "One-Touch".

Guided/One-Touch mode—a mode that ultimately (and ideally) allows the user to press one button (One-Touch), and accomplish his goal, for example, say watching a DVD.

Resynchronization—This occurs after video and/or audio loop lengths have been determined. The remote control is said to be out of sync, if it had known the state of a device (component), but something happens to change the state of the device without the remote control knowing about it. For example, the user may turn the TV on with the remote control, so the remote control thinks the TV is on, but then the user turns the TV off via the switch on the TV itself. The remote control is out of sync. Another example would be if the remote control puts the TV on input X, and then the user uses the remote control to send a command to the TV to change inputs, but someone walks in front of the remote control, so the TV does not get the command to change inputs. The remote control now thinks the TV is on the next input (X+1), but the TV is still on input X. The remote control is out of sync. Resynchronization of the remote control goes through the Guided Activity steps, to the point that the user is hearing the desired audio and/or seeing the desired video. At this point the remote control saves the correct positioning information for audio and/or video inputs.

TV—TV or monitor. Can be considered the same for this invention.

Video Stack—The video stack is the memory structure that the programmer allocates for the video inputs. Each device will be one "block" of memory on this stack. This block may store which video input it represents (on the TV or monitor), what device is associated with it (e.g., a DVD player), possibly how many input steps there are to the next device in the stack (e.g., two more steps to the VCR block), etc. The number of blocks, or slots in this structure may be the same as the video input loop length, though this is programmer implementation dependent.

Watch Cases—These are the various use cases that exist for a user that is 'watching' video on an entertainment system. Watch cases always have a display device and an audio device for output. The audio device for output will either be the TV speakers, or an audio receiver and its speakers. For example, one watch case is just watching cable or broadcast television on a TV. This is "Watch Case 1". Another watch case is where a user has an STB only connected to a TV. This is "Watch Case 3".

There are a finite number of combinations and permutations for which a user may configure his or her entertainment system. Such configurations are referred to herein as "use" cases. Such use cases are illustrated by FIGS. 1(a)-1(h). There exist use cases for "watch" type activities, such as watching a television or a DVD. There are also use cases for "listen" type activities, such as listening to an audio receiver/amplifier.

Certain abbreviations are used in the illustrated use cases shown in FIGS. 1(a)-1(h). A legend of the abbreviations found in such use cases is set below.

Use Case Legend
A Audio
V Video
( ) an input or output
STB Set Top Box. Usually cable or satellite box or DVD player.
Aamp Audio/Receiver amplifier with speakers. Assumed to have AM/FM tuner.
Aamp(Vout) Audio/Receiver amplifier with speakers. Video output.
AV Audio and video
TVsrc TV internal audio and video source
AVsrc Audio/Video source
AVsw AV switch
Asrc Audio source (e.g., CD player, MP3 player, possibly a DVD player)

Based on the information received from the user based on prompts provided to the user, the remote control of the present invention will know the configuration of the user's entertainment system for each "watch" type activity and for each "listen" type activity, as illustrated by FIGS. 1(a)-1(h). These use cases will now be described in greater detail.

Watch Case 1, as illustrated by FIG. 1(a), relates to a situation where the user wishes to watch a TV channel on his TV or monitor that is received from a terrestrial broadcast antenna or cable, without a connection to or inclusion of a set top box (STB).

Figure 1B:
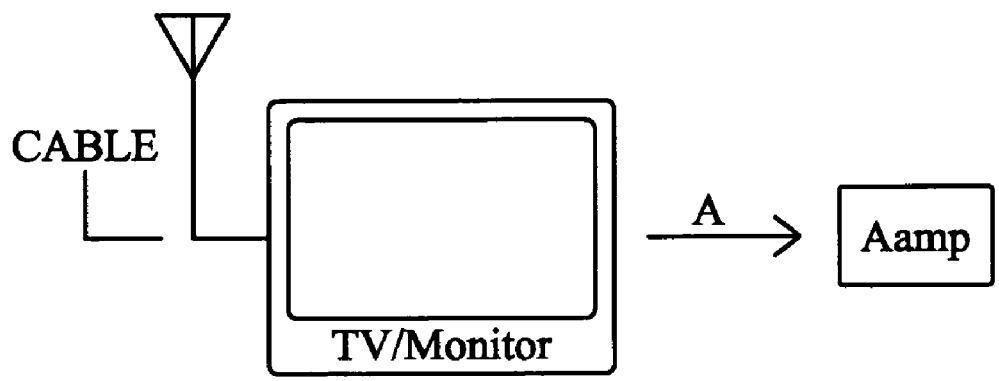
FIG. 1(b) is a pictorial illustration of an arrangement of components in an entertainment system which the remote control of the present invention can control, and which arrangement is referred to herein as "Watch Case 2".

Watch Case 2, shown in FIG. 1(b), relates to a situation where the user desires to watch a TV channel on his TV or monitor that is connected to a terrestrial broadcast antenna or cable, without a set top box (STB), and the audio signal from the TV is provided to an audio receiver or amplifier (audio receiver/amplifier).

Figure 1C:
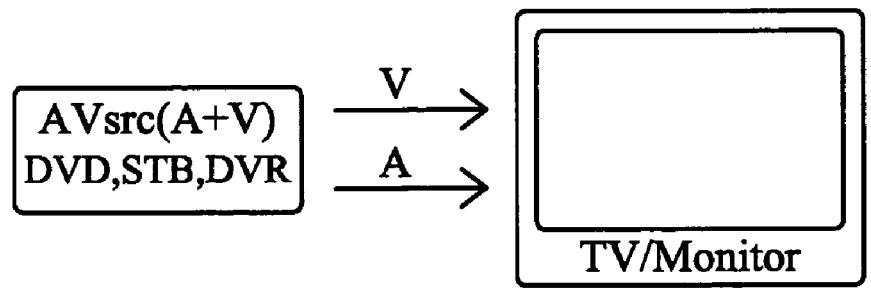
FIG. 1(c) is a pictorial illustration of an arrangement of components in an entertainment system which the remote control of the present invention can control, and which arrangement is referred to herein as "Watch Case 3".

Watch Case 3, shown in FIG. 1(c), relates to a situation where the user would like to watch video on his TV or monitor that is provided through a source of audio and video (AVsrc (A+V)), such as a set top box (STB), a DVD player, a digital video recorder (DVR), a video cassette player or recorder (VCR) and the like, which is connected to his TV or monitor, and more specifically, where the video and audio signals from the audio and video source are provided to the TV video and audio inputs.

Figure 1D:
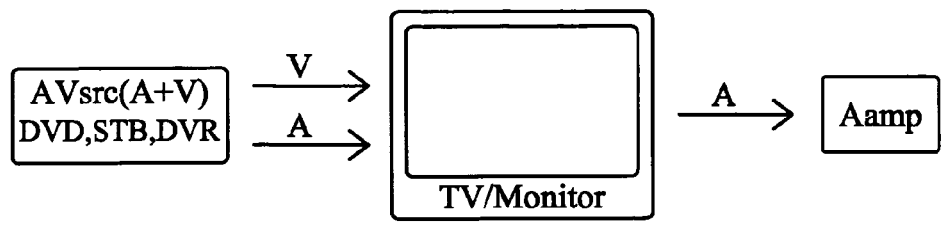
FIG. 1(d) is a pictorial illustration of an arrangement of components in an entertainment system which the remote control of the present invention can control, and which arrangement is referred to herein as "Watch Case 4".

Watch Case 4, shown in FIG. 1(d), relates to a situation where the user would like to watch video on his TV or monitor that is provided by an audio and video source, such as described previously, where the source's video and audio signals are provided to the TV inputs. However, in this situation, the entertainment system includes an audio receiver/amplifier, and the TV audio output signal is provided to the audio input of the audio receiver/amplifier.

Figure 1E:
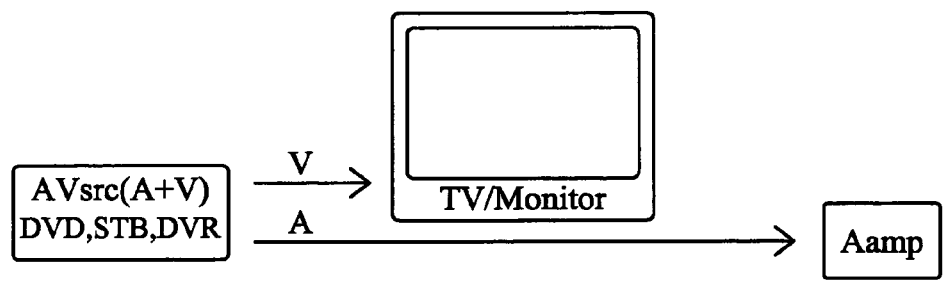
FIG. 1(e) is a pictorial illustration of an arrangement of components in an entertainment system which the remote control of the present invention can control, and which arrangement is referred to herein as "Watch Case 5".

Watch Case 5, shown in FIG. 1(e), relates to a situation where the user would like to watch video on his TV or monitor using his set top box (STB), DVD player, DVR, VCR or other source of audio and video, where the source's video signal is provided to the video input of the TV, and the source's audio signal is provided to the audio input of an audio receiver/amplifier.

Figure 1F:
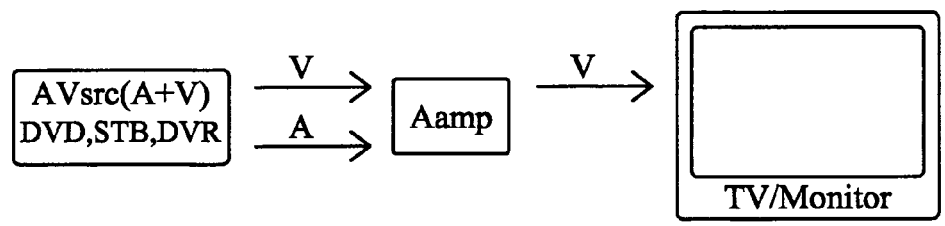
FIG. 1(f) is a pictorial illustration of an arrangement of components in an entertainment system which the remote control of the present invention can control, and which arrangement is referred to herein as "Watch Case 6".

Watch Case 6, shown in FIG. 1(f), relates to a situation where the user would like to watch video on his TV or monitor from a source of audio and video, such as a set top box (STB) or other component as described previously, where the source's video and audio signals are provided to the video and audio inputs of an audio receiver/amplifier, and the video signal outputted by the audio receiver/amplifier is provided to the video input of the TV or monitor.

There are two use cases for a "listen" type activity which the remote control of the present invention can recognize. These use cases are described below and illustrated by FIGS. 1(g) and 1(h).

Figure 1G:
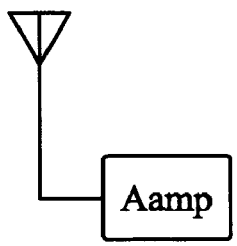
FIG. 1(g) is a pictorial illustration of an arrangement of components in an entertainment system which the remote control of the present invention can control, and which arrangement is referred to herein as "Listen Case 1".

Listen Case 1 relates to a situation where the user wishes to listen to a broadcast audio signal from his audio receiver/amplifier which is connected directly to a terrestrial antenna or cable, as shown in FIG. 1(g).

Figure 1H:
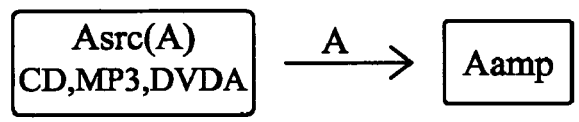
FIG. 1(h) is a pictorial illustration of an arrangement of components in an entertainment system which the remote control of the present invention can control, and which arrangement is referred to herein as "Listen Case 2".

Listen Case 2 relates to a situation where the user desires to listen to a source of audio (Asrc(A)), such as an MP3 player, a CD player, a digital video disc audio (DVDA) player and the like, where the audio signal output by the audio source is provided to the audio input of an audio receiver/amplifier, as illustrated by FIG. 1(h).

Each of the aforementioned "watch" type activities and "listen" type activities will be described further herein in relation to the operation of the remote control of the present invention, and more specifically, in connection with the "guided only" mode of operation and the "guided/one-touch" mode of operation of the remote control.

Figure 2:
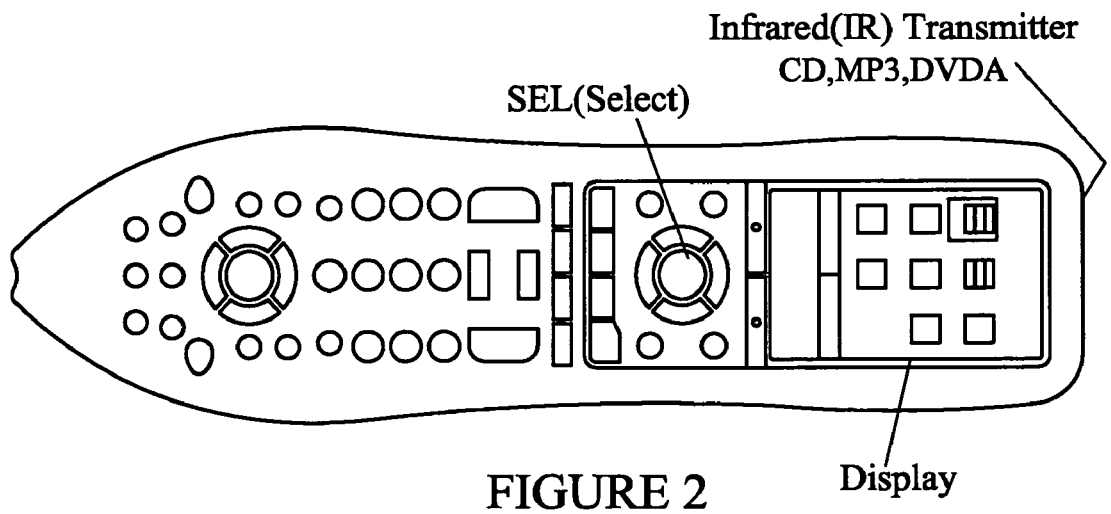
FIG. 2 is a top plan view of a preferred form of the remote control of the present invention, and illustrating the arrangement of push button switches (i.e., keys) and display situated thereon.

Turning now to FIG. 2 of the drawings, the preferred form of the remote control of the present invention is illustrated. As can be seen from FIG. 2, the remote control include a relatively large, color liquid crystal display (LCD), which provides information to the user as to setting up his entertainment system to provide a desired "watch" activity (for example, watching a DVD), or a desired "listen" type activity (for example, listening to a CD). The display prompts the user with questions, to which the user responds by pressing one or more push button switches, or keys, including "soft" keys. The remote control detects when a key is pressed, and which one, to learn the configuration and components of the user's entertainment system so that the remote control may assist the user in operating his or her entertainment system and to provide the user with a simplified method of operating the entertainment system to effect a desired "watch" or "listen" activity through a "one-touch" operation.

The remote control of the present invention is programmed to provide a series of instructional and informational screens on the LCD that guide the user along in the process of the remote control's learning the configuration and components of the user's entertainment system and being able to control the various components of the entertainment system to effect a desired "watch" or "listen" activity for the user. The user follows the sequence of successive screen displays on a remote control.

Described below and illustrated by FIGS. 3-12 of the drawings are illustrative displayed screens that are viewable by the user on the remote control's LCD in order to facilitate an understanding of the present invention. It should be understood, however, that the displayed screens described and illustrated herein should not be considered limiting to the invention, and that comparable and other displayed screens may be suitable for use with the remote control of the present invention.

The remote control of the present invention in a preferred form is connectable to the user's wireless internet connection. As will be described in greater detail, the remote control includes a wireless fidelity (WiFi®) transceiver which searches for and connects to the user's wireless network. The purpose of connecting to the internet through the user's wireless network is so that information may be wirelessly downloaded to the remote control over the internet from a remote location, such as a centralized server, to obtain the latest information or updates concerning manufacturer's products and changes thereto, or information concerning a digital cable (e.g., Cablevision™) or antenna (e.g., DISH™) provider to which the user subscribes.

As shown in FIG. 3, the remote control includes a "set up wizard" program. The screens shown on the LCD of the remote control provide the user with directions and ask questions of the user to guide the user through each step of configuring the remote control during the set up phase of using the remote control.

It order to start the set up wizard, the user is instructed to press the remote control "soft" key under where the screen displays the word "NEXT" (see FIG. 3). There are two soft keys which are provided directly adjacent to an edge of the display and in alignment with displayed and changeable words that may be selected by the user using the soft keys.

The remote control searches for a connection to the user's wireless network and displays a list of wireless networks the remote controller can "see", as shown in FIG. 4. This means that these networks are in range and are broadcasting their identities. If the user identifies his network on the display, he is requested to highlight it and press the select ("SEL") key.

The remote control will then connect to the user's wireless network, and shows the status of the connection on the display, as shown in FIG. 5. For example, the remote control can show that it is in the process of connecting to the user's wireless network, or that it has successfully connected to the wireless network, or that there was a connection error, as illustrated by the symbols shown in FIGS. 5(a)-5(c).

When the remote control successfully connects to the user's wireless network, it checks for software updates, and the remote control tells the user by a displayed screen if it is in the process of updating its software, as illustrated by FIG. 6.

Finally, the remote control displays the information that it obtains from its connection to the user's wireless network, including location, time zone and zip code. If the user wishes to change or correct any of this information displayed on the LCD of the remote control, the user is asked to highlight the item he or she wants to change by using the arrow keys (push button switches) on the remote control, as shown in FIG. 7.

For example, to change the country, the user is asked to press the select ("SEL") key repeatedly to cycle through the available countries. To change the time zone, the user must press "SEL" (the select key), and use the up and down arrows to highlight the option that matches the user's location, and press the select "SEL" key again to choose that particular option.

To enter a different zip code from that which is displayed, the user is instructed to press the select "SEL" key, and use the number keys to enter the user's zip code. If there are numbers already displayed in the zip code field, the user may use the "ENTER" key to delete the numbers and to re-enter them. Then, the user is instructed to press the "NEXT" soft key to continue.

Now, the remote prompts the user to set up his or her program guides. There may be several options available for the user's cable or antenna provider, such as digital versus regular cable. Knowing the zip code and location of the user's wireless network, the remote control displays on the LCD a list of known signal providers, such as shown in FIG. 8 of the drawings. The user is instructed to scroll down the list and highlight each one until he or she comes to the provider to which the user is subscribed, and then press the SEL key, as shown in FIG. 8.

The remote control may occasionally need a moment to communicate with its server to retrieve updates, guide information or news stories, for example. A screen display advises the user to "please wait", as shown in FIG. 9, as the remote control is communicating with the central server.

Now, the remote control of the present invention prompts the user with a series of questions to learn the configuration of the user's entertainment system and the components thereof, or to add a new device or component to the entertainment system. As shown in FIG. 10 of the drawings, a list of the various components of an entertainment system is displayed on the LCD of the remote control. The list of components may include, but are not limited to, "TV", "Cable", "Satellite", "DVD", "DVR", and the like. Such terms are displayed on the LCD of the remote control for the user to choose, as shown in FIG. 10.

The user scrolls from item to item on the list displayed on the remote control, highlighting each until the item that the user would like to advise the remote control forms part of his or her entertainment system is found. In the example shown in FIG. 10, the item "TV" is highlighted, as the user's entertainment system includes a television, or the user wishes to add a television to his or her entertainment system. The user is then prompted to press the select "SEL" key to select that particular item.

Figure 11:
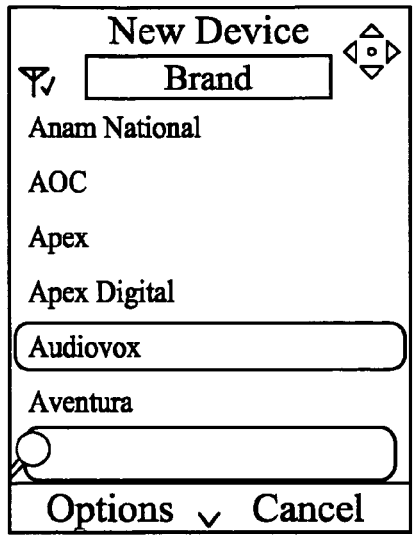
FIG. 11 is an illustration of a screen displayed by the remote control of the present invention used to guide the user in setting up or operating the remote control and the user's entertainment system.

The remote control has stored in its memory a list of known manufacturers of each of the components which may form part of an entertainment system. This list may be periodically updated with new information by the remote control automatically connecting to the central server through the user's wireless network. Therefore, when the user selects "TV" as the item forming part of his or her entertainment system, the remote control of the present invention extracts from its memory a list of all of the known manufacturer's names of televisions, and displays them on the LCD for viewing by the user, as illustrated by FIG. 11. The user then scrolls through the list of TV manufacturers displayed on the LCD of the remote control, until he finds a particular manufacturer that is highlighted and which is the manufacturer of the TV used in the entertainment system. In the example shown in FIG. 11 of the drawings, the user highlighted "Audiovox" as the manufacturer of his TV. The user then presses the select "SEL" key to advise the remote control that Audiovox is the manufacturer of the TV used in his or her entertainment system.

Figure 12:
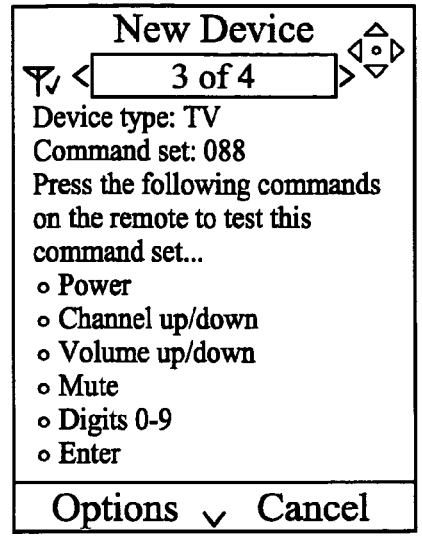
FIG. 12 is an illustration of a screen displayed by the remote control of the present invention used to guide the user in setting up or operating the remote control and the user's entertainment system.

Each manufacturer has for its particular component, such as a TV, a command code, which is used for programming the remote control so that it may operate the particular manufacturer's component. Now knowing that the manufacturer of the user's TV is "Audiovox", for example, the remote control searches through its memory to find the command code associated with the Audiovox TV, and configures the microprocessor using this command code to provide infrared (IR) or radio frequency (RF) signals that are output by the remote control to the various components of the user's entertainment system, in this case, the TV, so that the remote control can interface with and operate that particular component. As shown in FIG. 12 of the drawings, the remote control displays on its LCD the device type and the command code, and then provides instructions to the user to test the various push button switches provided on the remote control to determine if it is properly operating the component of the user's entertainment system, in this example, the TV. The testing of the various push buttons switches, or keys, is an effort to assist the user in determining the proper IR code format to use with a device to be added.

The remote control needs to know each of the components which make up the user's entertainment system. By the user entering this information into the remote control by responding to a series of questions or prompts, the remote control learns the user's configuration of his or her entertainment system, and usually the configuration will fit into one of the "watch" activity cases or "listen" activity cases described previously and shown in FIGS. 1(a)-1(h).

Figure 13:
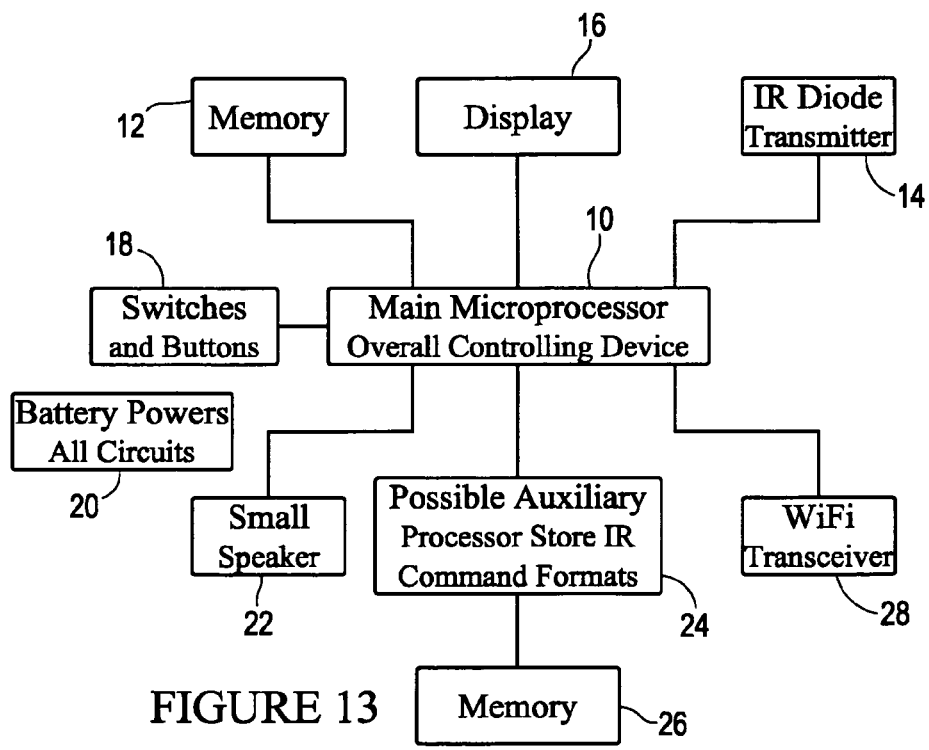
FIG. 13 is a block diagram of a preferred form of the electronic circuitry used in the remote control of the present invention.

A block diagram of one form of an electronic circuit of the remote control of the present invention is shown in FIG. 13. The remote control basically includes a main microprocessor 10, including its associated memory 12, which controls the operation of the remote control. An infrared (IR) or radio frequency (RF) transmitter 14 is operatively coupled to the microprocessor 10 and controlled thereby to emit IR or RF command signals to one or more components of a user's entertainment system.

A display 16, such as the LCD described previously, is also coupled to the main microprocessor 10 and is controlled thereby to provide prompts, information and questions to the user so that the user may control the various components of his or her entertainment system by using the remote control.

The main microprocessor 10 also is coupled to the various push button switches 18 (i.e., hard and soft keys) of the remote control. When a user presses a particular push button switch 18, a signal is sent to the main microprocessor 10, which receives the signal and performs an operational task based on the signal received.

The remote control further includes a preferably rechargeable battery 20 which powers the electronic circuitry of the remote control, and a small speaker 22 to emit audible signals for the user's operation of the remote control.

Furthermore, the remote control of the present invention may include an auxiliary processor 24 that has associated memory 26 to store IR or RF command formats for the operation of the various components of the user's entertainment system. This auxiliary processor 24 may be operatively coupled to the main microprocessor 10 and interfaces therewith. Additionally, the electronic circuitry of the remote control may include a WiFi® transceiver 28 to couple to the user's wireless network in order to receive and send information over the internet from and to a central server. The WiFi® transceiver 28 is operatively coupled to the main microprocessor 10 of the electronic circuitry.

Now, the two principal modes of operation of the remote control of the present invention, that is, the "guided only" mode and the "guided/one-touch" mode, will now be described. The user can select either one of these modes of operation.

The purpose of the "guided only" mode of operation is to have the remote control guide or prompt the user through various steps needed to achieve the user's goal of watching some video or listening to some audio. For example, if the user wanted to watch a DVD, but had no idea what TV input to select, the "guided only" mode would guide the user through this connection process, where in the end, the user is watching the DVD.

The "guided only" mode comprises a two step process. First, the user defines a particular "watch" activity or "listen" activity (referred to herein as the "define activity" phase), and second, the remote control provides a guided playback of instructions to the user on how to choose the inputs for the TV or other components of the entertainment system so that the desired activity may be achieved (referred to herein as the "guided playback" phase).

More specifically, the first "define activity" phase is where the user defines what devices are to be used in the activity he desires to achieve. For example, for a "watch" activity, the user specifies which TV will be watched, as well as other components of the entertainment system which may be required to achieve the desired activity, such as a DVD player, for example. In this "define activity" phase of the "guided only" mode, the user may also give a name to the activity, such as "watch RCA TV". In this way, the remote control can easily look up in its memory 12 the sequence of connections that are required to provide the desired activity, and provides instructions to the user so that the user may set the inputs and other features of the components of his or her entertainment system to achieve that desired activity.

The second phase (i.e., "guided playback") of the "guided only" two step process is where the remote control prompts the user through the various steps needed to achieve the user's goal of watching some video or listening to some audio.

Thus, for the "guided only" mode, once the activity is defined by the user, it appears in a list on the remote control, with a name that is chosen by the user, such as "watch RCA TV" described previously. Then, if the user selects that activity and instructs the remote control to "play" (i.e., through the "guided playback") the selected activity, then the remote control guides or prompts the user through the various steps needed to achieve the user's goal of watching the desired video or listening to the desired audio.

The purpose of the "guided/one-touch" mode of operation of the remote control is to create an activity that, when the activity is selected by the user and played by the remote control, the remote control quickly and automatically sets up the inputs on the components of the entertainment system, without requiring any user intervention, so that the user may watch the desired video or listen to the desired audio.

For example, suppose an activity which the user named "play my DVD" has been completely set up in the guided/one-touch" mode of operation of the remote control in order to allow the user to watch a DVD from a DVD player, using a TV and an audio receiver/amplifier. The user selects the activity "play my DVD" from a list of activities that are displayed on the LCD 16 of the remote control, and presses the "play" push button switch (e.g., a key having a right facing triangle symbol) on the remote control to activate this particular routine. The remote control automatically turns on the components of the entertainment system required for the user to watch a DVD, sets the TV to the correct video and audio inputs, and sets the audio receiver/amplifier to the correct input or inputs, so that the user may watch the DVD without having to set up the inputs or turn on the various components that would be required to play the DVD.

The "guided/one-touch" mode of operation is a multi-step process. First, the desired "watch" or "listen" activity must be defined, as in the "guided only" mode. This "define activity" phase is where the user selects the components of the entertainment system to be used, and names the activity. Second, the desired activity, such as watching a DVD, must be run once so that the remote control learns what inputs to use for the TV and audio receiver/amplifier and other components of the entertainment system to achieve the desired activity. Third, a particular algorithm, referred to herein as the "One-Touch User Interaction Algorithm" is run on the microprocessor 10 of the remote control. This software procedure interacts again with the user through prompts provided on the display 16 to determine more information about the configuration of his or her entertainment system, such as how many video and audio inputs there are on one or more components of the entertainment system. The remote control then saves this information, learned by detecting key selections by the user in response to displayed prompts by the remote control, so that the desired activity can be played back (that is, executed) in a fully automatic fashion under what is referred to herein as the "guided/one-touch playback". Now, when the user selects an activity from a list of activities which are displayed on the LCD 16 of the remote control, and presses the "play" key, the remote control automatically turns on the various components of the entertainment system required to effect the desired activity, including setting the TV to the correct video input, and setting the audio receiver/amplifier, if such is included, to the correct input, so the user can now watch the DVD.

Again, the algorithms and software programmed into the remote control of the present invention are used, in conjunction with the entertainment system configurations of audio and video signal routing shown in FIGS. 1(*a*)-1(*h*), are used to accomplish the desired activity without significant technical detail and, in most cases, without any technical input from the user.

Table I, shown below, shows the basic setup process for each of the "guided only" mode of operation and the "guided/one-touch" mode of operation.

TABLE I

Basic Set Up Process For The Two Modes

| GUIDED ONLY (setup) | GUIDED/ONE-TOUCH (setup) |
|---|---|
| Define activity | Define activity |
| (save information) | (save information) |
| Guided Activity Playback Process | Guided Activity Playback Process |
| (user interaction) | (user interaction) |
| (save configuration information) | (save configuration information) |
| Done | "One-Touch User Interaction Algorithm" Process |
| | (user interaction) |
| | (save system information) |
| | Done |

Table II, shown below, is the basic playback process for each of the "guided only" mode of operation and the "guided/one-touch" mode of operation.

TABLE II

Basic Playback Process For The Two Modes

| GUIDED ONLY (playback) | GUIDED/ONE-TOUCH (playback) |
|---|---|
| Guided Activity Playback Process | One-Touch-Automatic-Playback |
| (user interaction) | (get system info from memory) |
| (save configuration information) | (NO user interaction) |
| Done | Done |

In the playback phase of the "guided only" mode of operation, the various "watch" or "listen" activities that are stored in the memory 12 of the remote control are displayed as a list on the remote control's LCD 16. The user then selects a particular activity to play. The selected activity information required to effect the desired activity is read from memory 12 by the remote control's microprocessor 10. Such information may include, generally, the components of the entertainment system which are to be used, the code set that must be selected, and the input selections for each of the various components. Other configuration information which may be saved in memory includes the last "input" command sent to a component of the entertainment system, such as an audio receiver/amplifier (direct addressed), what components are currently turned on, and the like. The user is then guided through the process of watching or listening to the desired content.

In the playback phase of the "guided/one-touch" mode of operation, the user selects the activity he desires to play from a list of activities that are stored in the memory 12 of the remote control and displayed on the remote control's LCD 16. The activity information for the chosen activity is read from the remote control's memory 12. Again, this includes, generally, the information needed for the remote control to automatically turn on all of the components of the entertainment system which are required to effect the desired activity, and select the correct inputs on the various components, so that there is little or no user interaction required. Now, the entertainment system is prepared and ready for the user to watch or listen to the desired content.

The setup processes for operating the remote control of the present invention in the "guided only" mode and the "guided/one-touch" mode will now be described. For the "guided only" setup process, the user decides, through prompting by the remote control with questions posed on the LCD 16 and responses from the user entered into the remote control by the user pressing push button switches, whether the user wants to set up either a "watch" activity or a "listen" activity. If the user makes the selection to setup a "watch" activity, then the subroutine referred to herein as "User Defines Watch Activity" is run. If the user makes the selection to set up a "listen" activity, then the subroutine referred to herein as "User Defines Listen Activity" is run. The setup process defines what components of the user's entertainment system are to be used to effect the desired activity, and what name the user wishes to call the desired activity to identify it as such on a list of activities which are subsequently provided to the user by the remote control on the LCD 16.

Once the setup process has been completed in the "guided only" mode, the user is asked if he wants to playback, or run, the desired activity at that point. If the user wants to immediately playback the activity, then the remote control of the present invention executes the "guided playback" procedure. Based on what components of the entertainment system have been selected to be used in order to effect the desired activity, the remote control executes the appropriate "guided playback" subroutine or procedure for the desired activity.

For example, if the user has defined a desired activity which requires an STB, a TV and an audio receiver/amplifier, then the remote control will go to the procedure, or subroutine, that is referred to herein as "Guided Playback of Watch STB-With Audio Receiver/Amplifier".

When the playback procedure or subroutine has been completed by the remote control, the components of the entertainment system should be properly interconnected, with the correct inputs, to allow the user to watch the desired video or hear the desired audio, and the process has now been completed.

The "guided/one-touch" mode set up process is similar in many respects to the previously described "guided only" set up process. The set up process starts with the user deciding whether he wants to set up either a "watch" or "listen" activity. If the user makes the selection to set up a "watch" activity, then the procedure or subroutine referred to herein as "User Defines Watch Activity", mentioned previously, is run by the remote control. If the user makes the selection to set up a "listen" activity, then the procedure or subroutine referred to herein as "User Defines Listen Activity", mentioned previously, is run by the remote control. These procedures define what components of the entertainment system to use in the desired activity, and what name the user would like to call this activity for later identification in a list of activities provided by the remote control and displayed on the LCD 16.

Once the set up process for the "guided/one-touch" mode has been completed, the user is asked if he wants to playback, or run, the desired activity immediately. If the user wants to playback the activity at this time, then the remote control of the present invention executes the guided playback procedure or subroutine. Based on what components have been identified as being required to perform the desired activity, the remote control executes the appropriate "guided playback" procedure or subroutine to effect the desired activity.

For example, if the user requests a desired activity that requires an STB, a TV and an audio receiver/amplifier, then the remote control will go to the procedure or subroutine referred to herein as "Guided Playback of Watch STB-With Audio Receiver/Amplifier".

When the playback procedure has been completed, the components of the entertainment system should now be properly connected and interactive to allow the user to watch the desired video or hear the desired audio.

The remote control then executes a process, or subroutine, referred to as "One-Touch User Interaction Algorithm". This process is where the remote control interacts with the user again, collecting configuration information such as, the number of TV inputs or the number of audio receiver/amplifier inputs, which inputs are to be used, and other information. This information is stored in the remote control's memory 12 for the desired activity, as well as information about how to automatically select the video and/or audio inputs for every subsequent time when the desired activity is selected by the user to be played.

Figure 14:
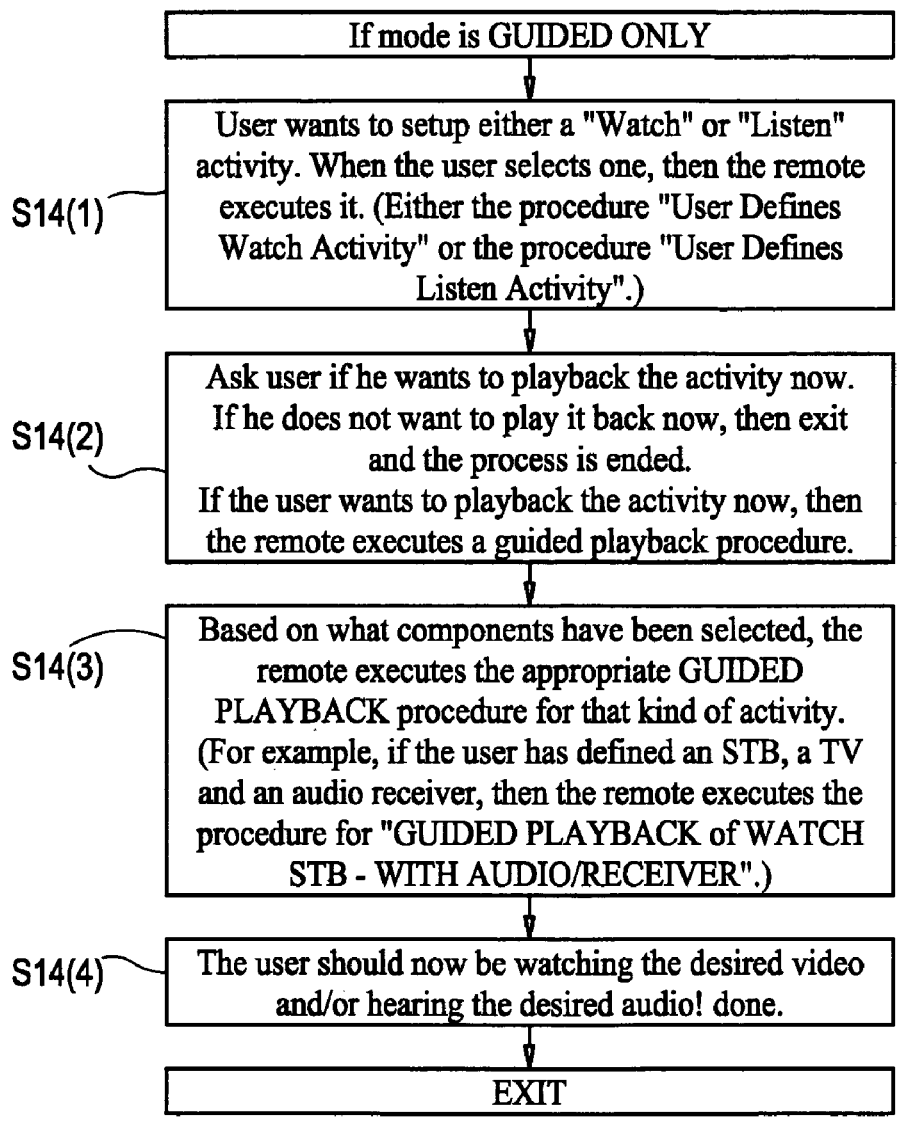
FIG. 14 is a flow chart for the set up process used by the remote control of the present invention in the "guided only" mode of operation.
Figure 15:
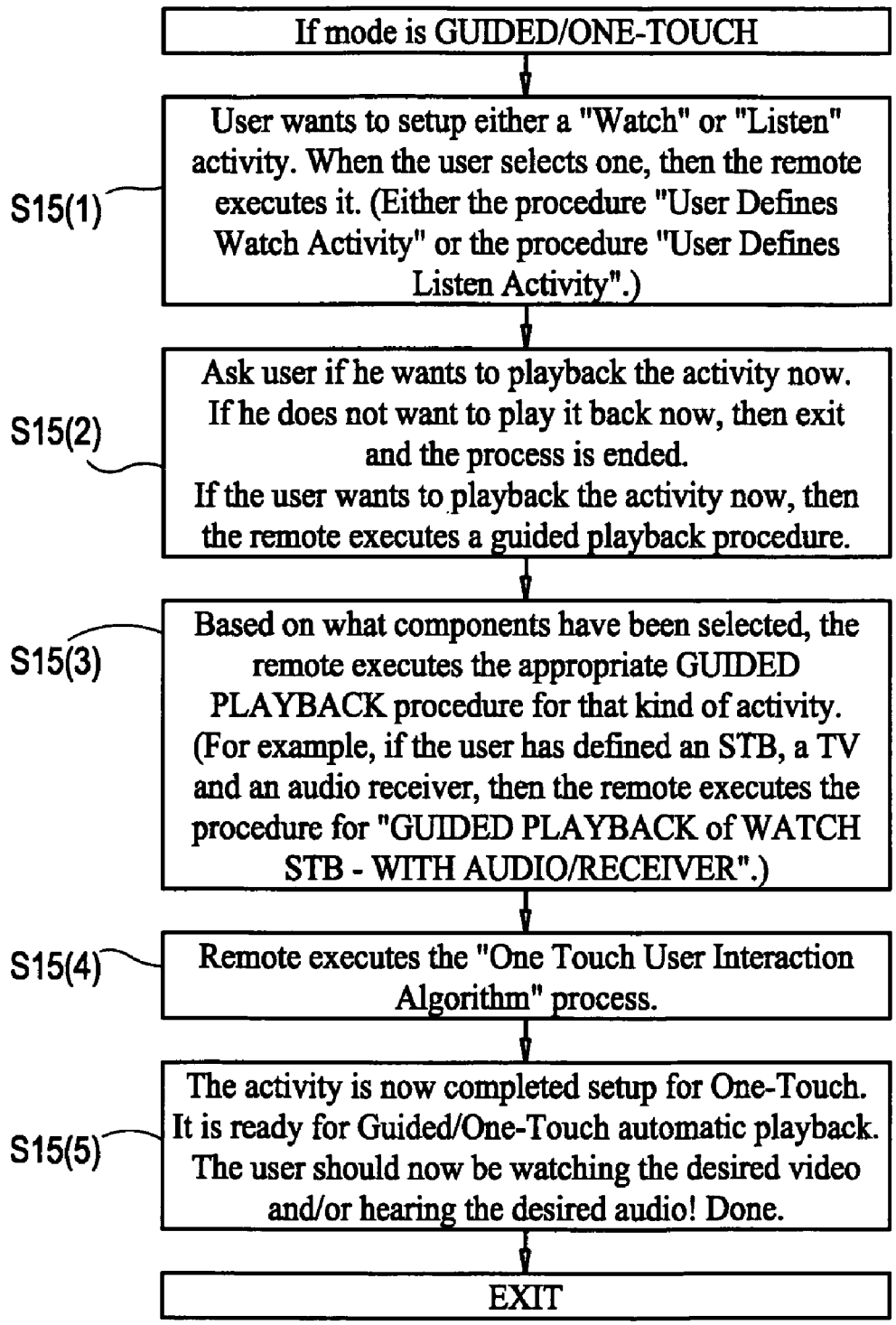
FIG. 15 is a flow chart for the set up process used by the remote control of the present invention in the "guided/one-touch" mode of operation.

A flow chart for the basic set up process for the "guided only" mode of operation is shown in FIG. 14 of the drawings, having the steps S14(1)-S14(4), and a flow chart of the basic set up process for the "guided/one-touch" mode of operation is shown in FIG. 15, having the S15(1)-S15(5). Steps S14(1)-S14(4) and steps S15(1)-S15(5), as can be seen from FIGS. 14 and 15, respectively, have been explained in detail previously.

The playback process for each of the "guided only" and "guided/one-touch" modes of operation will now be described. Once a desired activity has been defined by the user to the remote control of the present invention, the steps to effect the desired activity can now be played back by the remote control to the user. In both modes of operation, that is, the "guided only" and "guided/one-touch" modes, the user navigates through a list of activities, named by the user, displayed on the LCD 16 of the remote control. Then, the user selects the desired activity he wants to playback or execute. Here, the playback process differs for each of the two modes of operation.

In the "guided only" playback procedure, to execute the desired activity, the user is asked questions from the remote control, and is guided through the process of connecting the correct inputs to effect the desired activity, until the components of the entertainment system are operational and connected through the right inputs to allow the user to listen to the desired audio or view the desired video.

In the "guided/one-touch" playback process, the remote control reads the stored activity information relating to the desired activity. The remote control then can determine the commands that are needed to be sent, by IR or RF transmitted signals, to the various components of the entertainment system to establish the audio receiver/amplifier and the TV or monitor, for example, on the correct inputs. Such information could already be stored in the memory 12 of the remote control and retrieved at this point by the remote control. In either case, the remote control now automatically sends the correct IR or RF commands to the various components of the entertainment system required to effect the desired activity to configure the components so that the user may listen to the desired audio or view the desired video.

Figure 16:
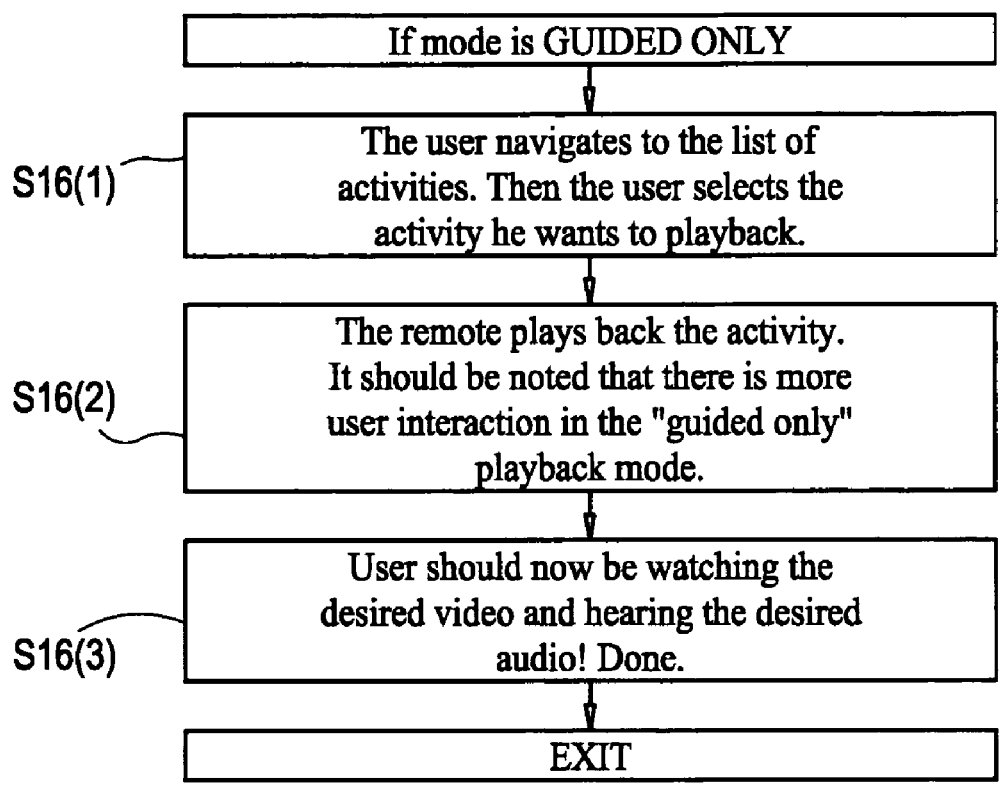
FIG. 16 is a flow chart for the playback process used by the remote control of the present invention in the "guided only" mode of operation.
Figure 17:
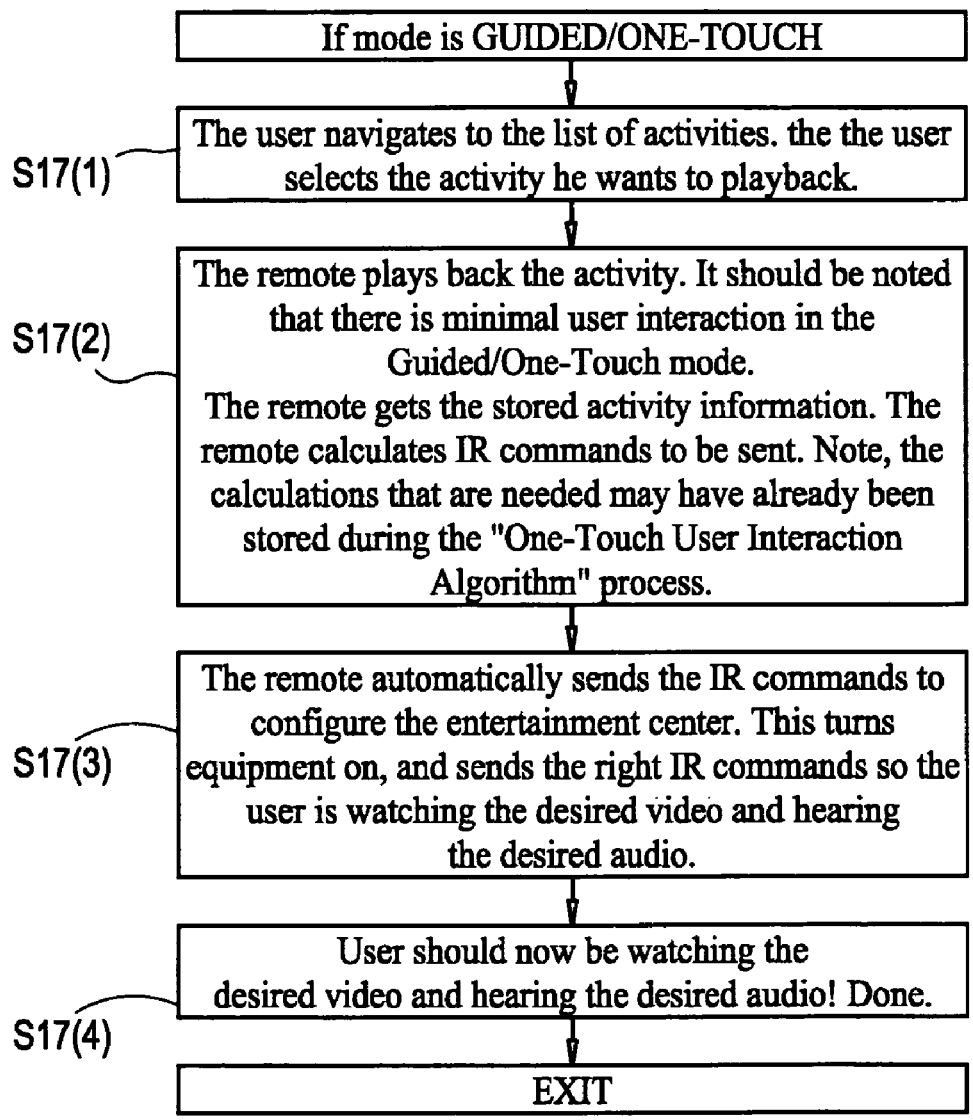
FIG. 17 is a flow chart for the playback process used by the remote control of the present invention in the "guided/one-touch" mode of operation.

A flow chart for the playback process used in the "guided only" mode of operation is shown in FIG. 16, having the steps S16(1)-S16(3). A flow chart for the playback process used in the "guided/one-touch" mode of operation is shown in FIG. 17, having the steps S17(1)-S17(4). The steps S16(1)-S16(3) for the "guided only" mode and the steps S17(1)-S17(4) for the "guided/one-touch" mode, relating to the playback process for each mode, have been described in detail previously.

As described previously, there are "watch" activities and "listen" activities which may be programmed into the remote control of the present invention so that the remote control can either provide instructions to the user on how to connect the components of the entertainment system which are required to effect a particular "watch" activity in the "guided only" mode of operation, or can even automatically provide IR or RF command signals to the various components to select the inputs and connections that are required to effect the particular "watch" activity in the "guided/one-touch" mode of operation. A similar situation exists for the "listen" activities.

In defining a "watch" activity, the user navigates to the screen displayed on the LCD 16 of the remote control where the "watch" activities are being set up. The user selects the source of video content he or she wants to watch. For example, the source could be a DVD player, an STB or the TV, and such information is entered into the remote control by the user by his pressing push button switches, such as the soft keys, in response to prompts or questions provided by the remote control to the user and displayed on the LCD 16. In the example above, the user may select the audio/video source to be the TV or an STB, for example.

The remote control may have many televisions from which to choose from, so the user must decide which TV to watch from a list of televisions which he programs into the remote control, again, through prompting or questions posed by the remote control to the user. For example, the user selects the display device as being a TV or monitor, and identifies the particular TV or monitor with a name, such as "Audiovox TV".

The user must then decide from where the sound will come. The user may choose whether the sound will be coming from the TV or an audio receiver/amplifier, for example. In the example above, the user selects the audio device as being either the TV or the audio receiver/amplifier.

After all of the components of the entertainment system required to bring about the desired "watch" activity have been selected, there are some software variables which may need to be initialized. These variables represent the video stack length and the audio stack length. The electronic circuitry of the remote control initializes the video stack length and the audio stack length to equal zero, which indicates that these components of the system have not yet been used (that is, Videostack=0 and Audiostack=0).

If an audio receiver/amplifier is selected as the audio device, then the remote control must send volume commands to the audio device. If the audio receiver/amplifier is not being used as the audio device, then the remote control will know to send volume commands to the TV.

The user preferably provides a name to the activity that he is creating during the define phase of the process, which name is then stored in the remote control's memory 12 and, subsequently, displayed on the LCD 16 by the remote control in a list of activities which the user may select. Alternatively, the remote control has a list of suggested names stored in its memory 12 which may be applicable to the activity being defined, and such suggested name may be acceptable for the user to define the "watch" activity being programmed. For example, a typical name for a "watch" activity could be "Watch RCA DVD". The user can always edit the activity name that is created. The define phase for the "watch" activity has now been completed and the activity information that is collected by the remote control, including the activity name, the components of the entertainment system required to effect the activity, the particular inputs of the components which must be interconnected and the like, are stored in the memory 12 of the remote control.

Figure 18:
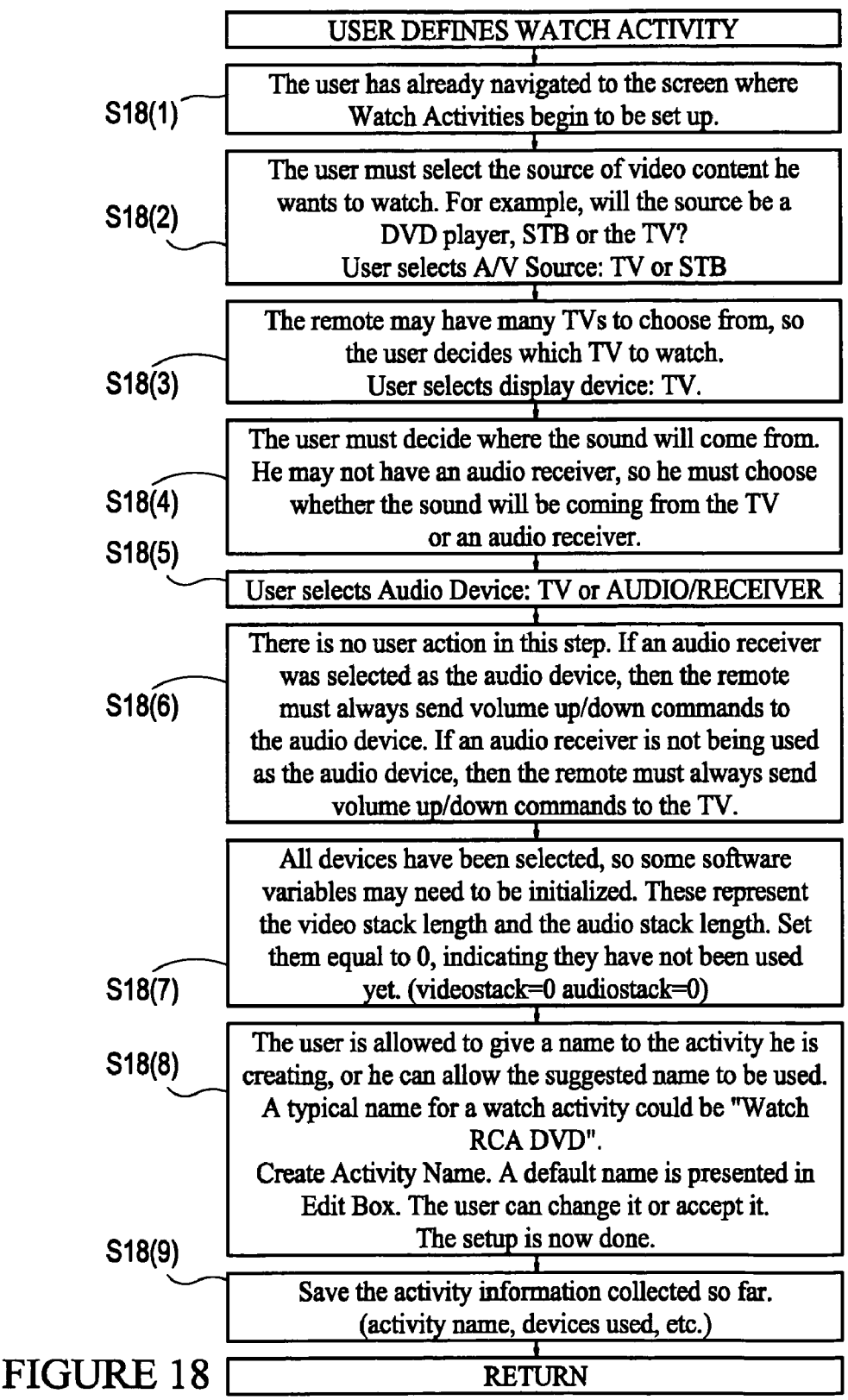
FIG. 18 is a flow chart for the "define activity" process used by the remote control of the present invention for a "watch" activity.

A flow chart for defining the "watch" activities is presented in FIG. 18, and includes the steps S18(1)-S18(9). The steps S18(1)-S18(9) have been described in detail previously.

Figure 19:
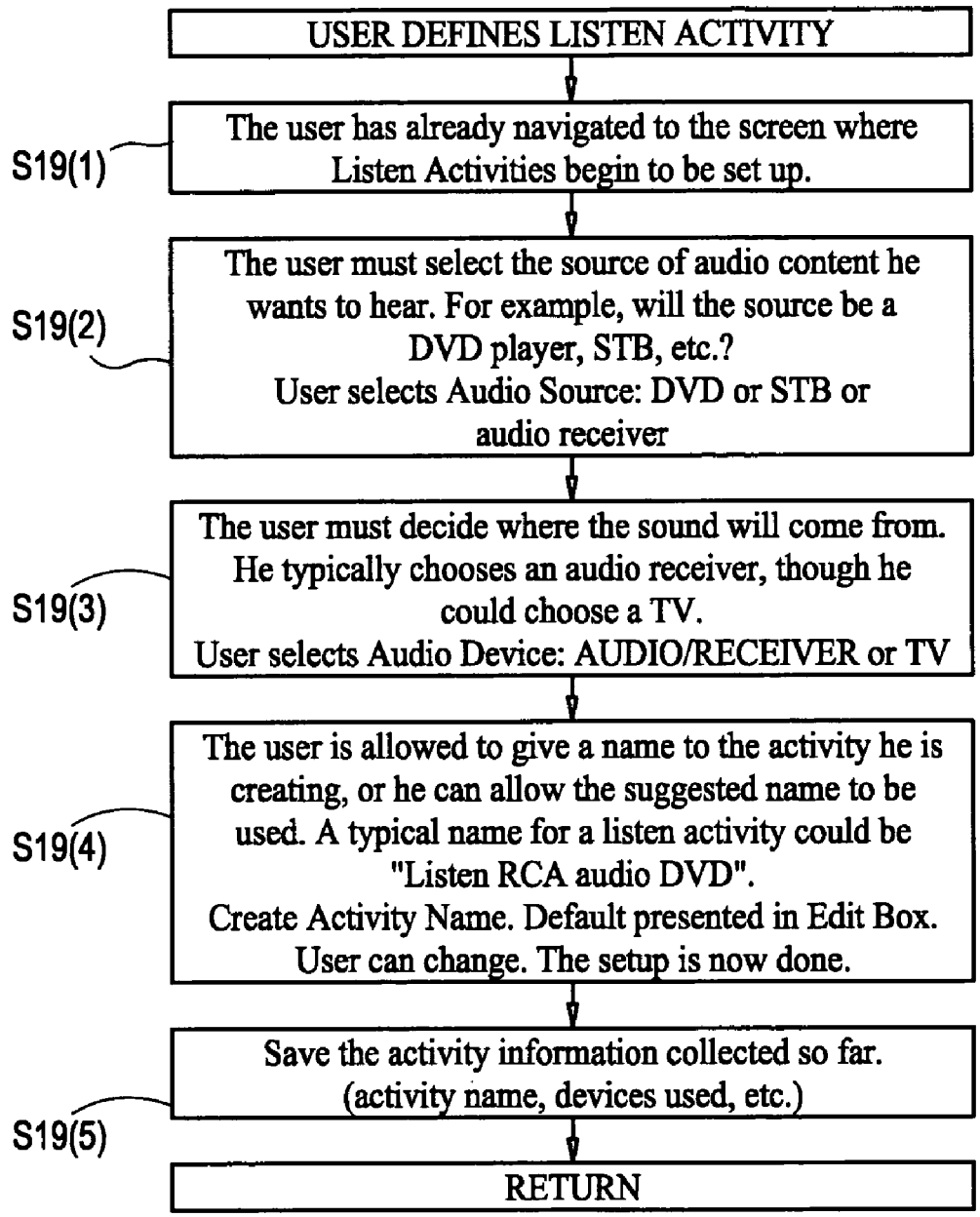
FIG. 19 is a flow chart for the "define activity" process used by the remote control of the present invention for a "listen" activity.

The "listen" activities must also be defined and programmed into the remote control of the present invention. The procedure for defining a "listen" activity is the same as or similar to the procedure for defining a "watch" activity. A flow chart for defining a "listen" activity is shown in FIG. 19 of the drawings, having the steps S19(1)-S19(5). The steps S19(1)-S19(5) have been described previously in relation to the steps and procedure used for defining a "watch" activity.

Now, the guided playback procedures used in the "guided only" mode and the "guided/one-touch" mode of operation of the remote control for each of the "watch" cases and the "listen" cases will now be described.

Reference is now made to FIG. 1(*a*) of the drawings, which illustrates a TV or monitor being connected directly to either a cable or broadcast antenna to receive video and audio signals thereon (Watch Case 1). By definition, there is no audio receiver/amplifier functions that are required, and there is no STB functions needed.

Figure 20:
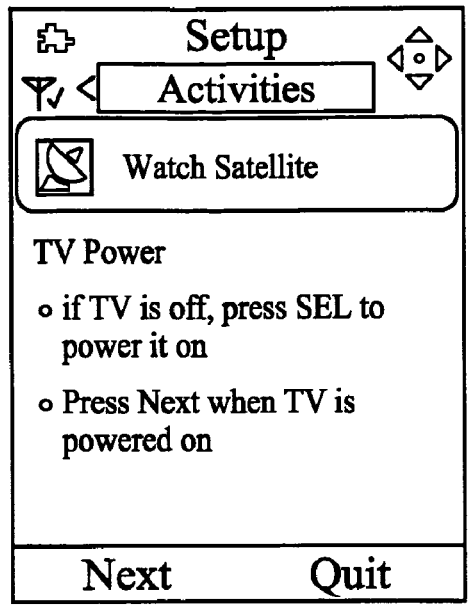
FIG. 20 is an illustration of a screen displayed on the remote control of the present invention.

In Watch Case 1, the remote control interacts with the user, by prompting the user and receiving responses back from the user, to turn on all of the components that are being used to effect a desired activity (e.g., watching TV). If the components are not turned on, the remote control cannot control them. FIG. 20 illustrates a screen shown on the LCD 16 of the remote control, which prompts the user to turn on the TV. For further details, reference should be had to the description of the function referred to as "User-Turns-On-All-Devices-Used".

The purpose of doing this is to get the user to watch a television channel using the TV tuner. The function or subroutine referred to as "Get-The-User-Watching-A-Tuner-Channel" is called up by the remote control, and this subroutine determines the video input switching method, if it is not previously known, in order to allow the user to watch the TV channel. This particular "watch" activity information, such as the inputs used and the particular components used of the entertainment system, is collected by the remote control and stored in its memory 12.

Figure 21:
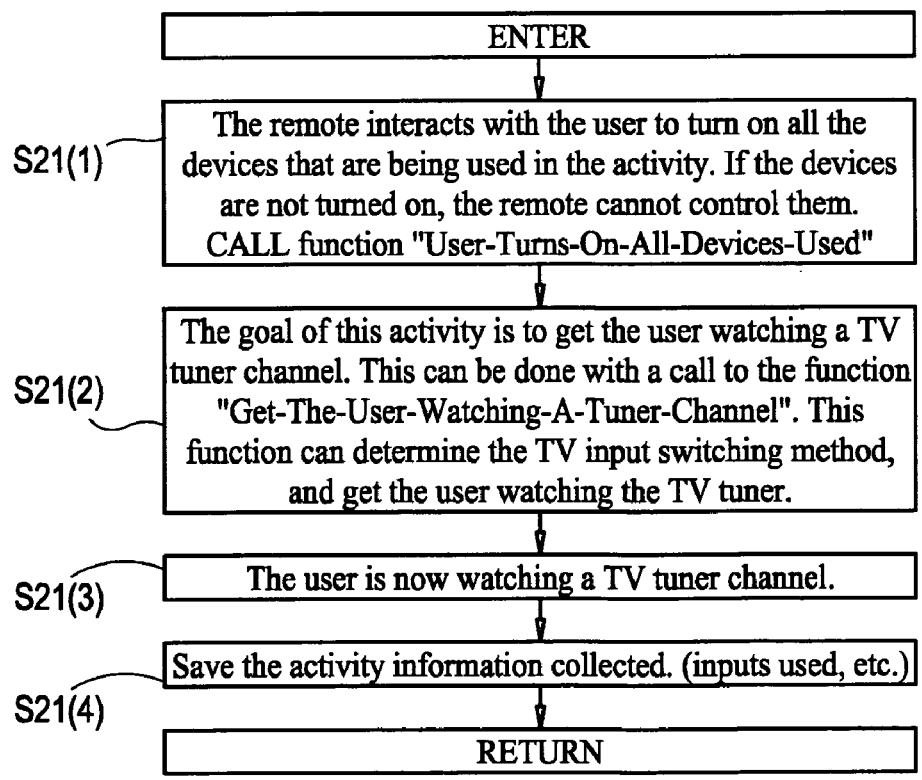
FIG. 21 is a flow chart for the "guided playback" process used by the remote control of the present invention for a "watch" activity referred to herein as "Watch Case 1".

A flow chart for the "guided playback" phase for Watch Case 1, which is also referred to herein as "Watch TV-No Audio Receiver/Amplifier", is illustrated by FIG. 21 of the drawings, and includes the steps S21(1)-S21(4), which steps have been described previously.

The guided playback procedure or subroutine for Watch Case 2, which is also referred to herein as "Watch TV-With Audio Receiver/Amplifier", will now be described. Reference should be had to FIG. 1(*b*), which illustrates the components and flow of signals used in this particular case. Here, only a TV or monitor and an audio receiver/amplifier is used, and there are no STB functions required.

The remote control interacts with the user to turn on all of the components of his or her entertainment system that are being used for this particular "watch" activity. Again, if the components are not turned on, the remote control cannot control them. The subroutine which is used by the remote control to advise the user to turn on all of the components used for this particular activity is referred to as "User-Turns-On-All-Devices-Used", as mentioned previously.

The purpose of doing this is to get the user to watch a TV channel by using the tuner of his TV and hearing the sound from the audio receiver/amplifier. The function or subroutine referred to as "Get-The-User-Watching-A-Tuner-Channel" is called up by the remote control, and is used, through prompting to the user and responses from the user, to determine the video input switching method, if not previously known by the remote control, required to effect this activity, to then allow the user to watch the TV channel he desires to watch.

If the audio receiver/amplifier uses direct input commands, then the remote control calls up the function or subroutine referred to as "Set-Direct-Audio-Receiver-Input", so that the remote control knows what inputs the audio receiver/amplifier has on to receive the signals. By the user listening for audio coming from the audio receiver/amplifier, and responding to prompts from the remote control, which is opening and closing various inputs on the audio receiver/amplifier, as to whether the user now hears the audio coming from the amplifier, the remote control learns what inputs are required to get the audio signal from the TV or monitor through the audio receiver/amplifier. Thus, the remote control cycles through all of the audio inputs in a subroutine called up by the remote control referred to as "Audio-Input-Loop", to find the correct input connections to effect the desired activity. The activity information, such as the inputs used and the components used in the entertainment system, and the settings of each, are collected by the remote control and stored in its memory 12 for use in subsequent guided playback procedures.

Figure 22:
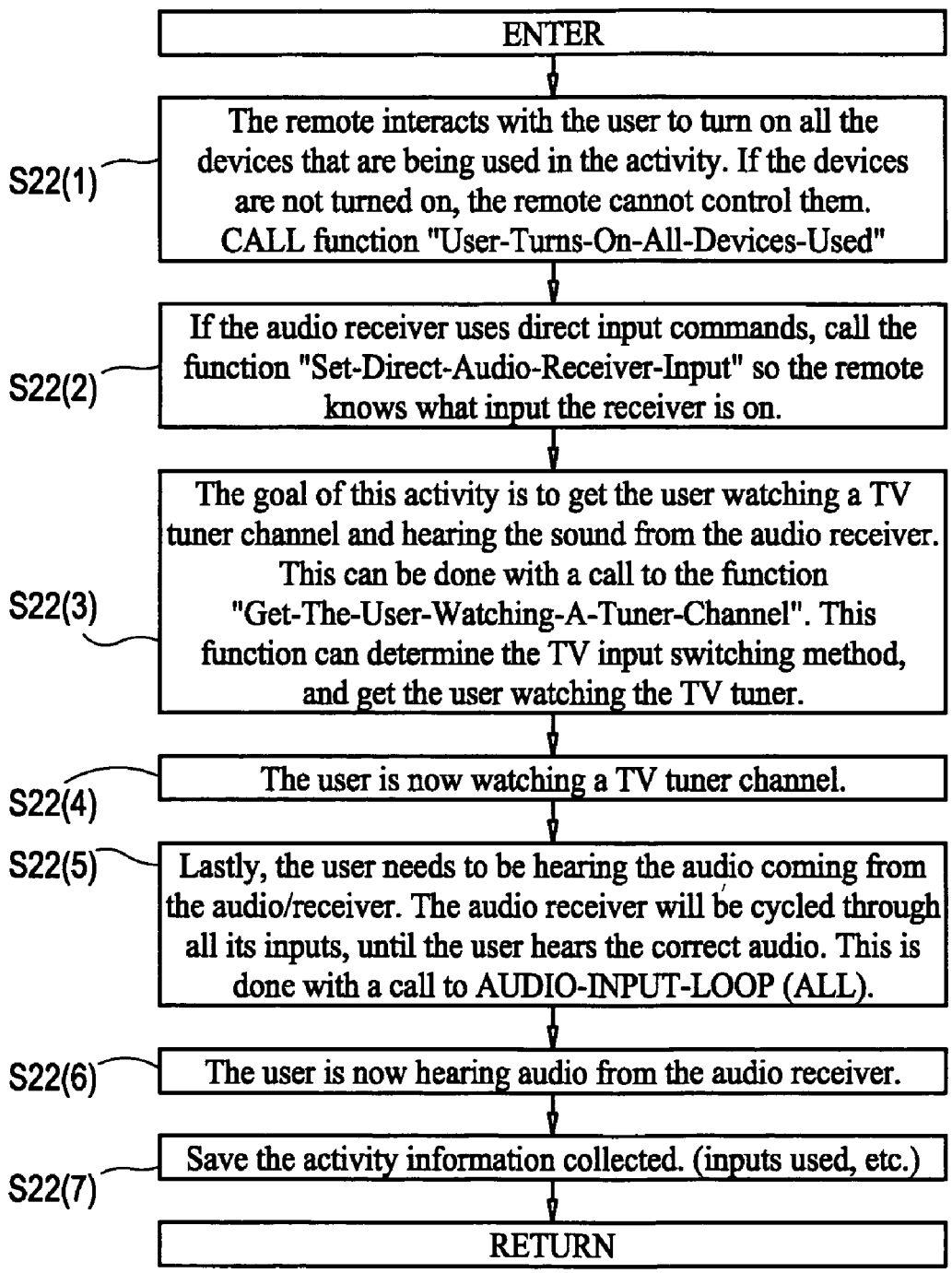
FIG. 22 is a flow chart for the "guided playback" process used by the remote control of the present invention for a "watch" activity referred to herein as "Watch Case 2".

A flow chart for the "guided playback" routine, referred to as "Watch TV-With Audio Receiver/Amplifier", for Watch Case 2, is shown in FIG. 22 of the drawing, having steps S22(1)-S22(7), which steps have been described previously.

The "guided playback" routine for Watch Case 3 will now be described. The routine is also referred to herein as "Watch STB (A/V to TV)-No Audio Receiver/Amplifier". Reference should be had to FIG. 1(c) of the drawings, which illustrates the components and flow of signals used in Watch Case 3. As can be seen from FIG. 1(c), there is only a TV or monitor and an STB used in Watch Case 3, and there is no audio receiver/amplifier functions that are required.

The remote control interacts with the user to turn on all of the components of his or her entertainment system that are being used in this desired "watch" activity. If the required components are not turned on, the remote control cannot control them. Again, this prompting to the user is accomplished with a call up of the subroutine referred to as "User-Turns-On-All-Devices-Used".

The purpose of doing this is to have the user watch the TV using the STB for switching channels, and the user hearing the sound and viewing the audio from the TV as a result of the video and audio signals provided to the TV by the STB. The remote control gets the user to watch the TV using the STB by calling up the subroutine referred to as "Video-Input-Loop". By the user listening to the audio from the TV and viewing the video on the TV, and responding to questions and prompts posed to it by the remote control, the remote control learns what inputs and components are needed to effect the desired activity for Watch Case 3. This information, that is, the inputs used, the components and the settings of the components, is collected by the remote control and stored in the remote control's memory 12 for subsequent use when this desired activity is again selected by the user.

Figure 23:
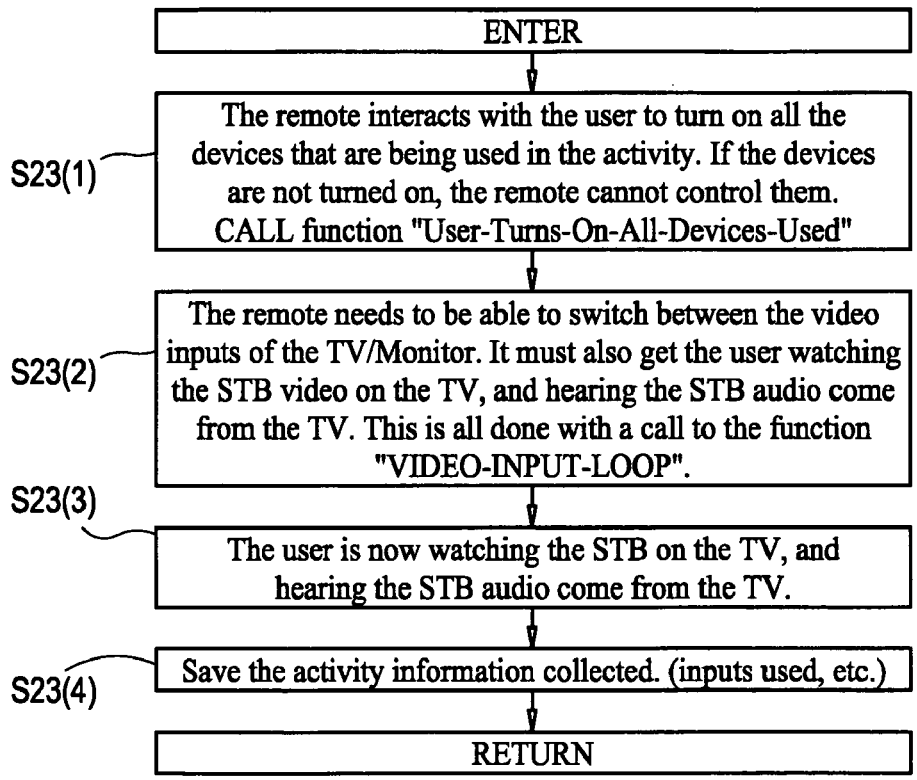
FIG. 23 is a flow chart for the "guided playback" process used by the remote control of the present invention for a "watch" activity referred to herein as "Watch Case 3".

A flow chart for the guided playback subroutine for Watch Case 3, again, referred to as "Watch STB (A/V to TV)-No Audio Receiver/Amplifier" is illustrated by FIG. 23, having the steps S23(1)-S23(4), the steps S23(1)-S23(4) having been previously described.

The "guided playback" subroutine for Watch Cases 4, 5 and 6, also referred to as "Watch STB-With Audio Receiver/Amplifier", will now be described. Reference should be had to FIGS. 1(d), 1(e) and 1(f), where it is shown that an audio and video source, such as a DVD, STB, DVR and VCR, for example, output video signals and audio signals. In Watch Case 4, the video and audio signals are provided to the TV or monitor, and the monitor provides audio signals to an audio receiver/amplifier. In Watch Case 5, the audio and video source provides video signals to the TV or monitor and audio signals to the audio receiver/amplifier. In Watch Case 6, the audio and video source provides video and audio signals to the audio receiver/amplifier, which in turn provides video signals to the TV or monitor.

In the "guided playback" routine which is used for Watch Cases 4, 5 and 6, the subroutine referred to as "User-Turns-On-All-Devices-Used" is called up by the remote control and provides prompts to the user and receives responses from the user. If the audio receiver/amplifier uses direct input commands, the remote control calls up the subroutine or function referred to as "Set-Direct-Audio-Receiver-Input", so the remote control knows what input the receiver is on for the user to hear the audio from the audio receiver/amplifier.

The purpose of doing this is to get the user to watch the video on the TV or monitor provided by the video signals from the audio and video source, such as the DVD, STB, DVR, VCR and the like, and have the sound come from the audio receiver/amplifier. The remote control accomplishes this function, through prompts to the user and the user responding when he sees the video on the TV and hears the audio from the audio receiver/amplifier, by pressing push button switches on the remove control, with a subroutine referred to as "Watch-STB-With-Audio-Receiver". The remote control will command the audio and video source, the TV or monitor and the audio receiver/amplifier to change inputs until the proper combination of inputs of each component leads to a video being displayed on the TV or monitor and audio being heard from the audio receiver/amplifier by the user, and the user alerting the remote control to what he hears and sees by pressing certain push button switches on the remote control. The information gathered by the remote control, such as the inputs and components used to effect the activities in Watch Cases 4, 5 and 6, are stored in memory 12 for subsequent use when a desired activity is selected by the user.

Figure 24:
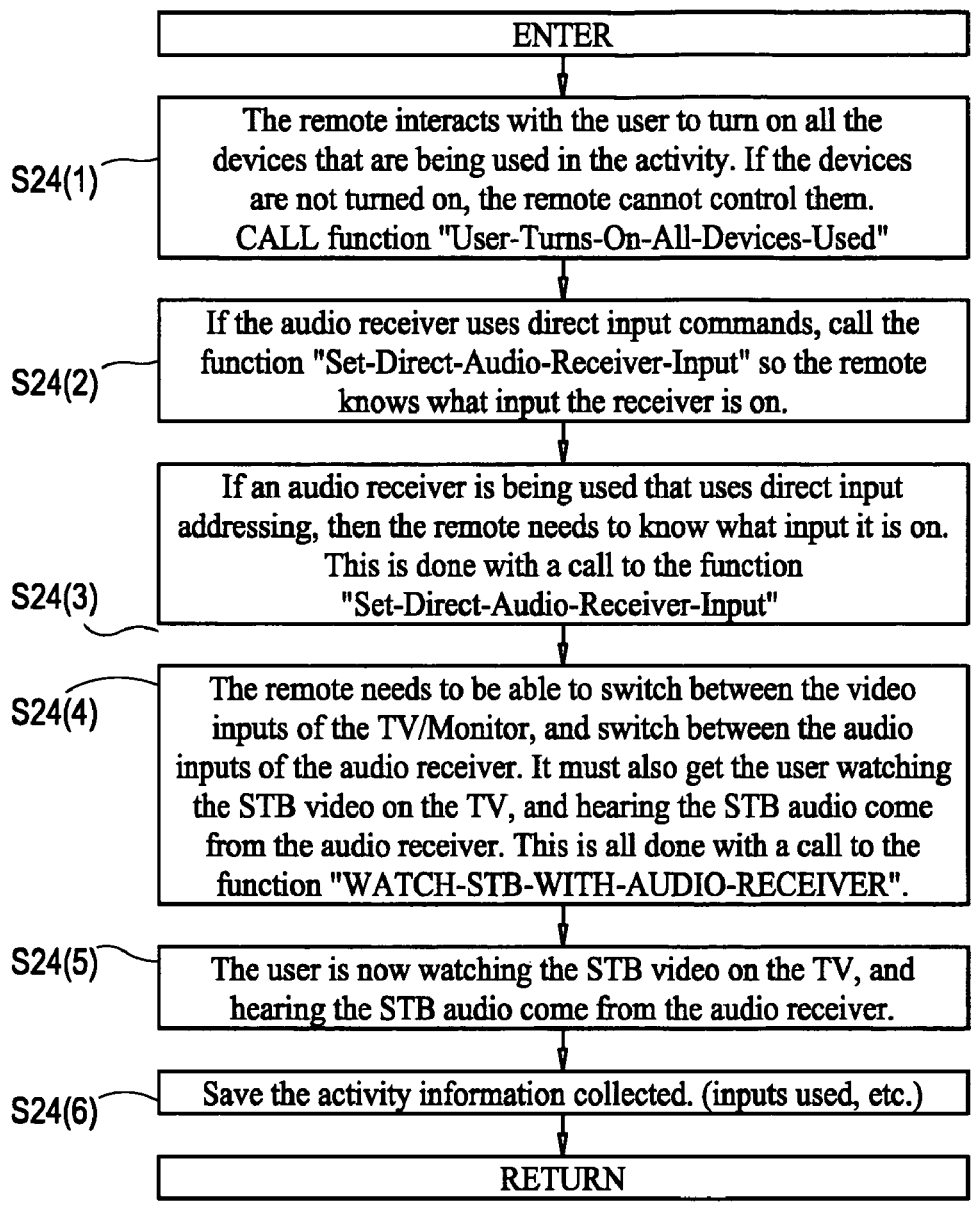
FIG. 24 is a flow chart for the "guided playback" process used by the remote control of the present invention for a "watch" activity referred to herein as "Watch Case 4", "Watch Case 5" and "Watch Case 6".

A flow chart for the "guided playback" routine that is used in Watch Case 4, 5 and 6, referred to as "Watch STB-With Audio Receiver/Amplifier" is shown in FIG. 24, having the steps S24(1)-S24(6), the steps S24(1)-S24(6) having been described previously.

The guided playback procedures for the two "listen" cases shown in FIGS. 1(g) and 1(h) will now be described. First, reference should be had to FIG. 1(g), for Listen Case 1, which shows the use of an audio receiver/amplifier only, where the audio receiver/amplifier is connected directed to an antenna or cable source. There are no STB functions or video switching functions required to effect the "listen" activity for Listen Case 1.

The remote control executes the subroutine referred to as "User-Turns-On-All-Devices-Used". If the audio receiver/amplifier uses direct input commands, then the remote control also executes the subroutine and function referred to as "Set-Direct-Audio-Receiver-Input", so that the remote control learns what input the audio receiver/amplifier is on for sound to emanate from the speakers connected to the amplifier.

The user is prompted by the remote control to alert the remote control when he hears audio coming from the amplifier. This is accomplished using the subroutine executed by the remote control referred as "Audio-Input-Loop". The remote control, with IR or RF command signals provided to the audio receiver/amplifier, will cause the audio receiver/amplifier to cycle through all of its inputs, including the tuner input, and prompts the user to respond to the remote control when the user hears sound coming from the audio receiver/amplifier. In this way, the remote control learns which inputs are required to be connected on the audio receiver/amplifier in order to effect the desired activity, which is, listening to audio from the audio receiver/amplifier. The information collected by the remote control in response to the cycling through the inputs of the audio receiver/amplifier and the user acknowledging that he hears sound, such as the component inputs required, is stored in the memory 12 of the remote control for subsequent use when the same activity is selected by the user.

Figure 25:
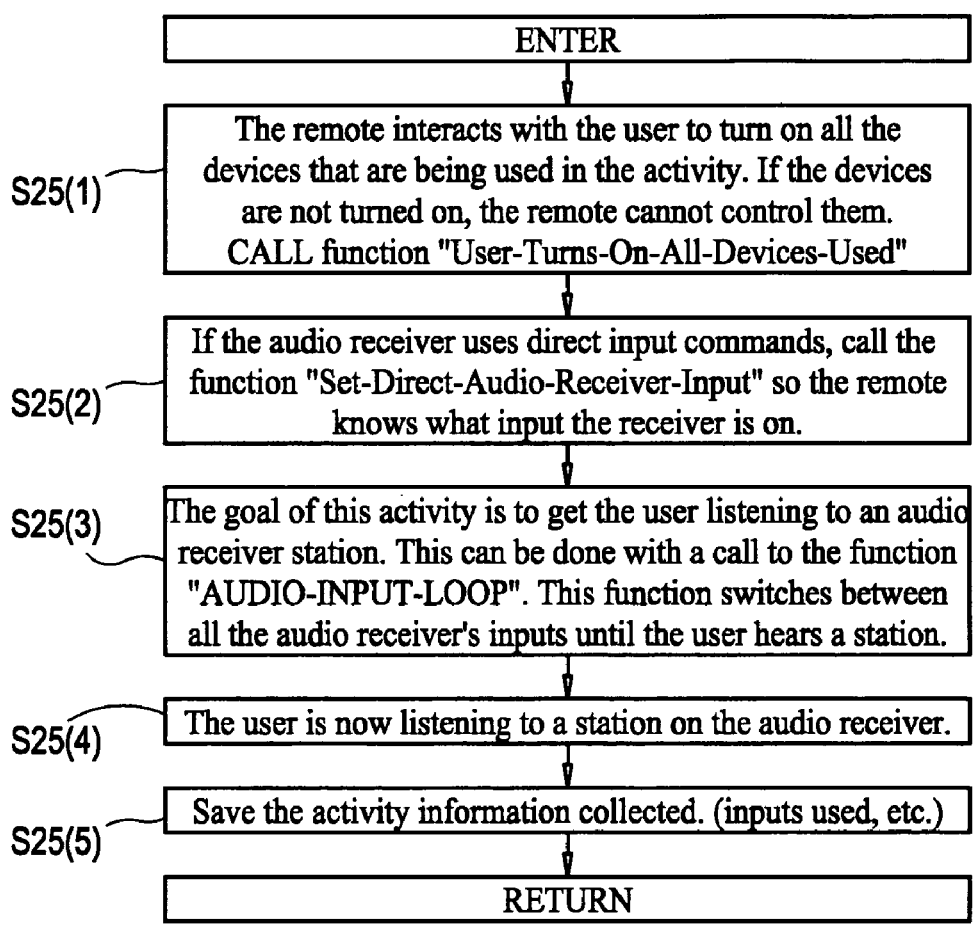
FIG. 25 is a flow chart for the "guided playback" process used by the remote control of the present invention for a "listen" activity referred to herein as "Listen Case 1".

A flow chart for the "guided playback" routine covering Listen Case 1 is illustrated by FIG. 25 of the drawings, having the steps S25(1)-S25(5), the steps S25(1)-S25(5) having been described previously.

The "guided playback" procedure or routine for Listen Case 2 will now be described. Reference should be had to FIG. 1(h), which illustrates the flow of signals and the components used to effect the "listen" activity defined as Listen Case 2. As shown in FIG. 1(h), there is only an audio receiver/amplifier used and a source of audio, such as a CD player, MP3 player, DVDA player or STB, for example. The audio signal is provided to the audio receiver/amplifier, and sound emanates from the speakers of the amplifier, which the user hears.

The remote control of the present invention executes the subroutine referred to as "User-Turns-On-All-Devices-Used". Again, as in Listen Case 1, if the audio receiver/amplifier used in Listen Case 2 uses direct input commands, the remote control calls up and executes the function or subroutine referred to as "Set-Direct-Audio-Receiver-Input", so that the remote control learns what input the audio receiver/amplifier is on for the user to hear audio from the amplifier.

The remote control gets the user to hear the audio from the amplifier as the remote control cycles through inputs of the audio receiver/amplifier using IR or RF command signals provided to the audio receiver/amplifier and, if necessary, the audio source (for example, the CD player, the MP3 player, the DVDA player, etc.), and the user alerts the remote control to the fact that he or she hears audio from the audio receiver/amplifier when the correct combination of inputs of the components is chosen. The remote control saves this connectivity information that it collects into its memory 12 for subsequent use when the same activity is again selected by the user.

Figure 26:
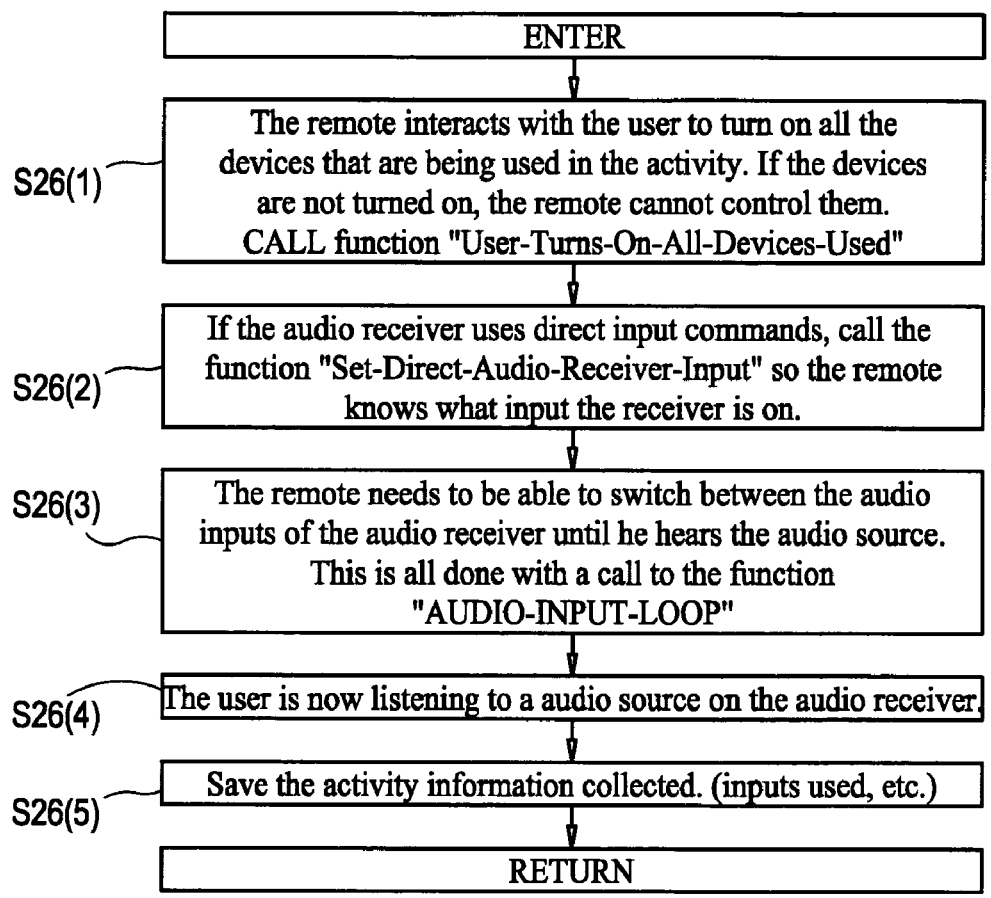
FIG. 26 is a flow chart for the "guided playback" process used by the remote control of the present invention for a "listen" activity referred to herein as "Listen Case 2".

A flow chart for the "guided playback" routine for Listen Case 2 is shown in FIG. 26 of the drawings, having the steps S26(1)-S26(5), the steps S26(1)-S26(5) having been described previously.

Now, the "One-Touch User Interaction Algorithm" used by the remote control of the present invention will be described.

This subroutine or algorithm includes a number of steps. The first step is performed only if this is the first time that a "watch" activity or "listen" activity which uses audio or video switching is being learned by the remote control. In this first step, the user is prompted by the remote control to switch inputs on the various components of his or her entertainment system (e.g., the TV and/or audio receiver/amplifier) which have switchable signal inputs to determine the number of inputs for each such component, that is, the "stack length". For example, the remote control may display the following language: "Your device configuration is about to be adjusted. You will then be prompted to correct the configuration by cycling through inputs." If the TV or monitor is required for this desired activity and it is the first time that the activity is being "tested", then the subroutine should proceed with this step of cycling through the inputs; otherwise, this step is skipped.

In carrying out this step, the remote control, through IR or RF command signals transmitted to the component of the user's entertainment system, increments the video input once and keeps the count, that is, stepping away from viewing the video. The remote control prompts the user to "press SEL until you see the activity's video again", "SEL" referring to the select key.

The reason the video input is incremented, that is, switched, to the next input is because it is desired to have the user step through all of the inputs and respond as to whether he sees video on the TV or monitor. From this, the remote control determines how many inputs there are on the component (e.g., TV or monitor) under test. More specifically, the user had been seeing the video displayed on the TV or monitor, and then the remote control causes the TV to step to the next video input so that the user no longer sees the video displayed on the TV or monitor. The remote control then prompts the user through all of the inputs, and thus counts them, until the user gets back to a video input in which he again sees video on the TV or monitor. From this, the "loop count" is then determined, that is, the number of video inputs. This is the preferred procedure for determining the number of video inputs of a component in the entertainment system. If the remote control did not increment through the inputs, but rather asked the user to press the push button switch labeled "NEXT" (e.g., a soft key) when the user saw video, then he would not press the "NEXT" push button switch on the remote control immediately, since he would be already seeing the video, and it is possible that the remote control would not go through the entire loop to determine the loop count of video inputs.

From this step, the remote control now knows how many inputs the TV or monitor, or other component, has. Again, this is referred to as the "loop count".

The remote control stores in its memory 12 the TV or monitor loop/stack length.

If the audio receiver/amplifier is required for this particular activity, and it is the first time that this activity has been tested and, thus, the number of inputs is not known, the step is performed on the audio receiver/amplifier component of the user's entertainment system.

More specifically, the remote control increments the audio receiver/amplifier input by sending to the audio receiver/amplifier the IR or RF input switching command signal, or sends the next direct addressing command signal (for audio receiver/amplifiers having direct input addressing) to emulate a sequential input command. The remote control prompts the user to "press SEL until you hear the activity's audio again".

The remote control increments the audio receiver/amplifier input repeatedly and keeps the count (for audio receiver/amplifiers with one input switching command), until the user reports to the remote control (by pressing a push button switch or key on the remote control) that he hears the audio again. The remote control now knows the length of the audio switching loop. For audio receiver/amplifiers having direct addressing, the audio receiver/amplifier will now be on the correct input, and the remote control will know what the IR or RF command is that got the audio receiver/amplifier to the correct input, since it was the last IR or RF command that was sent by the remote control, and the user responded that he hears audio from the amplifier when the audio receiver/amplifier is on this last switched input.

If the audio receiver/amplifier uses an input switching command, then the remote control stores in its memory 12 the amplifier loop/stack length. Otherwise, the remote control uses direct commands for switching the audio receiver/amplifier.

From this first step in the one-touch user interaction subroutine, the remote control now knows the length of the audio receiver/amplifier switching loop, for audio receiver/amplifiers that use one input switching command. For audio receiver/amplifiers that use direct input commands, the remote control now knows the correct IR or RF command for the audio receiver/amplifier input to effect this activity.

The next step in the one-touch user interaction subroutine used by the remote control of the present invention is to store reference audio or video information as well as additional audio or video information. More specifically, the remote control stores in its memory 12 the first audio receiver/amplifier activity (that is, the first activity that requires an audio receiver/amplifier). If the audio receiver/amplifier uses one input command to switch inputs, then this first input becomes the "reference", like the first video input used on a TV. If this is the first time that the audio receiver/amplifier is used, then the remote control stores the activity information (inputs, etc.) in the audio stack as the reference (for example, at Input 1/Slot N). If the audio receiver/amplifier uses direct addressing, then just the command is stored.

Then, the remote control stores in its memory 12 additional audio receiver/amplifier activities (that is, other activities that require an audio receiver/amplifier) as Activities 2, 3, 4, etc.

In this procedure, the remote control stores the first TV or monitor activity (that is, the first activity that requires the TV or monitor) as the reference. If a TV or monitor is used in the activity, then the activity is stored in the video stack as the reference at Input 1/Slot N (reference).

After that, additional activities (Activities 2, 3, 4, etc.) involving the TV or monitor and a video input, are stored in the remote control in the TV or monitor stack in the appropriate input N/slot N location relative to the first video activity reference. For example, a second activity, using a VCR, might be stored at Input 2/Slot N+x, where x is how many inputs this second video source is from the reference.

Then, the remote control stores in its memory 12 all of the input switching information, the component information, and the activity information needed for the remote control to play back any of the activities and automatically set up the entertainment system for the "guided/one-touch" playback of information to the user displayed on the LCD 16 of the remote control to effect a desired activity selected by the user using a simple "one touch" operation. The stacks and activity positions are now set up in the memory 12 of the remote control and are never changed.

Figure 27A:
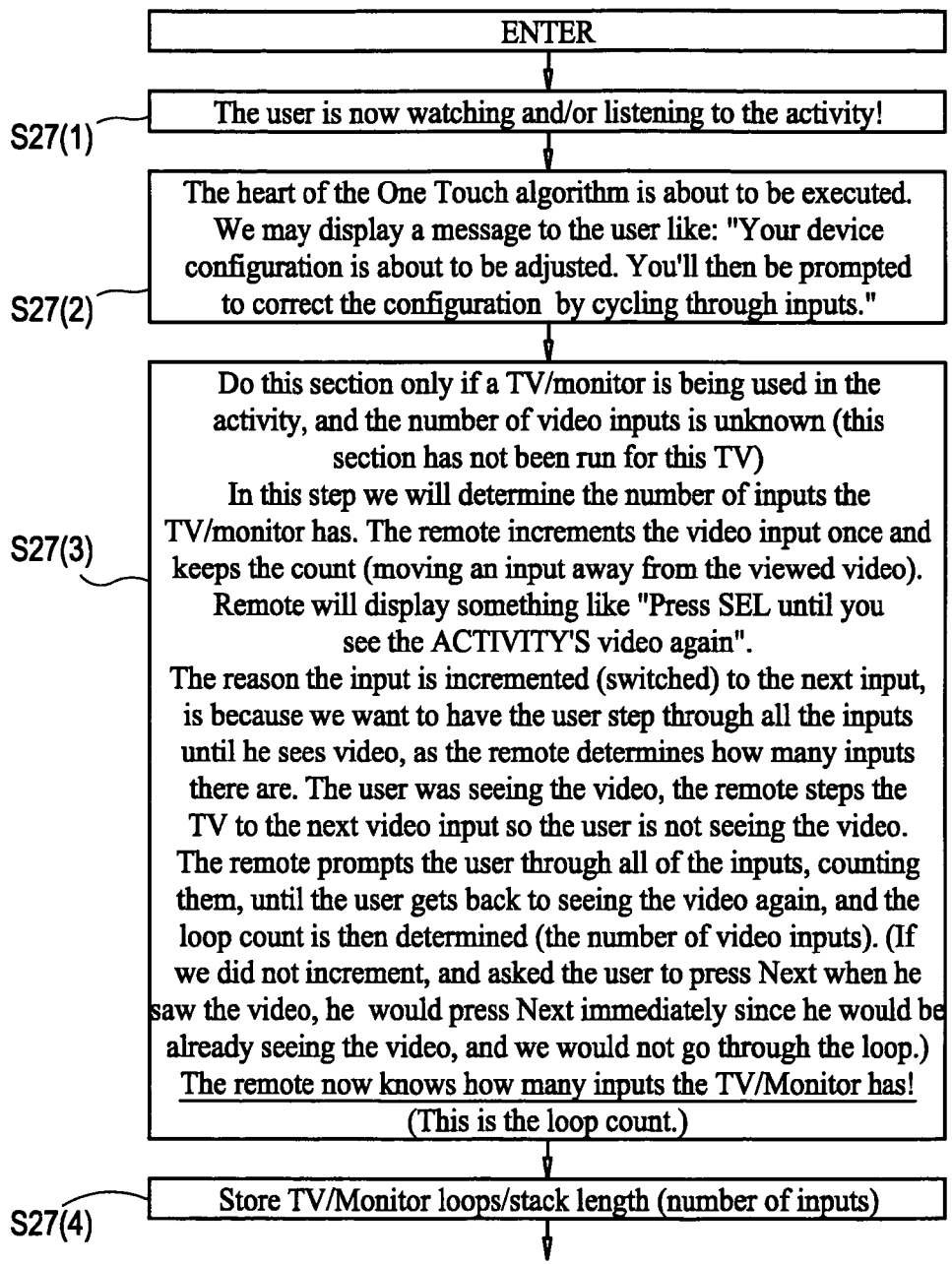
FIG. 27 (a)-(c) is a flow chart for the routine "One-Touch User Interaction Algorithm" used by the remote control of the present invention in the "guided/one-touch" mode of operation.
Figure 27B:
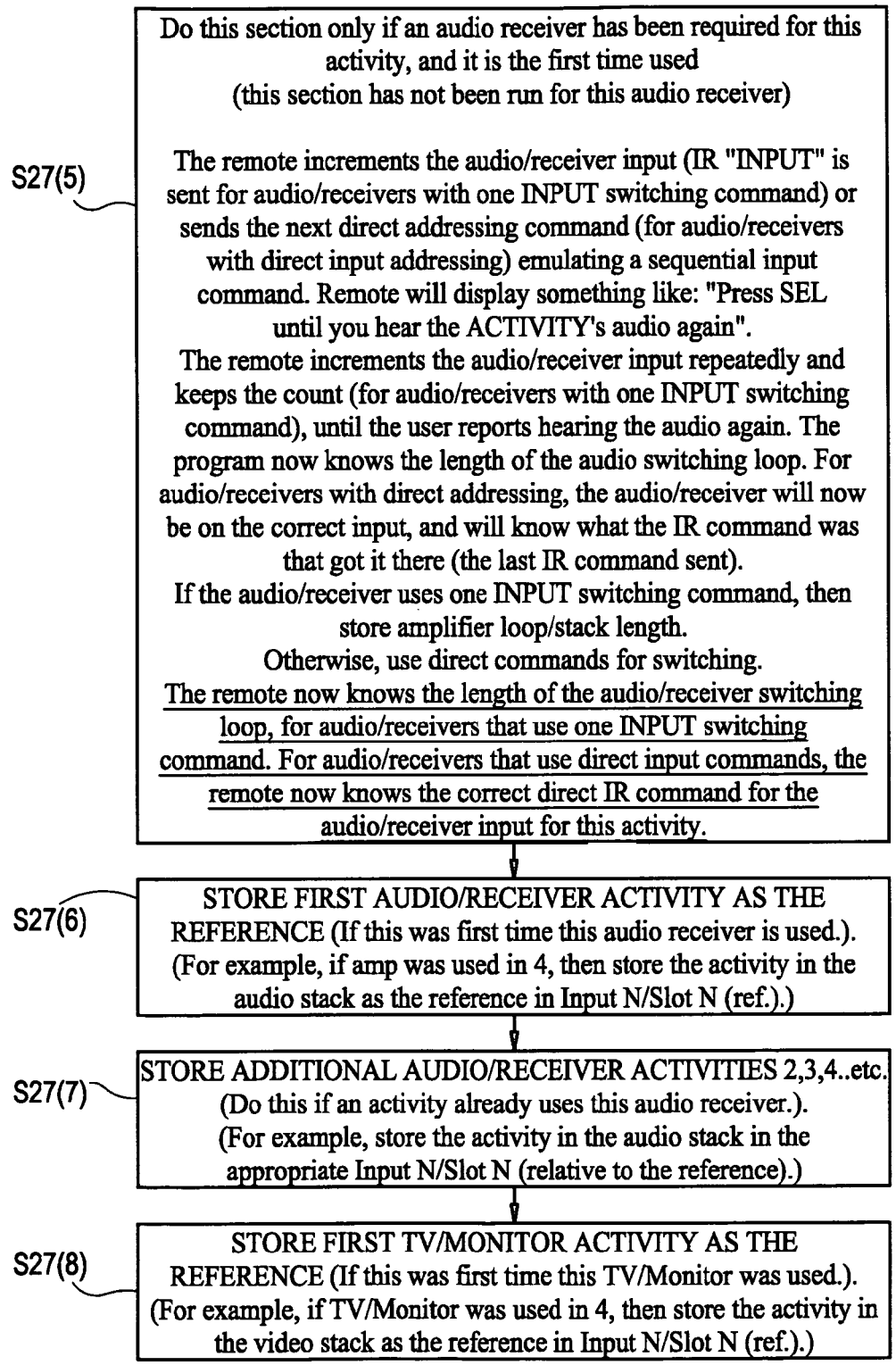
Figure 27C:
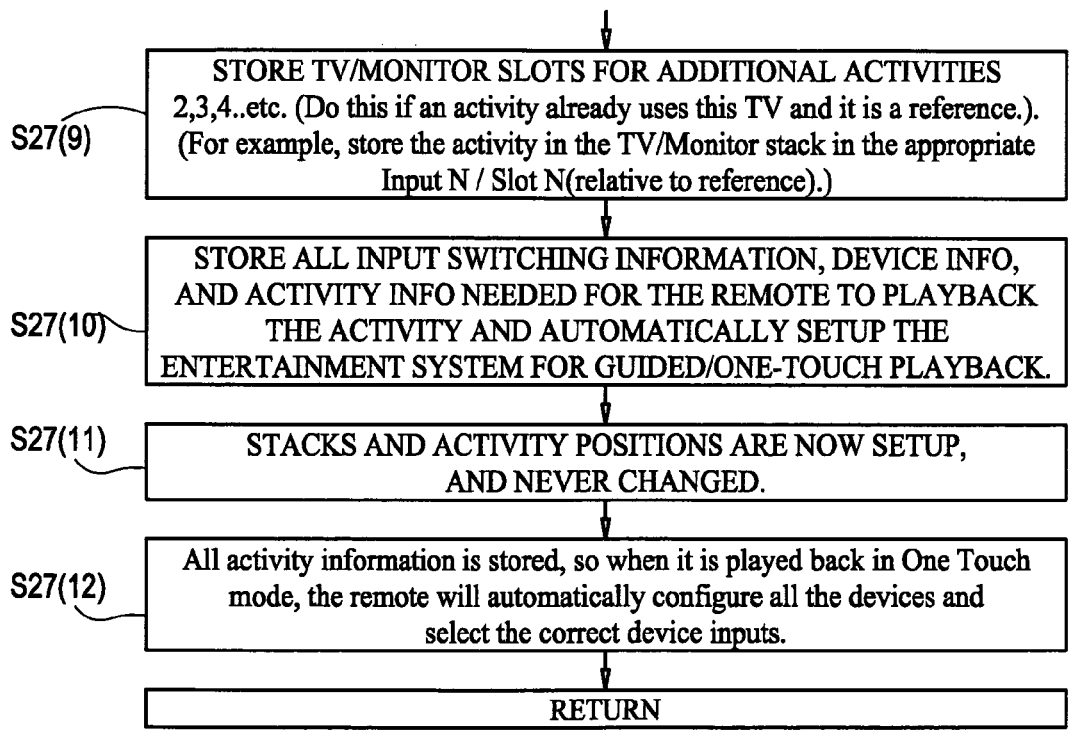

A flow chart for the one touch user interaction algorithm subroutine is shown in FIG. 27, and includes the steps S27(1)-S27(12), the steps S27(1)-S27(12) having been described previously.

A pseudo-source code for a preferred form of the subroutine or function "Audio-Input-Loop" is set forth below in Table III.

TABLE III

Function AUDIO-INPUT-LOOP

```
// COMMENT:   Generally, sets audio amp to each audio input, asking user when desired
              audio is heard,
//            and exiting when desired audio is heard.
N=0
DEFAULT-MAX-AUDIO-INPUTS = 14    (integer as appropriate)
    LOOP
        Press "SEL" Key until you hear ACTIVITY audio, then press "NEXT"
        if AudioReceiver uses a single INPUT command for all inputs (info from
        database) THEN
            Send the IR INPUT command
            ELSE  (AudioReceiver uses direct (separate) commands for each input)
            Send the next Direct IR input command
        ENDIF
        Call "Flash screen or something to show action" (while IR command is sent)
        IF "NEXT" THEN
            RETURN PASS
        ENDIF
        N=N+1
        if ( N >= DEFAULT-MAX-AUDIO-INPUTS)   OR (About to repeat a direct
        input command)   THEN
            RETURN FALL
        ENDIF
    ENDLOOP
                                                                     /
END Function
```

Figure 28:
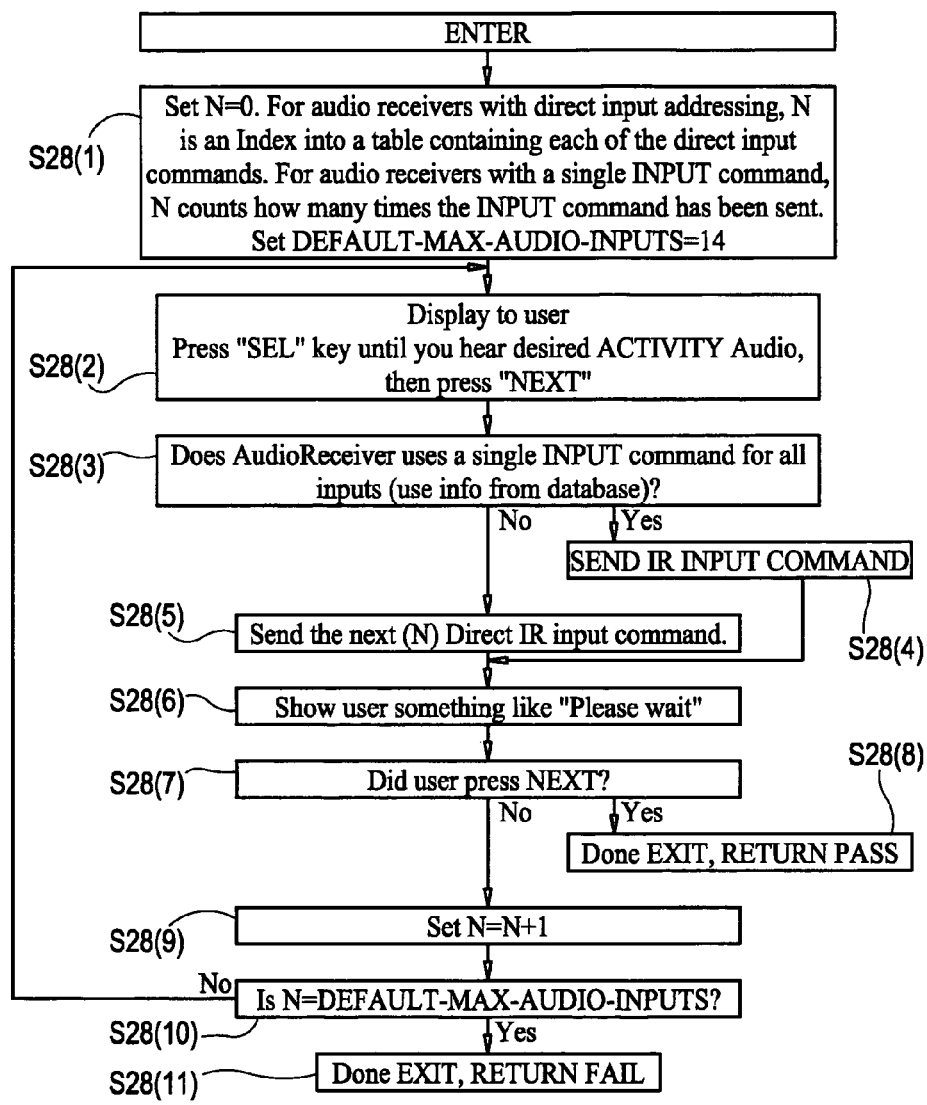
FIG. 28 is a flow chart for the routine "Audio-Input-Loop" used by the remote control of the present invention in the "guided/one-touch" mode of operation.

A flow chart for the subroutine or function "Audio-Input-Loop" is shown in FIG. 28 and includes the steps S28(1)-S28(11). In accordance with the preferred form of the subroutine, the variable N is initially set to zero (step S28(1)). For audio receiver/amplifiers having direct input addressing, N is an index into a table stored in the memory 26 of the remote control containing each of the direct input commands. For audio receiver/amplifiers having a single input command, N is a count of how many times the input command has been sent.

Next, in accordance with the subroutine, the variable "Default-Max-Audio-Inputs" is set to 14 (step S28(1)). The reason why this variable is set to 14 is because it has been found that the most number of inputs found on currently-marketed audio receiver/amplifiers is 14 or less. The variable could be arbitrarily set to a much higher number, for example, 99, but this would mean that the audio loop would be made unnecessarily much longer and would take an inordinate amount of time for the user to go through the entire audio loop and advise the remote control whether he hears audio each time he presses the "INPUT" key (i.e., 99 times). Then, in accordance with the flow chart shown in FIG. 28, the remote control displays on its LCD 16 a prompt to the user to press the select "SEL" key until the user hears audio for the desired activity, and then the user is instructed to press the push button switch (preferably, a soft key) entitled "NEXT" (step S28(2)).

The next step of the subroutine is for the remote control to determine whether the audio receiver/amplifier uses a single input command for all inputs, and the remote control makes this determination from the information it has in a data base forming part of its memory 26 (step S28(3)). If the audio receiver/amplifier does not use a single input command for all inputs, then the remote control sends to the audio receiver/amplifier the next (N) direct input command by way of an IR or RF signal (step S28(5)). If the audio receiver/amplifier does, indeed, use a single input command, then the remote control sends the input command by way of an IR or RF signal to the audio receiver/amplifier (step S28(4)).

Continuing with the flow chart shown in FIG. 28 for the function "Audio-Input-Loop", the remote control then displays on its LCD 16 a prompt to the user to wait while the remote control is running the test to determine the proper input for the user to hear sound from the audio receiver/amplifier (step S28(6)).

The subroutine waits until the user presses the "NEXT" soft key (step S28(7)). If he does, then the subroutine is completed, and the remote control exits the program (step S28(8)), and records in memory 12 the input of the audio receiver/amplifier used to obtain audio for the user to listen to. If the user does not press the "NEXT" key after a certain period of time has elapsed, then the remote control increments the variable N by one (step S28(9)). Then, the remote control, according to the subroutine, determines whether N is equal to the earlier-set variable "Default-Max-Audio-Inputs" (step S28(10)). If N does equal this preset threshold, then the remote control knows that it has cycled through all of the possible inputs of the audio receiver/amplifier without the user hearing any audio sound from the audio receiver/amplifier (step S28(11)), and the remote control signals the microprocessor 10 that no audio was heard by the user after cycling through the inputs of the audio receiver/amplifier. If the variable N does not equal the preset threshold value "Default-Max-Audio-Inputs", then the remote control in this program proceeds to step S28(2) to cycle through the routine, including the steps S28(2) through S28(11).

Figure 29:
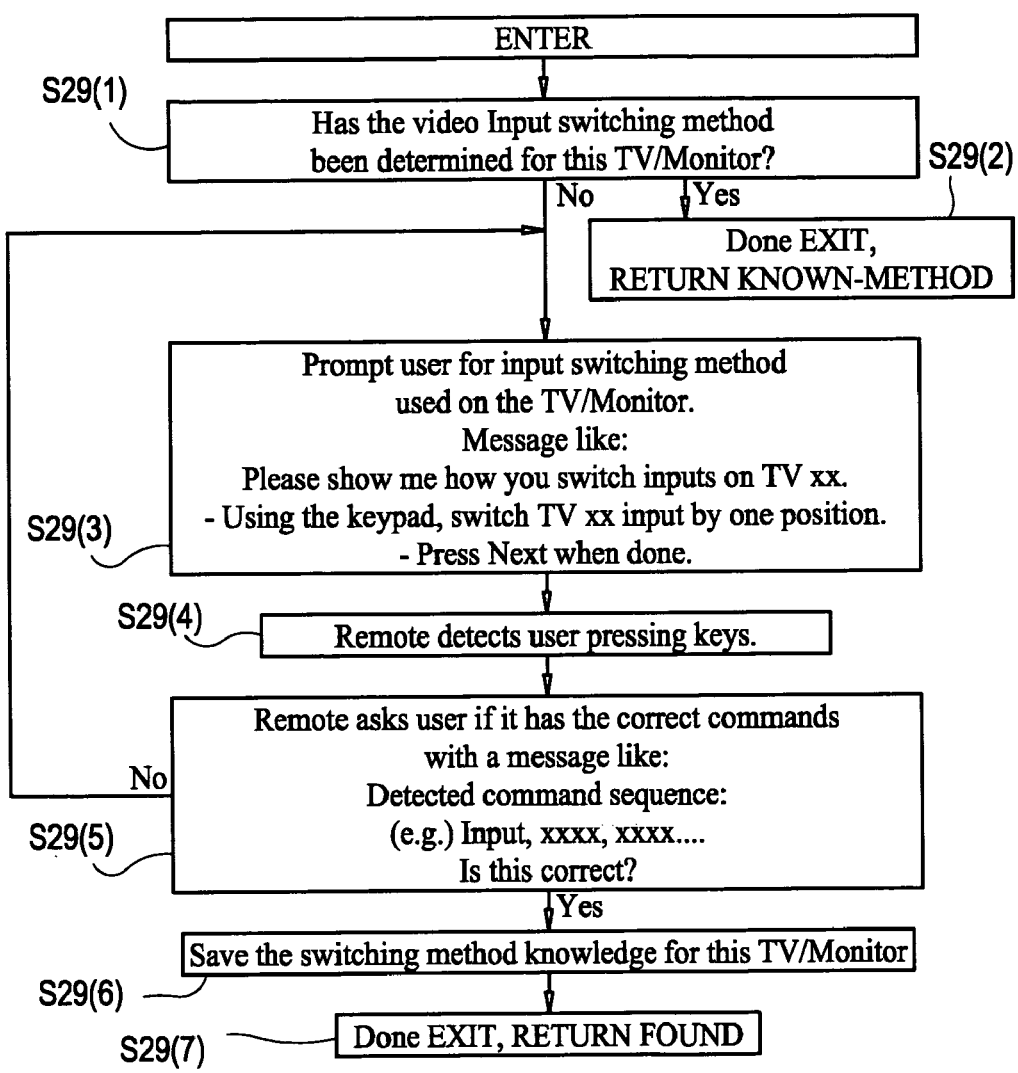
FIG. 29 is a flow chart for the routine "Determine-Video-Input-Switching-Method" used by the remote control of the present invention in the "guided/one-touch" mode of operation.

The subroutine or function referred to as "Determine-Video-Input-Switching-Method" used by the remote control of the present invention and referred to previously will now be described in detail. A flow chart for this subroutine is shown in FIG. 29.

First, in accordance with this subroutine, the remote control determines whether the video input switching method has been determined for the particular TV or monitor included in the user's entertainment system (step S29(1)). If the remote control determines that the input switching method has, indeed, been determined, then the remote control exits this subroutine and conveys to the microprocessor 10 that the switching method is known (step S29(2)).

If the video input switching method has not yet been determined, then the remote control prompts the user using a message displayed on the LCD 16 to demonstrate how the user switches inputs on the TV or monitor (step S29(3)). The user is instructed to use the keypad of the remote control to switch inputs on the TV or monitor by one position and to press the soft key "NEXT" when this has been accomplished (step S29(3)). An example of a screen displayed by the remote control to prompt the user to demonstrate how he switches inputs on his TV or monitor is shown in FIG. 30.

The remote control detects when the user presses the "NEXT" key (step S29(4)). Then, the remote control asks the user on its LCD 16 if the remote control has the correct commands, such as displaying a message in the form of "Detected Command Sequence: (e.g.) Input, xxxx, xxxx . . . . Is this correct?" (step S29(5)). An example of a screen displayed by the remote control in this respect is shown in FIG. 31. If the user responds by pressing a soft key labeled "YES", then the remote control saves the switching method knowledge it has obtained for the particular TV or monitor in memory 12 for later use (step S29(6)), and exits the program and alerts the microprocessor 10 that the video input switching method has been found (step S29(7)).

If the user presses the soft key "NO" in response to the message in step S29(5), then the remote control cycles through the program to repeat steps S29(3)-S29(5).

The result of running through this subroutine is that the remote control now knows how to switch the video inputs. This switching method information for the particular TV or monitor is stored in memory 12, and the determination of the switching method need not be repeated again for the particular TV or monitor.

In the preferred form of the method of the present invention, the aforementioned subroutine or function requires the user to know the key sequence to switch video inputs on his or her TV or monitor. An alternative method would be for the remote control to send out IR or RF command signals of video input switching sequences that have been found to be used in televisions currently in the marketplace. The most commonly found sequences would be sent to the TV or monitor first by the remote control. For example, the IR or RF command signals may be "Input, Down Arrow, Enter", or possibly "Input, Input", referring to the standard designation or labels of keys found on a conventional remote control and on the remote control of the present invention.

Now, the function or subroutine referred to as "Get-The-User-Watching-A-Tuner-Channel" will be described. A pseudo-source code for this function or subroutine is shown in Table IV below.

TABLE IV

Function GET-THE-USER-WATCHING-A-TUNER-CHANNEL

```
//COMMENT:   When this function is exited, the user must be watching a TV channel
//           from the tuner.
IF NOT yet Determined if the Tuner is in the input loop for this TV THEN
     CALL VIDEO-INPUT-LOOP        (Determines if the Tuner is in the input loop.)
     IF VIDEO-INPUT-LOOP returns FAIL THEN      (Tuner not in loop)
          Remote now knows the Tuner is NOT in the loop! (remote stores this
     info)
          CALL Handle-Tuner-NOT-In-Video-Loop (User enters channel directly)
```

TABLE IV-continued

Function GET-THE-USER-WATCHING-A-TUNER-CHANNEL

```
            The user is watching TV channel.
                The remote must prompt the user every time to manually enter the desired
            channel,
                    OR automatically send out the current channel digits. <-diff than what we
                have but good alternative!
        ELSE
            Remote stores knowledge that the tuner is in this TV's input loop.
            The user is watching TV channel.
        ENDIF
    ELSE
        IF Tuner is in the TV's input loop THEN
            CALL VIDEO-INPUT-LOOP       (Gets to the tuner input.)
            The user is watching TV channel.
        ELSE
            CALL Handle-Tuner-NOT-In-Video-Loop    (User enters channel directly)
            The user is watching TV channel.
        ENDIF
    ENDIF
END Function
```

Figure 32:
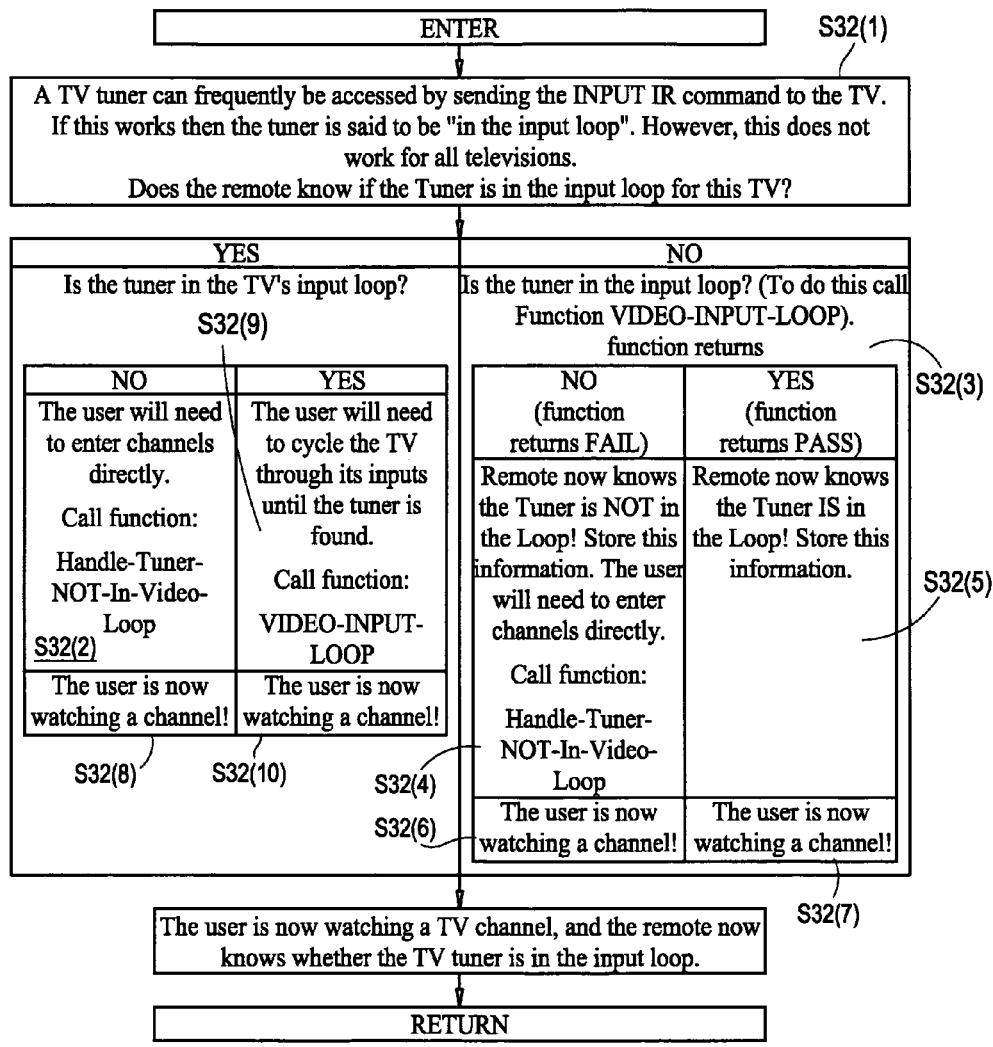
FIG. 32 is a flow chart for the routine "Get-The-User-Watching-A-Tuner-Channel" used by the remote control of the present invention.

A flow chart for the program "Get-The-User-Watching-A-Tuner-Channel" is shown in FIG. 32. Referring to FIG. 32, a TV tuner can frequently be accessed by sending the "Input" IR or RF command signal to the TV or monitor. If this works, then the tuner of the TV or monitor is said to be "in the input loop". However, this may not work for all televisions. Therefore, the remote control of the present invention must determine whether the tuner for the TV or monitor is in the input loop.

Therefore, the first step is to determine whether the remote control knows if the tuner is or is not in the input loop for the particular TV or monitor used in the entertainment system (step S32(1)).

If the remote control does not know if the tuner is, or is not, in the input loop, then the remote control must make this determination, and the subroutine referred to as "Video-Input-Loop" is executed (step S32(3)). The result of this subroutine is either a "fail", that is, it is determined that the tuner is not in the input loop (step S32(4)), or a "pass", which means that the remote control now knows that the tuner is in the input loop (step S32(5)). This information as to whether or not the TV tuner is in the input loop is stored by the remote control in its memory 12. If the TV tuner is found not to be in the input loop, then the user will need to enter channels directly using the remote control (step S32(4)). In such a situation, the remote control then executes the subroutine referred to as "Handle-Tuner-Not-In-Video-Loop" (step S32(4)). As a result, the user should now be able to watch a TV channel (step S32(6)). If the TV tuner is found to be in the input loop, then when the subroutine "Video-Input-Loop" has finished running, the user will have been left watching the tuner channel. Again, as a result, the user should now be watching a TV channel (step S32(7)).

If the remote control does know that the tuner is, or is not, in the input loop, then if the tuner is not in the input loop, the user will need to enter the channels directly into the remote control by pressing the push button switches (e.g., keys) on the remote control, and the remote control microprocessor will execute the subroutine referred to as "Handle-Tuner-Not-In-Video-Loop" (step S32(2)). The user should now be able to watch a TV channel (step S32(8)). If the remote control does know that the tuner is, or is not, in the input loop, then if the tuner is in the input loop, the user will need to cycle the TV through its inputs until the tuner is found. This is done with the subroutine "Video-Input-Loop" (step S32(9)). When the subroutine "Video-Input-Loop" has finished running, the user will have been left watching the tuner channel. Again, as a result, the user should now be watching a TV channel (step S32(10)).

The result of the program "Get-The-User-Watching-A-Tuner-Channel" executed by the remote control is that the user should now be able to watch a TV channel, and the remote control now knows whether the TV tuner is, or is not, in the input loop.

Figure 33:
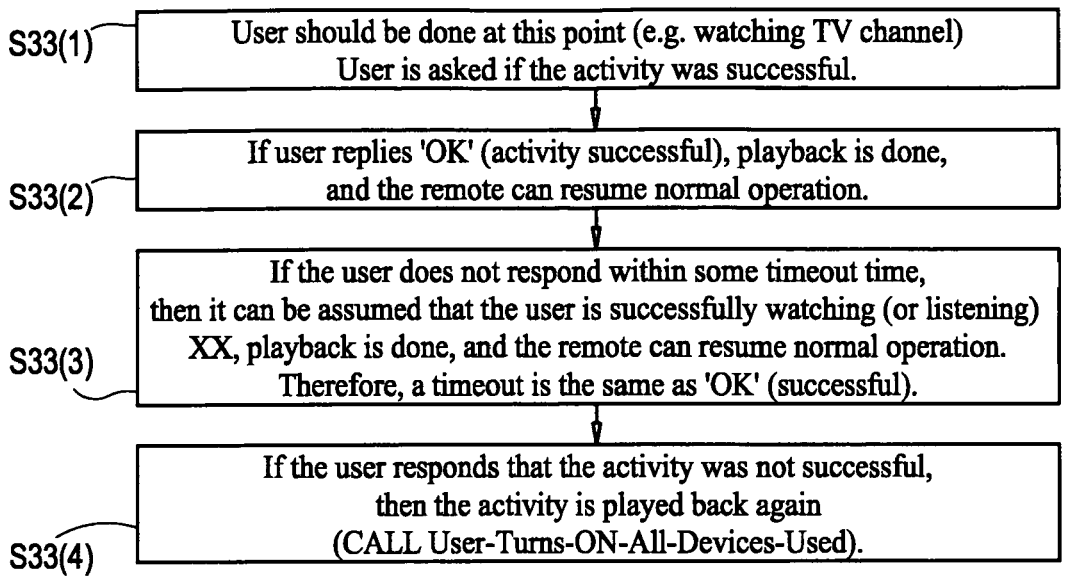
FIG. 33 is a flow chart for the routine "Handle-End-Of-Activity" used by the remote control of the present invention.
Figure 34:
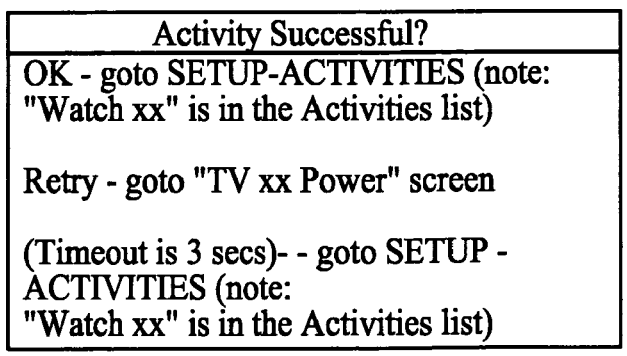
FIG. 34 is an illustration of a screen displayed by the remote control of the present invention.

The function or subroutine referred to as "Handle-End-Of-Activity" will now be described. A flow chart for the program "Handle-End-Of-Activity" is shown in FIG. 33. Furthermore, an example of a screen displayed by the remote control in connection with this program is illustrated by FIG. 34.

After using the remote control of the present invention in either the "guided only" mode or the "guided/one-touch" mode, the user should now be able to watch video or listen to audio. The remote control asks the user by displaying a message on the LCD 16 of the remote control whether the desired activity was successfully achieved (step S33(1)).

If the user responds by pressing a push button switch (e.g., a soft key) on the remote control that the activity was successful, then the playback operation is completed and the remote control can now resume its normal operation (step S33(2)). If the user does not respond within some predetermined period of time after the "activity successful" question is posed to the user, then it may be assumed by the remote control that the user is successfully watching (or listening) to his or her desired activity, and that playback by the remote control has been completed and the remote control can resume normal operations (step S33(3)). Accordingly, if the predetermined time period has timed out without the user responding to the question posed in step S33(1), then the remote control assumes that no response is the same as the response from the user that the activity was successful (step S33(3)).

If the user responds that the desired activity was not successfully achieved, then the remote control plays back the desired activity again for the user, and starts with the execution of the subroutine or program referred to as "User-Turns-On-All-Devices-Used" (step S33(4)).

Figure 35:
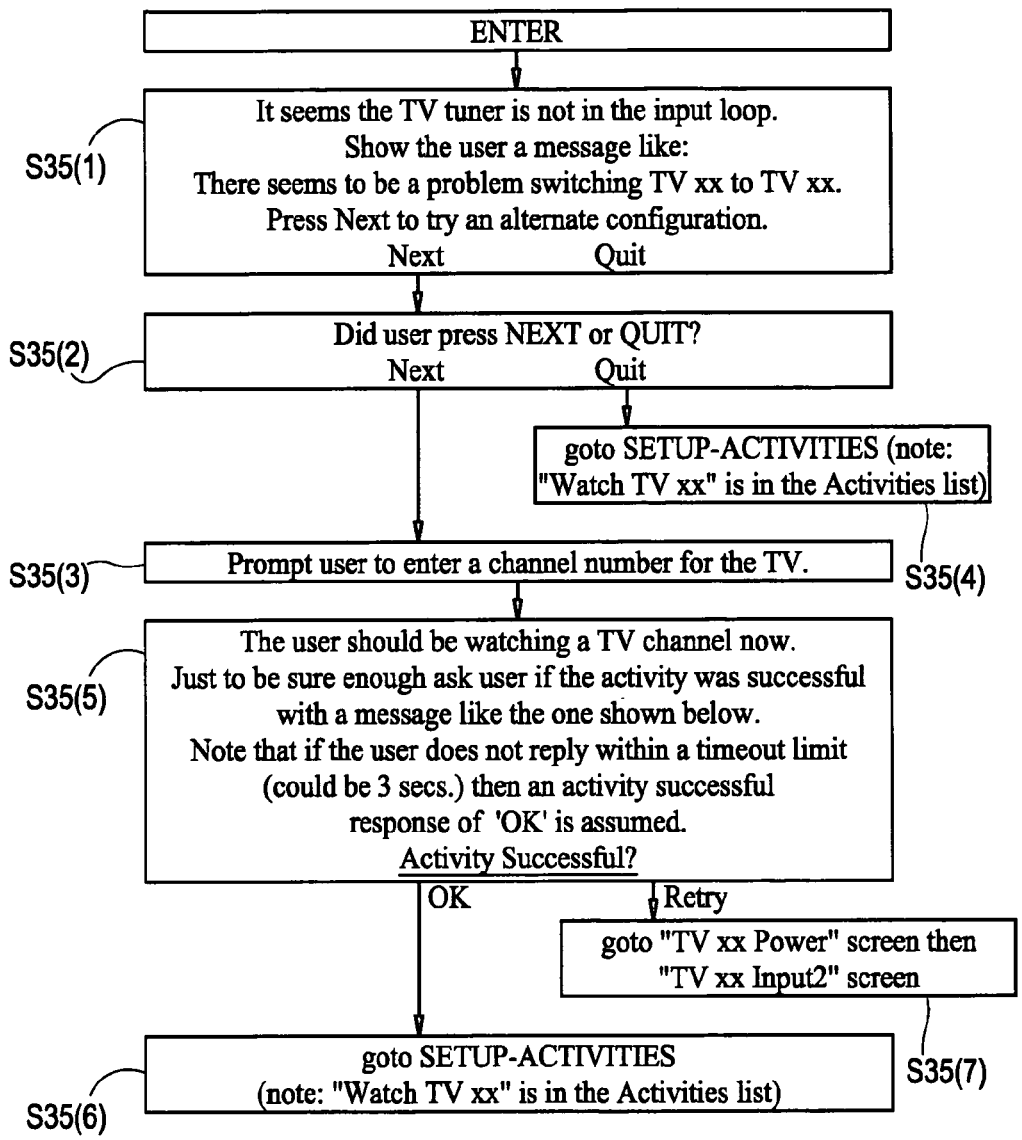
FIG. 35 is a flow chart for the routine "Handle-Tuner-Not-In-Video-Loop" used by the remote control of the present invention.
Figure 36:
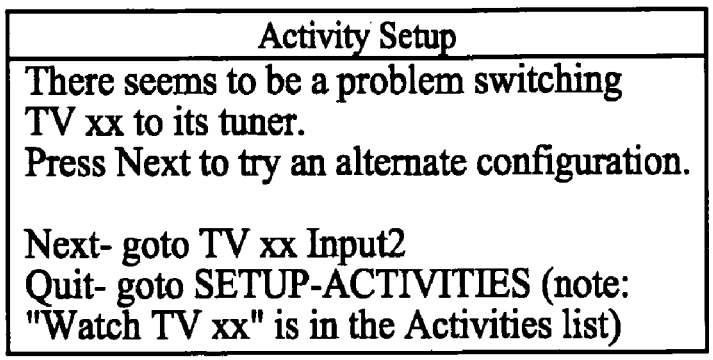
FIG. 36 is an illustration of a screen displayed by the remote control of the present invention.
Figure 37:
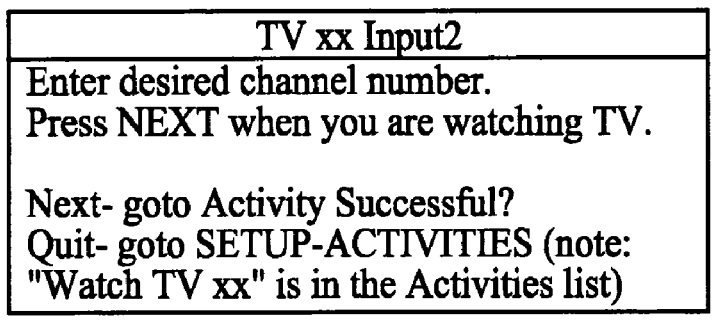
FIG. 37 is an illustration of a screen displayed by the remote control of the present invention.
Figure 38:
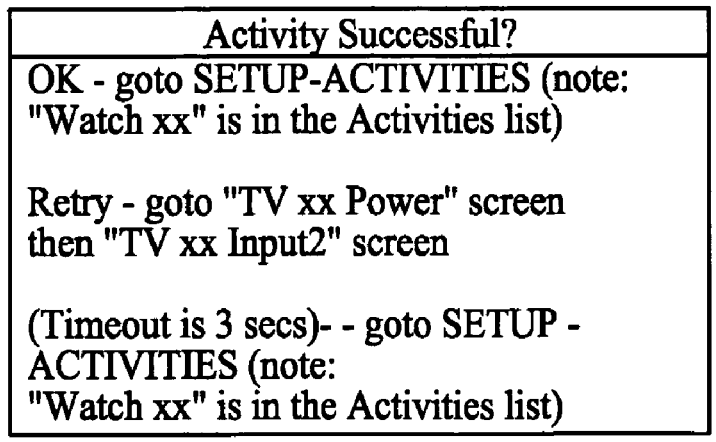
FIG. 38 is an illustration of a screen displayed by the remote control of the present invention.

The function or subroutine referred to as "Handle-Tuner-Not-In-Video-Loop" will now be described in detail, and a flow chart of this program is illustrated by FIG. 35. This program is executed when the TV tuner appears to be not in the input loop. Also, FIGS. 36-38 illustrate examples of successive screens displayed by the remote control in connection with this subroutine.

The remote control displays on its LCD 16 a message to the user such as the following: "There Seems To Be A Problem Switching TV [name chosen by user] to TV [name chosen by user]. Press NEXT to try an alternate configuration" (step S35(1)). The user may either choose the soft key labeled "NEXT" or the soft key labeled "QUIT".

Then, the remote control determines whether the user pressed the soft key "NEXT" or the soft key "QUIT" (step S35(2)). If the user pressed the soft key "NEXT", then the remote control, in accordance with the program being run, prompts the user with a message on its LCD 16 to enter a channel number for the TV (step S35(3)).

The user should be able to watch a TV channel now. However, just to be sure, the remote control asks the user on its LCD 16 whether the activity was successful (step S35(5)). If the user does not reply within a predetermined period of time, for example, three seconds, then the activity is considered to have been successfully achieved by the remote control and an affirmative response is assumed by the remote control. The remote control then goes to the "Setup-Activities routine and displays a list of "watch" activities from which the user may choose to proceed with an activity he selects. The "Watch TV [named by the user]" activity is included in the displayed activity list (step S35(6)).

However, if the user is not able to watch video, then he may press the "RETRY" soft key, and the remote control displays the "TV [named by the user] Power" screen and then the "TV [named by the user] Input 2" screen, and attempt again the procedure to get the correct inputs connected so that the user may watch video on his TV or monitor (S35(7)).

If, in response to the prompt from the remote control in step S35(2), the user presses the soft key labeled "QUIT", then the remote control executes the routine referred to as "Setup-Activities" and displays a screen on the LCD 16 having a list of "watch" activities, including the activity "Watch TV [name chosen by user]", from which the user may choose (step S35(4)).

Figure 39:
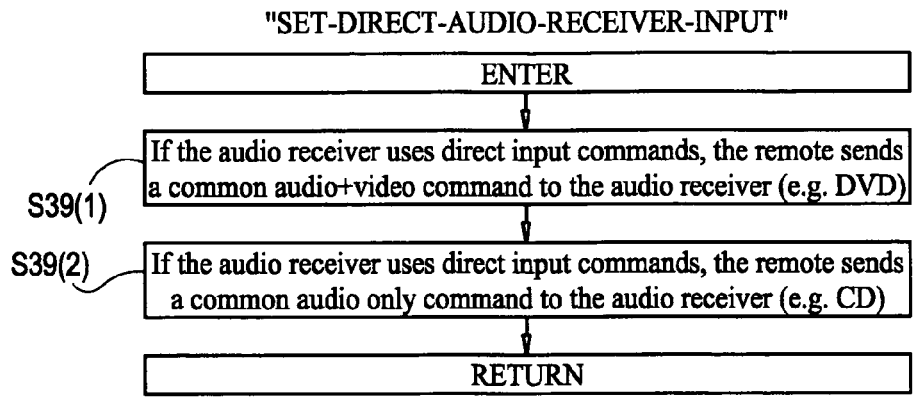
FIG. 39 is a flow chart for the routine "Set-Direct-Audio-Receiver-Input" used by the remote control of the present invention.

The subroutine for carrying out the function referred to as "Set-Direct-Audio-Receiver-Input" will now be described. The flow chart for carrying out this function is shown in FIG. 39.

If the audio receiver/amplifier uses direct input commands, then the remote control sends out a common audio and video command through an IR or RF signal to the audio receiver/amplifier (for example, a DVD) (step S39(1)), and then the remote control sends a common audio only command to the audio receiver/amplifier in the entertainment system (for example, a CD) (step S39(2)). The purpose of preferably using a commonly used input command is to maximize the chances that the audio receiver/amplifier recognizes the command. This is because frequently the user does not always select the correct IR code set, or the perfect code set for the audio receiver/amplifier that the user has does not exist (that is, it is not in the remote control's data base).

This routine referred to as "Set-Direct-Audio-Receiver-Input" actually performs several useful functions. First, the function gets the audio receiver/amplifier on a known input. If the entertainment system includes an audio receiver/amplifier that uses direct input addressing, then the remote control needs to know what input it is on. The user will be asked by the remote control if he or she is hearing the audio from the audio receiver/amplifier. If the user answers yes, then the audio part of the desired activity should now have been successfully achieved, and the remote control thus knows what the correct input is if the user is hearing the audio. In other words, by setting the audio receiver/amplifier to an input at this point (where the user hears sound from the amplifier), the remote control now knows what input is being used.

A preferred form of the subroutine "Set-Direct-Audio-Receiver-Input" determines whether the audio receiver/amplifier is on a "valid" input, even though the user is hearing audio. It has been found that users do not always use the correct code set for their audio receiver/amplifier for whatever reason. The user may use a code set for an audio receiver/amplifier that has more inputs than his audio receiver/amplifier actually has. For example, the user may have an RCA™ audio receiver/amplifier that has four inputs, that is, for DVD, CD, DVR and MP3. The user may have actually selected a code for the remote control that handles six inputs, such as DVD, CD, DVR, MP3, VID1 and FM, where the inputs VID1 and FM do not exist on his or her audio receiver/amplifier. What happens in this case is that the audio receiver/amplifier will ignore the direct codes VD1 and FM.

When the remote control is in the "guided" portion of either mode for a "watch" activity that uses the audio receiver/amplifier, the remote control needs to set the amplifier to a "valid" input.

For example, assume that a user having the four-input audio receiver/amplifier described above has selected the code that has the six input commands described above. In the "guided" mode for the Watch Case 6 described previously (see FIG. 1(*f*)), assume that the TV and audio receiver/amplifier both start on the correct inputs so that the user is seeing video and hearing audio. The remote control does not know what input the audio receiver/amplifier is on.

Assume that the audio receiver/amplifier is using the DVD input to pass video through to the TV. As stated earlier, the remote control does not know that the audio receiver/amplifier is on its DVD input. The remote control will switch the audio receiver/amplifier to an input, and ask the user if the user still hears audio. If the user answers affirmatively, that he still hears audio, then the remote control may believe that the audio receiver/amplifier has been switched to the correct input being used. However, if the remote control had sent the FM command signal to the audio receiver/amplifier, and the audio receiver/amplifier had ignored the FM command as being unrecognized and stayed on the DVD input, then the remote control may always try to use the FM command signal for the audio receiver/amplifier for this particular activity, which is being ignored by the audio receiver/amplifier.

The remote control of the present invention solves this problem by sending commands for two very common inputs, that is, DVD and CD, so that even if the user has the wrong code set, these commands will probably be in common and, therefore, switch the audio on. This, therefore, achieves the purpose of also switching to a valid input.

Even more preferably, the remote control must also know that the audio receiver/amplifier is on a valid input and maximize the chances of the remote control of finding the correct audio input. In the "guided" mode for the Watch Case 6 (see FIG. 1(*f*)), it is assumed that the TV and audio receiver/amplifier both start on the correct inputs so that the user is seeing video and hearing audio, but the remote control does not know what input the audio receiver/amplifier is on. So, the remote control will go through all of the inputs until the user hears the desired audio.

However, there can be two problems with just doing this. First, if the remote control does not know what input is being used initially when the entertainment system is turned on, but the user is hearing audio, that could result in a problem with respect to knowing whether the input is a valid input or not.

Second, in that same situation, if the remote control sends out another command signal to the audio receiver/amplifier that happens to be an invalid command for that receiver/amplifier, such as VID1, and the receiver does not switch inputs in response to the invalid command but the user may still be hearing audio, this could result in a problem as well. So, the remote control starts in the "guided" mode sequence by trying to put the audio receiver/amplifier on a common input which is likely to be valid, which may or may not have the desired audio being outputted by the audio receiver/amplifier. For that reason, the remote control tries two codes, that is, a DVD command and then a CD command. Also, as the different direct codes are sent after them, the first code that has the desired audio will be the correct audio input code. This method has then maximized the chances of the remote control finding the correct audio input. Finding the correct code set for a device is problematic in that there is no way to be certain that the code set is correct without having the user know his model number and entering it somehow, so that the exact/correct code can be looked up. Also, the perfect code set for the device may not be in the data base at all, but the user is able to find one that "mostly" works. What frequently happens for the audio receiver/amplifier is that a user finds a code that generally mostly works, but the code may have additional discrete commands that the audio receiver/amplifier does not recognize, or may even lack some of the commands that the audio receiver/amplifier would recognize. When just trying to switch the audio receiver/amplifier so the user is not hearing audio, or switching video through the audio receiver/amplifier, the algorithm or procedure used by the remote control uses the most common discrete commands to try to maximize the chances of this switching being successful. For example, referring to audio receiver/amplifiers with discrete inputs, "DVD" is a common input. Therefore, if the remote control wants to try to switch inputs, transmitting the DVD command stands a good chance of working. However, if the remote control sent an uncommon command, for example, "VIDEO5", which the user may have in the imperfect code set he chose, then the audio receiver/amplifier may not respond to it, and the user may still be hearing the audio, which confuses the algorithm used by the remote control.

The function and subroutine used by the remote control of the present invention referred to as "User-Turns-On-All-Devices-Used" will now be described. The pseudo-source code for this subroutine is shown in Table V below.

TABLE V

Function USER-TURNS-ON-ALL-DEVICES-USED

Figure 40:
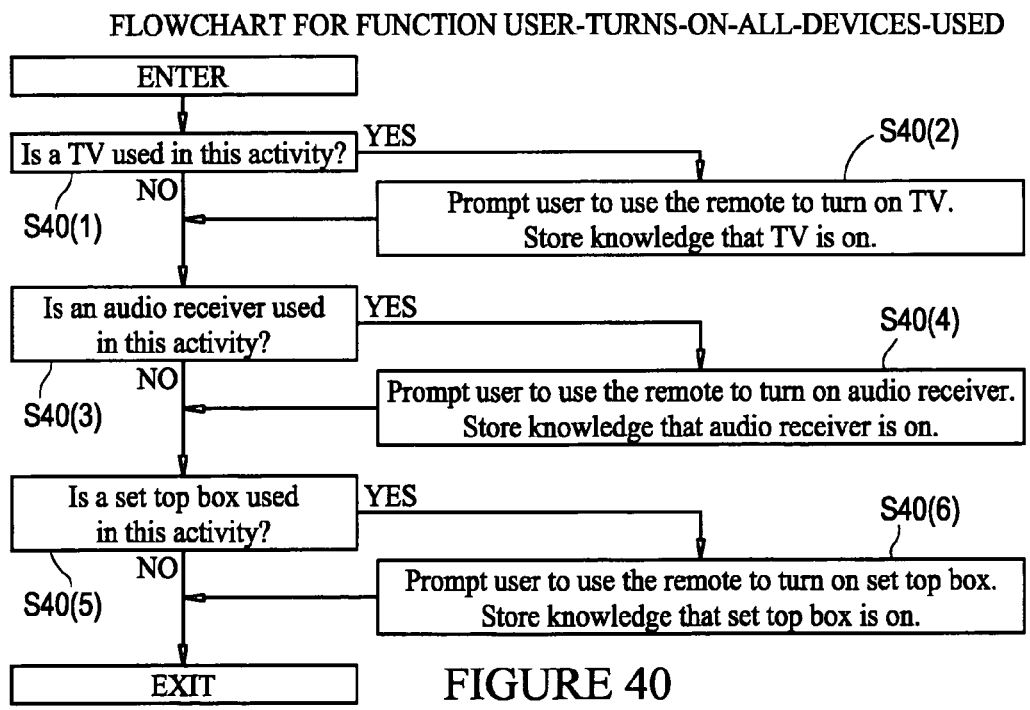
FIG. 40 is a flow chart for the routine "User-Turns-On-All-Devices-Used" used by the remote control of the present invention.

// COMMENT:   Generally, for all devices being used in an activity,
             prompts user to turn each ON.
   IF TV/Monitor is to be used THEN
   Prompt user to turn TV/Monitor ON
       (e.g. Is your TV on? If not, press SEL to turn TV on)
       Store knowledge that the TV is ON.
   ENDIF
   IF AUDIO/RECEIVER is to be used THEN
   Prompt user to turn AUDIO/RECEIVER ON
       Store knowledge that the AUDIO/RECEIVER is ON.
   ENDIF
   IF STB is to be used THEN
   Prompt user to turn STB ON
       Store knowledge that the STB is ON.
   ENDIF
END Function A flow chart for implementing this function (i.e., "User-Turns-On-All-Devices-Used") is illustrated by FIG. 40.

In this program, the user is prompted by the remote control to turn on all of the components that are required for a desired activity. In step S40(1) of the routine, the remote control determines whether a TV is used for this activity, and if the remote control determines that a TV is used ("Yes"), then the user is prompted by the remote control with a displayed screen to press the select "SEL" key to turn the TV on, and press the "NEXT" soft key once he observes that it is on (step S40(2)). The remote control stores in its memory 12 that the TV is on (step S40(2)).

In step S40(3) of the routine, the remote control determines if an audio receiver/amplifier is used for this activity, and if an audio receiver/amplifier is used ("Yes"), then the user is prompted by the remote control to press the select "SEL" key to turn on the audio receiver/amplifier, and press the "NEXT" soft key once he observes that it is on (step S40(4)). The remote control stores in its memory 12 that the audio receiver/amplifier is on (step S40(4)).

In step S40(5) of the routine, the remote control determines if an STB is used for this activity, and if the remote control determines that an STB is used ("Yes"), then the remote control prompts the user to press the select "SEL" key to turn the STB on, and press the "NEXT" soft key once he observes that it is on (step S40(6)). The remote control stores in its memory 12 that the STB is on (step S40(6)).

Figures 41, 42:
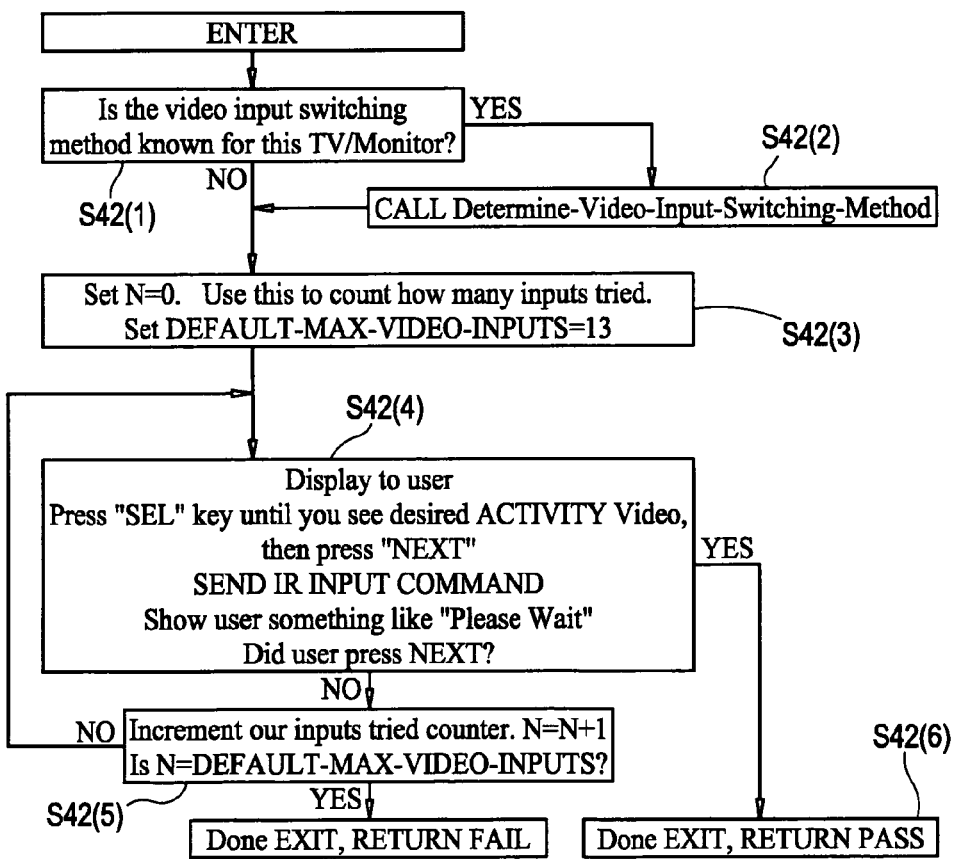
FIG. 41 is an illustration of a screen displayed by the remote control of the present invention.
FIG. 42 is a flow chart for the routine "Video-Input-Loop" used by the remote control of the present invention.

An example of a screen displayed by the remote control to prompt the user to turn on his TV is shown in FIG. 41.

Next, the function and subroutine referred to as "Video-Input-Loop" will now be described. A flow chart for implementing the function and subroutine "Video-Input-Loop" is shown in FIG. 42, and a pseudo-source code for this function is set forth in Table VI below.

TABLE VI

Function VIDEO-INPUT-LOOP

// COMMENT:   Generally, sets TV/monitor to each video input,
             asking user when desired video is seen,
//           then exiting when desired video is seen.
IF the video input switching method is not known for this display device
THEN
CALL Determine-Video-Input-Switching-Method
ENDIF
N=0      // A counter for the number of inputs tried.
DEFAULT-MAX-VIDEO-INPUTS = 13      //(integer as appropriate)
   LOOP
       Press "SEL" key until you see desired ACTIVITY Video,
       then press "NEXT" e.g.
       Call "Flash screen or something to show action"
       if "NEXT" is pressed THEN
           RETURN PASS
       ENDIF
       N=N+1          //Increment counter
       IF N = DEFAULT-MAX-VIDEO-INPUTS THEN
           RETURN FAIL
       ENDIF
   ENDLOOP
END Function In accordance with this subroutine, the remote control of the present invention generally sets the TV or monitor to each video input, asking the user when the desired video is seen, and then exiting the subroutine thereafter. As shown in the flow chart of FIG. 42, the remote control determines whether the video input switching method is known for the particular TV or monitor used in the entertainment system (step S42(1)). If the video input switching method is known, then the remote control will execute the subroutine referred to as "Determine-Video-Input-Switching-Method" (step S42(2)). If the video input switching method is not known by the remote control, or after the subroutine "Determine-Video-Input-Switching-Method" is executed in step S42(2), then the remote control sets the variable N to zero, and uses this initial setting of N to count how many inputs have been tried and tested by the remote control (step S42(3)). The remote control also sets the variable "Default-Max-Video-Inputs" to 13, which appears to be the highest number of video inputs found on currently marketed televisions, so that the query posed and procedure implemented by the remote control to determine the number of video inputs is not prolonged (step S42(3)). A similar method was described previously in relation to the routine "Audio-Input-Loop" shown in FIG. 28.

Then, the remote control displays to the user instructions to press the select "SEL" key until the user sees the desired activity video, and then he or she is to press the soft key "NEXT" (step S42(4)). The remote control sends input commands using IR or RF signals to the video component (e.g., the TV or monitor) of the entertainment system to cycle through the various inputs used on the component (step S42(4)). The remote control prompts the user on the LCD 16 to wait as the remote control sends out switching input commands to change inputs (step S42(4)).

Then, the remote control determines whether the user pressed the "NEXT" soft key (step S42(4)). If the user did press the "NEXT" key, meaning that the user sees video with respect to the most currently switched input, then the remote control has finished its query as to the number of inputs in the video loop and exits the program, and advises the microprocessor 10 that it has successfully completed the routine (step S42(6)). If the user responds to the question posed by the remote control in step S42(4) by pressing the "NO" soft key on the remote control, meaning that he or she did not see any video on the TV for the input selected by the remote control, then the remote control will increment a counter in the microprocessor 10 which counts the number of inputs that are tried by one, that is, N=N+1 (step S42(5)).

If it is determined that N equals the variable "Default-Max-Video-Inputs", which was initially set to the number 13 in step S42(3), then the subroutine is completed, and the remote control reports to the microprocessor 10 that this procedure has failed to find the correct input which provides video to the TV or monitor, in response to observations of the user reporting not seeing any video on the TV (step S42(7)). However, if N does not equal the variable "Default-Max-Video-Inputs" (initially set to 13), then the routine is repeated for steps S42(4)-S42(5).

The subroutine for carrying out the function referred to as "Watch-STB-With-Audio-Receiver" will now be described. A pseudo-source code for carrying out this function is shown in Table VII below.

TABLE VII

| Function WATCH-STB-WITH-AUDIO-RECEIVER |
| --- |
| StatusVideo=CALL VIDEO-INPUT-LOOP |
| StatusAudio=CALL AUDIO-INPUT-LOOP |
| IF StatusVideo=PASS AND StatusAudio=PASS THEN |
|     EXIT done |
| ELSE StatusVideo=FAIL AND StatusAudio=PASS THEN |
|     CALL VIDEO-INPUT-LOOP |
| ENDIF |
| // COMMENT Here are all cases |
| //    StatusVideo=CALL VIDEO-INPUT-LOOP |
| // |
| //    StatusAudio=CALL AUDIO-INPUT-LOOP |
| // |
| //    IF StatusVideo=PASS AND StatusAudio=PASS THEN |
| //        // Case 3    AVsrc (A+V) → TV/MONITOR |
| //        // Case 4    AVsrc (A+V) → TV/MONITOR, TV/MONITOR (A) → Aamp |
| //        // Case 5    AVsrc (V) → TV/MONITOR; AVsrc (A) → Aamp |
| //    EXIT (User is happy) |
| //    ELSEIF StatusVideo=FAIL AND StatusAudio=FAIL THEN |
| //        //Should never get here... |
| //        EXIT |
| //    ELSEIF StatusVideo=PASS AND StatusAudio=FAIL THEN |
| //        //Should never get here... |
| //        EXIT |
| //    ELSEIF StatusVideo=FAIL AND StatusAudio=PASS THEN |
| //        StatusVideo=CALL VIDEO-INPUT-LOOP |
| //        // Case 6 AVsrc (A+V) → Aamp, Aamp (Vout) → TV/MONITOR |
| //    ENDIF |
| //    END Function |
| // COMMENT |
| //    The WATCH-STB-WITH-AUDIO-RECEIVER function does the following: |
| // |
| //    Have user cycle through all video inputs looking for the input with STB video. |
| //    Have user cycle through all audio inputs listening for the input with STB audio. |
| //    IF STB video is found and STB audio is heard THEN |
| //        DONE exit |
| //    ELSE IF STB video is NOT found but STB audio is heard THEN |
| //        Video was going through AUDIO/RECEIVER to TV and |
| //        AUDIO/RECEIVER was not on correct input, so user |
| //        never saw video on TV ! CALL VIDEO-INPUT-LOOP again |
| //        now that AUDIO/RECEIVER is on correct input, and the |
| //        video should be found on some input! |
| //    CALL VIDEO-INPUT-LOOP |
| //    ENDIF |

Figure 43A:
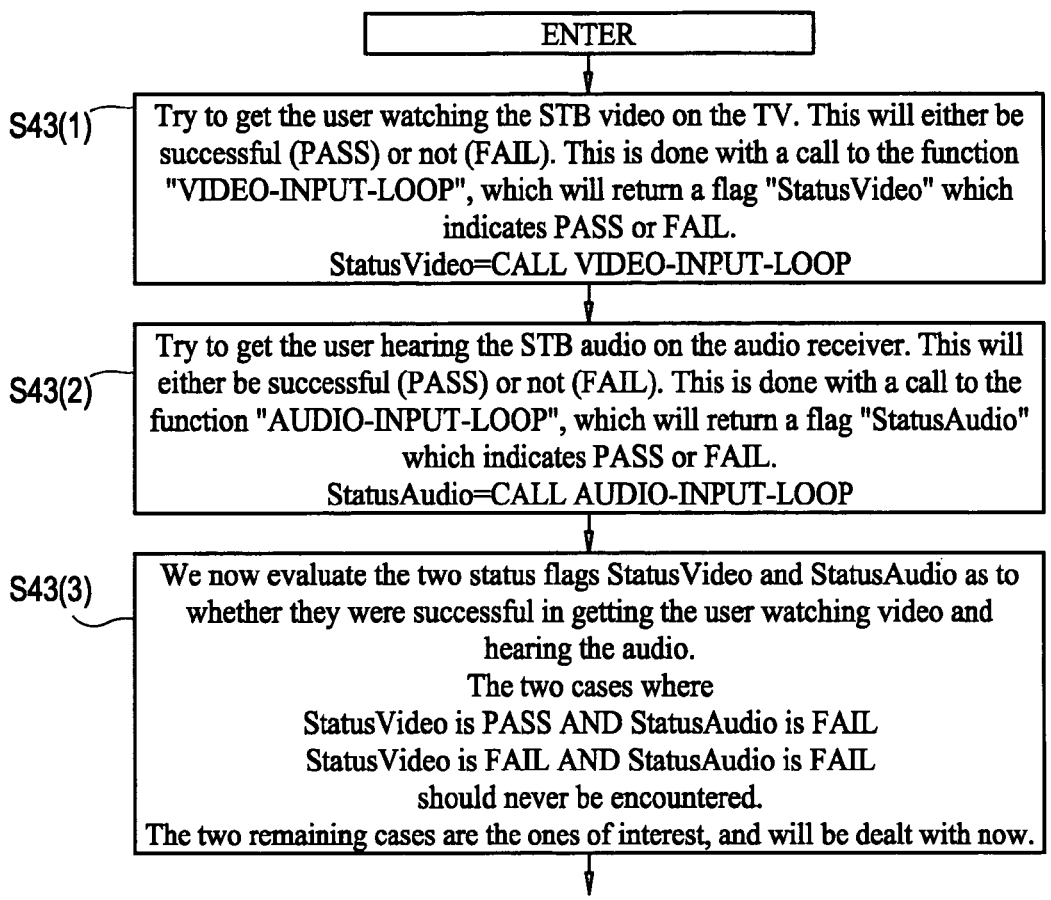
FIG. 43 (a)-(b) is a flow chart for the routine "Watch-STB-With-Audio-Receiver" used by the remote control of the present invention.
Figure 43B:
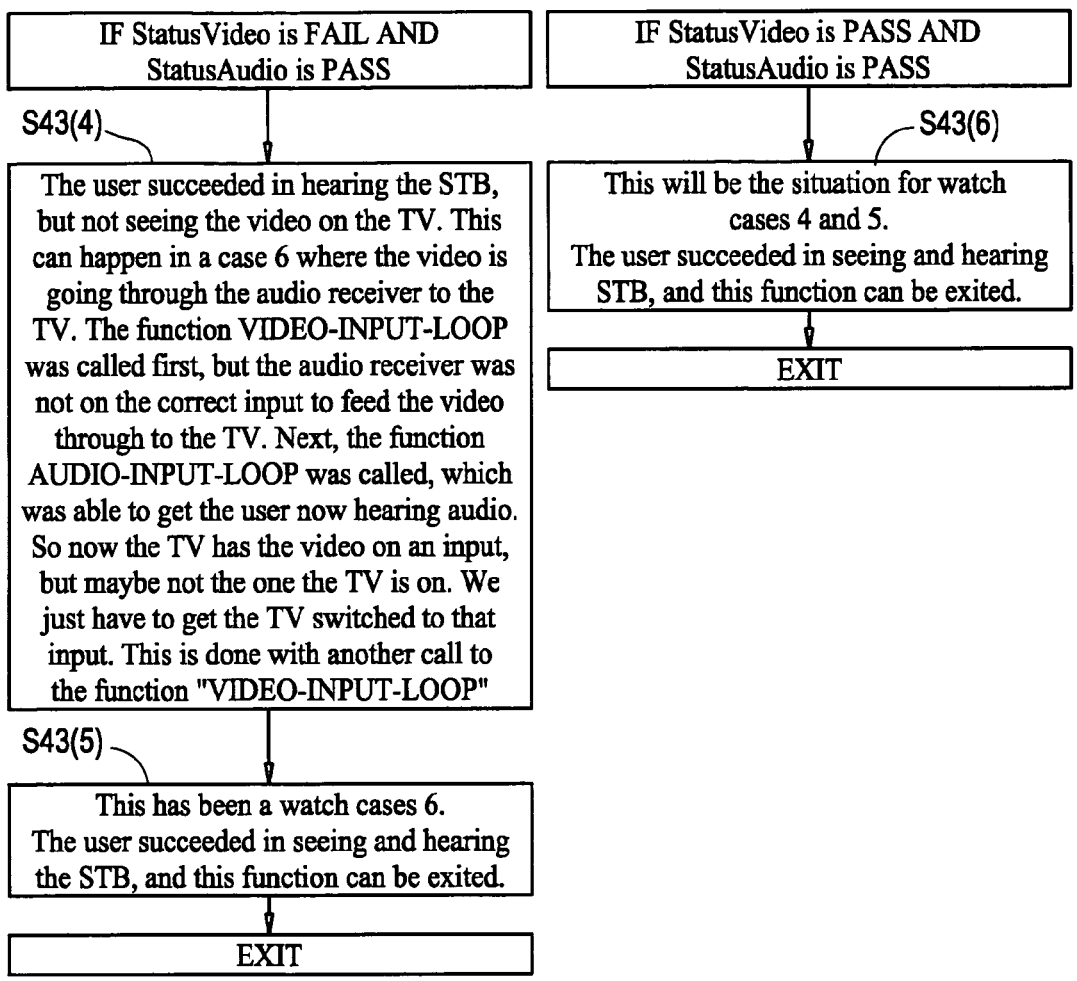

A flow chart for carrying out the function "Watch-STB-With-Audio-Receiver" is illustrated by FIG. 43.

The purpose of the remote control carrying out this routine is to try to get the user watching a video on the TV or monitor using the STB. This procedure carried out by the remote control will either be successful (i.e., "pass"), meaning that the user is now watching video on his TV or monitor, or not successful (i.e., "fail"), meaning that, even after the procedure is carried out by the remote control, the user still cannot watch video on his TV or monitor. This procedure is accomplished by executing another subroutine referred to as "Video-Input-Loop", described previously, which will return a flag "StatusVideo", which indicates whether the subroutine was successful ("pass") or not ("fail") (step S42(1)).

Then, the remote control tries to get the user to hear audio on the audio receiver/amplifier from an audio signal that is provided by the STB to the audio receiver/amplifier. Again, this procedure carried out by the remote control will either be successful (i.e., "pass"), meaning that the user is now hearing audio on the audio receiver/amplifier, or not successful (i.e., "fail"), meaning that, even after the procedure is carried out by the remote control, the user still cannot hear audio from his audio receiver/amplifier. This procedure is accomplished by executing a subroutine referred to as "Audio-Input-Loop", described previously, the result of which will return a flag "StatusAudio" which indicates whether the subroutine was successful ("pass") or not ("fail") in the user hearing audio from the audio receiver/amplifier that receives an audio signal from the STB (step S43(2)).

The remote control now evaluates the two status flags, StatusVideo and StatusAudio, as to whether the remote control was successful in getting the user to watch video or hear audio (step S43(3)). Two cases which should never be encountered would be where StatusVideo is "pass" and StatusAudio is "fail", and where StatusVideo is "fail" and StatusAudio is "fail". The other two remaining cases are of interest to the remote control, and the routine for dealing with these two remaining cases will now be described.

In a situation where the StatusVideo flag is "fail" and the StatusAudio flag is "pass", this is where the user succeeded in hearing audio from the audio signal provided by the STB to the audio receiver/amplifier, but not seeing video on the TV from the video signal provided by the STB to the TV (step S43(4)). Such can occur in Watch Case 6 described previously (see FIG. 1(*f*)), where video is being provided through the audio receiver/amplifier to the TV. The function and subroutine referred to as "Video-Input-Loop" was executed first, but the audio receiver/amplifier was not on the correct input to feed the video signal through to the TV. Next, the function and subroutine referred to as "Audio-Input-Loop" was executed, which was able to get the user to now hear audio. This means that the TV has the video signal on one input, but maybe not the input that the TV is currently on. The remote control has to get the TV switched to the correct input on which the video signal is. This is accomplished by another execution of the function and subroutine referred to as "Video-Input-Loop" (step S43(4)).

After the subroutine "Video-Input-Loop" has again been run, and the correct input has been found, the user should have now succeeded in seeing and hearing the video and audio signals from the STB, and the function and routine "Watch-STB-With-Audio-Receiver" is exited by the remote control (step S43(5)).

For the other possible situation in which the StatusVideo flag is "pass" and the StatusAudio flag is "pass", this could be the situation for Watch Cases 4 and 5 (see FIGS. 1(*d*) and 1(*e*)). The user succeeded in seeing and hearing the video and audio signals from the STB and, therefore, the function and subroutine "Watch-STB-With-Audio-Receiver" may be exited by the remote control (step S43(6)).

FIGS. 44-57 show examples of screens displayed on the remote control's LCD 16 and the successive flow of such displayed screens for a "Watch STB" activity with an audio receiver/amplifier in the "guided/one-touch" mode, where the activity is first set up by the remote control. In this example, the audio receiver/amplifier uses a separate, direct command for addressing each of its inputs.

Figure 44:
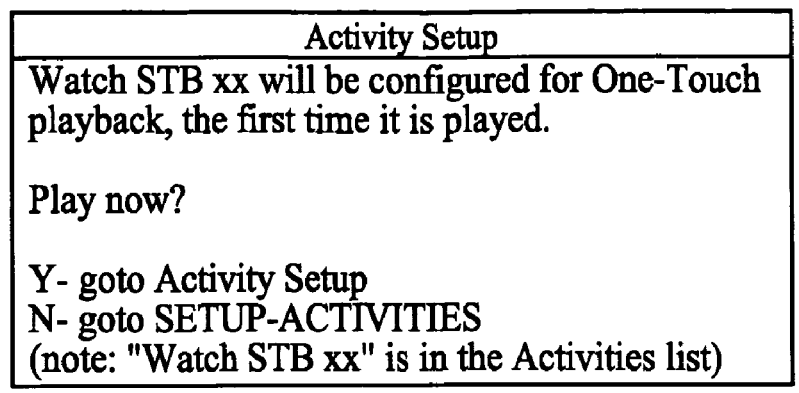
FIG. 44 is an illustration of a screen displayed by the remote control of the present invention in the "guided/one-touch" mode of operation.

More specifically, in FIG. 44, the remote control displays on its LCD 16 under the heading "Activity Setup" a prompt to the user that the STB (named by the user) will be configured for one-touch playback the first time it is played. The user is asked whether the remote control should play this activity now. If the user responds with a "YES" by pressing the corresponding soft key, then the remote control goes to the "Activity Setup" program and executes that program. If the user responds with a "NO" by pressing the corresponding soft key on the remote control, the remote control goes to the "Setup-Activities" program.

Figure 45:
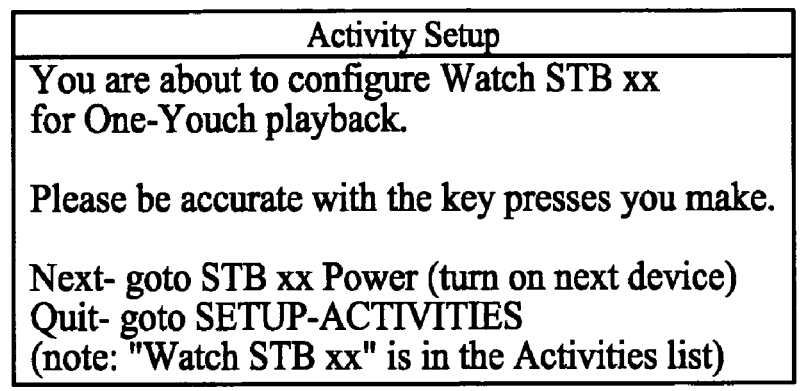
FIG. 45 is an illustration of a screen displayed by the remote control of the present invention in the "guided/one-touch" mode of operation.

Next, and as shown in FIG. 45, and assuming the user would like to configure his STB for a one-touch playback by the remote control (i.e., the remote control will configure all of these components of his entertainment system to provide video and audio from the STB to the TV or monitor), the remote control alerts the user on its LCD 16 that the user and the remote control are about to configure the STB for one-touch playback, and advises the user to be accurate with the keys on the keyboard of the remote control which he presses and responds to prompts and questions posed to him by the remote control on its LCD 16. In response, the user may press the "NEXT" soft key, and the remote control will send IR or RF command signals to the STB to power on the STB. If, in response, the user presses the "QUIT" soft key, then the remote control will go to the "Setup-Activities" routine, in which it will display on the LCD 16 a list of "watch" activities including the "Watch STB [named by the user]" activity, from which displayed list the user may choose a desired "watch" activity.

Figure 46:
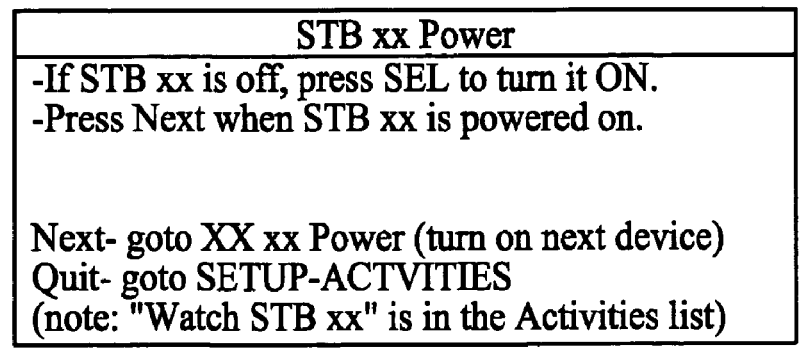
FIG. 46 is an illustration of a screen displayed by the remote control of the present invention in the "guided/one-touch" mode of operation.

Next, and as shown in FIG. 46 of the drawings, under the heading "STB [named by the user] Power", the user is advised by the remote control to press the select "SEL" key to turn on the STB if it is off, and to press the "NEXT" soft key when the STB is powered on. When the soft key "NEXT" is pressed, the remote control goes to the power up routine which instructs the remote control to send IR or RF command signals to the next component used in the "Watch STB" activity, for example, the TV or monitor, that is used for turning on the TV or monitor. If the user presses the soft key corresponding to "QUIT", the remote goes to the "Setup-Activities" routine and, again, displays a list of "watch" activities for the user to choose from.

Next, and as shown in FIG. 47, the user is prompted to press the select "SEL" key on the remote control to turn the TV on if the TV is off, and to then press the soft key corresponding to "NEXT" when the TV (named by the user) is powered on. When the user presses the "NEXT" soft key, the remote control will go to the power up routine to turn on the next component used in the entertainment system for effecting the desired "Watch STB" activity. However, if the user presses the soft key "QUIT", the remote control will go to the "Setup-Activities" routine, and display a list of "watch" activities for the user to choose from.

Next, and as shown in FIG. 48, the remote control prompts the user on the LCD 16 to press the select "SEL" key to turn on the audio receiver/amplifier (referred to by the name chosen by the user and programmed into the remote control, as with the other components of the user's entertainment system) if the audio receiver/amplifier is off, and then to press the soft key "NEXT" when the audio receiver/amplifier is powered on. When the user presses the "NEXT" key, the remote control goes to "TV Input Switching 1" routine and screen. If the user presses the soft key "QUIT" at this stage, then the remote control goes to the routine "Setup-Activities" and displays a list of "watch" activities for the user to choose from.

As show in FIG. 49, the next screen displayed by the remote control relates to the "TV Input Switching 1" function. The user is prompted by the remote control on its LCD 16 to demonstrate for the remote control how the user switches inputs on the TV (which the user has named and which name is used by the remote control). More specifically, the user is prompted by the remote control to use the keypad on the remote control to switch the TV input by one position, and to press the soft key "NEXT" when such has been accomplished. When the user presses the soft key "NEXT", the remote control goes to the routine and associated display "TV Input Switching 2". If the user presses the soft key "QUIT", then the remote control goes to the "Setup-Activities" routine and displays a list of "watch" activities for the user to choose from.

Figure 50:
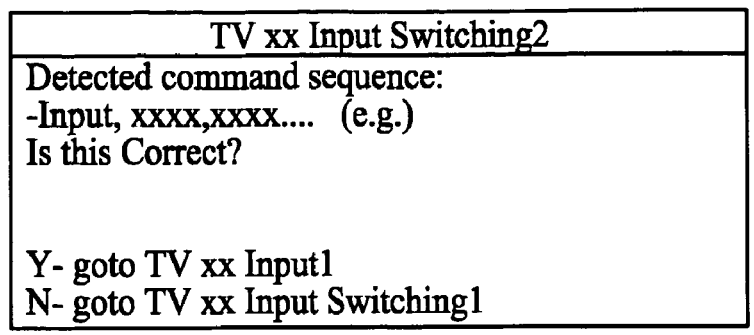
FIG. 50 is an illustration of a screen displayed by the remote control of the present invention in the "guided/one-touch" mode of operation.
Figure 51:
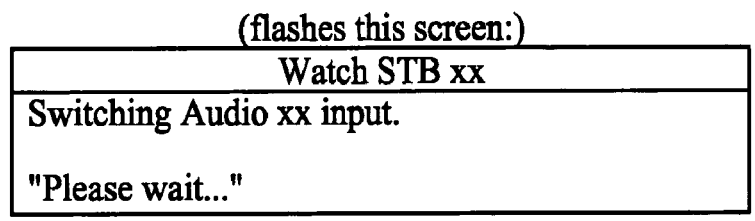
FIG. 51 is an illustration of a screen displayed by the remote control of the present invention in the "guided/one-touch" mode of operation.

If the user pressed the soft key "NEXT", then the remote control will now display what it believes is the detected command sequence for confirmation by the user, and asks the user to verify whether the detected command sequence for changing inputs is correct, as shown by FIG. 50. If the user answers "YES" by pressing the soft key corresponding thereto, the remote control will then go to the routine "TV [identified by the user with a particular name] Input 1". If the user responds with a "NO" by pressing the soft key corresponding thereto, the remote control goes to the routine "TV [named by the user] Input Switching 1".

The remote control displays this last screen (FIG. 50) while the remote control sets the audio receiver/amplifier to a known input using an IR or RF command signal, and then goes to the "TV [named by the user] Input 1" routine. Then, the remote control flashes on the LCD 16 the screen shown in FIG. 51, to advise the user that it is now switching to the correct audio receiver/amplifier input.

The "TV [named by the user] Input 1" routine is then entered into by the remote control, as mentioned previously, and the screen shown in FIG. 52 is displayed on the LCD 16 of the remote control. The user is prompted to press the select "SEL" key to switch between the TV or monitor inputs, and then to press the "NEXT" soft key when the user can see video on the TV or monitor that is provided by the STB. The user is also advised to keep pressing the select "SEL" key if there is a problem.

Figure 52:
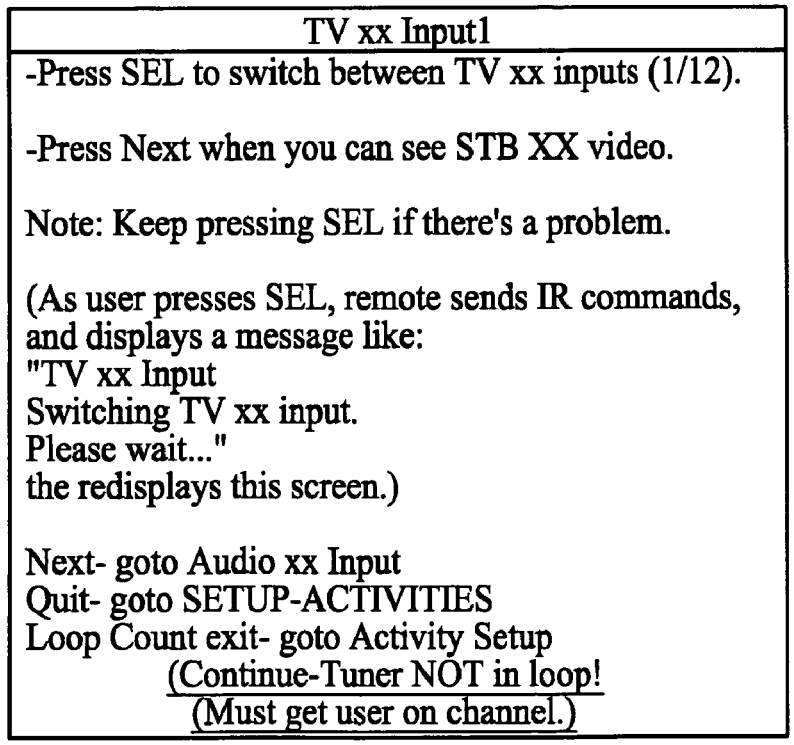
FIG. 52 is an illustration of a screen displayed by the remote control of the present invention in the "guided/one-touch" mode of operation.

As the user presses the select "SEL" key, the remote control sends IR or RF command signals to the TV or monitor, and displays a message on the LCD 16, such as "TV [named by the user] Input-Switching TV [named by the user] input. Please wait . . . ", as shown in FIG. 52. The user, if he sees the video being displayed on the TV or monitor, presses the "NEXT" soft key, which is detected by the remote control, and, in response, the remote control goes to the "Audio [named by the user] Input" routine. Or, if the user presses the "QUIT" soft key, then the remote control goes to the "Setup-Activities" routine. Also, if there is an exit from the "Loop Count" routine, then the remote control will go to the Activity Setup routine, and continue, as the tuner is not in the video loop and the remote control must get the user on the correct channel. This screen is shown in FIG. 52 of the drawings.

Figure 53:
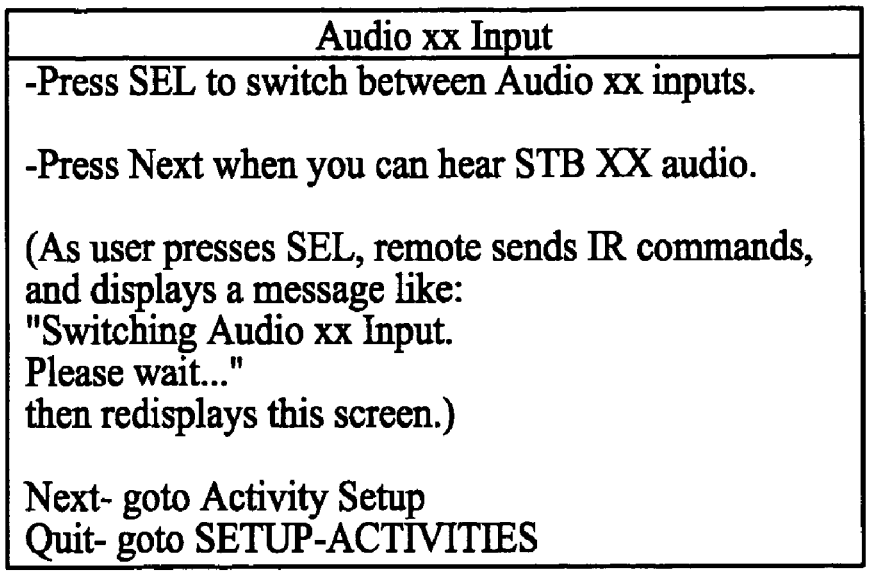
FIG. 53 is an illustration of a screen displayed by the remote control of the present invention in the "guided/one-touch" mode of operation.

The next screen displayed on the LCD 16 of the remote control relates to setting the proper audio input on the audio receiver/amplifier, as shown in FIG. 53. The remote control prompts the user to press the select "SEL" push button switch to switch between the audio inputs of the audio receiver/amplifier, and to press the "NEXT" soft key when the user can hear audio on the audio receiver/amplifier from the STB. As the user presses the select "SEL" key, the remote control sends IR or RF command signals to the audio receiver/amplifier, and displays a message, such as "Switching Audio [named by the user] input. Please wait . . . ", to advise the user while the inputs are being switched, and then returns to the instruction screen for the user to press the select "SEL" key or the "NEXT" soft key, as shown in FIG. 53.

If the user, in response, presses the "NEXT" soft key, the remote control will go to the "Activity Setup" routine. However, if the user presses the "QUIT" routine, then the remote control will go to the "Setup-Activities" routine and will display a list of "watch" activities for the user to choose from.

Up to this point, the mode has been "guided". The user should now be able to see the desired video and hear the desired audio respectively on the TV or monitor and the audio receiver/amplifier.

Now, the remote control will determine the loop lengths, and associates the components of the entertainment system with the corresponding audio (audio receiver/amplifier) inputs and video (TV or monitor) inputs.

Figure 54:
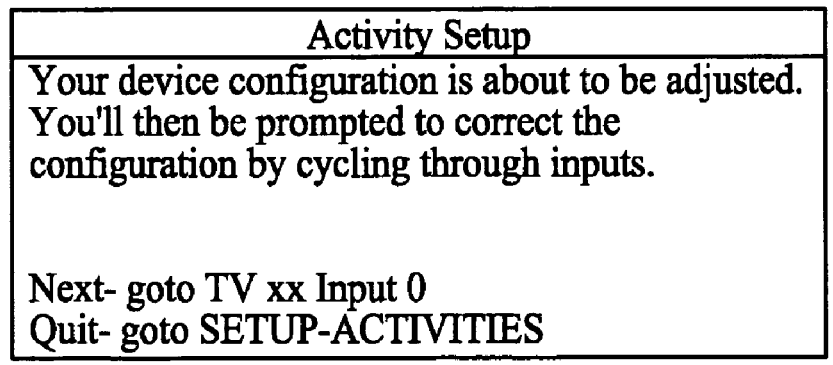
FIG. 54 is an illustration of a screen displayed by the remote control of the present invention in the "guided/one-touch" mode of operation.

As shown in FIG. 54, the screen related to the "Activity Setup" routine is now displayed for the user. The user is advised that the component configuration is about to be adjusted by the remote control, and that he or she will then be prompted to correct the configuration by cycling through the inputs.

Figure 55:
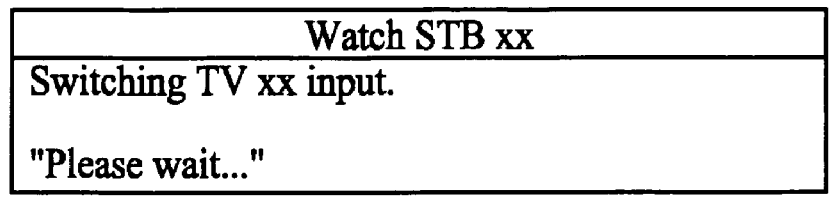
FIG. 55 is an illustration of a screen displayed by the remote control of the present invention in the "guided/one-touch" mode of operation.

The user may press the "NEXT" soft key in response to this screen, and the remote control will go to the "TV [named by the user] Input 0" routine (see FIG. 56), after briefly prompting the user that the remote control is switching inputs and to please wait (FIG. 55). If the user presses the "QUIT" soft key on the remote control, then the remote control will go to the "Setup-Activities" routine and display a list of "watch" activities for the user to choose from.

The reason why the input is incremented, that is, switched, in the next screen, is because it is desired to have the user step through all of the inputs and report to the remote control when he sees video on the TV or monitor, as the remote control counts how many video inputs there are. At this point, the user is able to see video on the TV or monitor, and so the remote control goes to the next video input so that the user is not seeing video. The remote control prompts the user on the LCD 16 through all of the inputs, counting them, until the user gets back to seeing the video again, and the video input loop count is then determined. If the remote control did not increment and ask the user to press the "NEXT" soft key when he saw video on the TV or monitor, and he was already seeing the video, then he would have pressed the "NEXT" soft key immediately, and the remote control would not have gone through the loop and properly counted the number of video inputs.

Figure 56:
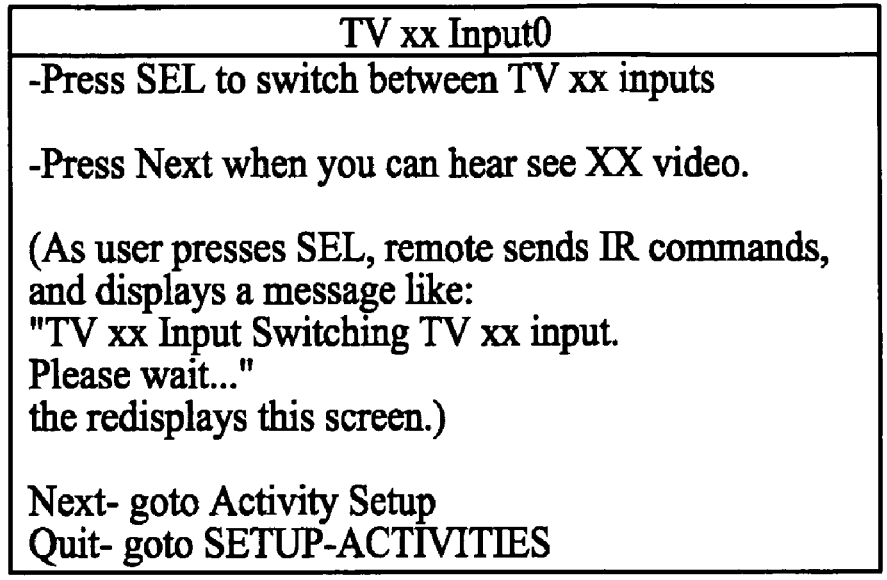
FIG. 56 is an illustration of a screen displayed by the remote control of the present invention in the "guided/one-touch" mode of operation.

As mentioned previously, for the "Watch STB [named by the user]" routine, the remote control displays on its LCD 16 the screen shown in FIG. 55, which advises the user that it is switching the inputs on the TV or monitor, and that the user should wait. Then, the remote control displays the next screen shown in FIG. 56, and prompts the user to press the select "SEL" key to switch between the inputs of the TV or monitor, and to press the "NEXT" soft key when the user sees video on the TV or monitor provided to the TV or monitor by the STB, as shown in FIG. 56.

As the user presses the select "SEL" key, the remote control sends IR or RF command signals to the TV or monitor, and displays a message, such as "TV [named by the user] input-Switching TV [named by the user] input. Please wait . . . ", to alert the user to the fact that the remote control is switching through the various inputs of the TV or monitor to determine the loop count (the number of video inputs on the TV or monitor). Then, the TV re-displays the screen shown in FIG. 56.

If the user presses the "NEXT" soft key, then the remote control will go to the "Activity Setup" routine and associated screen. If the user presses the "QUIT" soft key, the remote control will go to the "Setup-Activities" routine and display a list of "watch" activities for the user to choose from.

Figure 57:
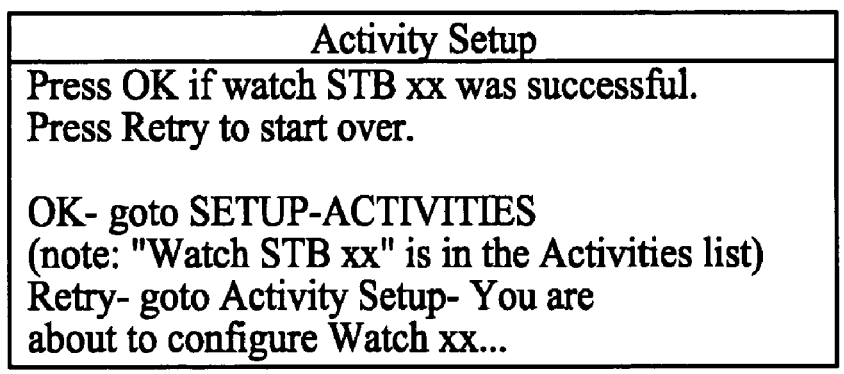
FIG. 57 is an illustration of a screen displayed by the remote control of the present invention in the "guided/one-touch" mode of operation.

For the "Activity Setup" routine, the remote control will display the screen shown in FIG. 57. The user is instructed to press the "OK" soft key if he is now successfully watching video on the TV or monitor that was provided by the STB. If the user can still not watch video on his TV or monitor, he is prompted to press the "RETRY" soft key on the remote control to start over.

If the remote control detects that the "OK" soft key was pressed, then the remote control will go to the "Setup-Activities" routine and display a list of "watch" activities for the user to choose from. It should be noted that the "Watch STB [named by the user]" activity name is now in the activities list in the remote control's memory 12 and forms part of the activities list which is displayed by the remote control for the user to select at a later date. If the user pressed the "RETRY" soft key on the remote control, the remote control will go to the "Activity Setup" routine and the associated screens, including a prompt to the user that he is about to configure the components used in a particular "watch" activity.

This procedure to effect the user watching video on his TV or monitor should now have been completed successfully. It should be noted that the audio receiver/amplifier's inputs do not need to be looped through, as, in this example, it uses "direct addressing". Therefore, when the guided set up has been completed, and the user is hearing the desired audio, the remote control knows what direct IR or RF command signals had been sent to the audio receiver/amplifier that put the audio receiver/amplifier on the correct input for the user to hear audio.

At this point, the flow of the various screens displayed on the LCD 16 of the remote control for a "listen" activity which uses the audio receiver/amplifier in the "guided/one-touch" mode, where this activity is first being set up, will now be described. It should be noted that in this example, the audio receiver/amplifier uses a separate, direct command for addressing each of its inputs. Also, in this example, a DVD player is the audio source.

Figure 58:
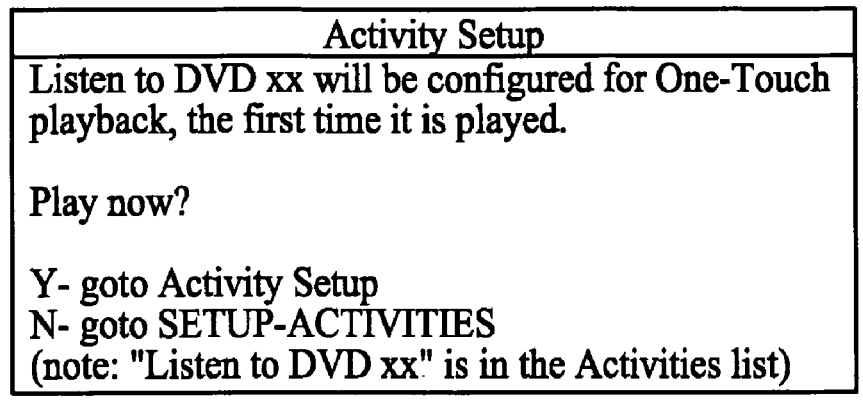
FIG. 58 is an illustration of a screen displayed by the remote control of the present invention in the "guided/one-touch" mode of operation.
Figure 59:
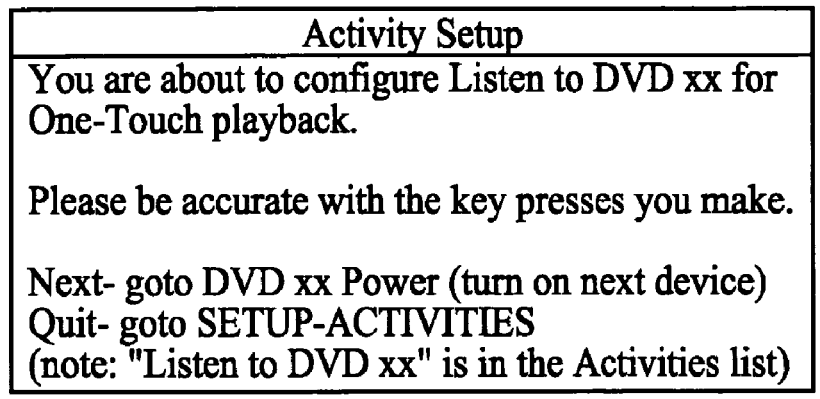
FIG. 59 is an illustration of a screen displayed by the remote control of the present invention in the "guided/one-touch" mode of operation.

The remote control first displays on the LCD 16 screens relating to the "Activity Setup" routine, as shown in FIGS. 58 and 59. In the first screen (FIG. 58), the user is advised that the remote control will now configure the activity relating to listening to a particular DVD player for "one-touch" playback or operation, the first time it is played. The remote control asks the user whether he would like to listen to the DVD now. If the user responds by pressing the "YES" soft key, then the remote control goes to the "Activity Setup" routine and associated screens. However, if the user presses the "NO" soft key, then the remote control goes to the "Setup-Activities" routine and screen displays. It should be noted here that the "Listen to DVD [named by the user]" activity is listed in the "listen" activities list and will be displayed on the remote control's LCD 16 as part of the activities list for the user to choose from.

In the next screen displayed on the LCD 16 of the remote control (see FIG. 59), the user is advised that he is about to help the remote control configure the "Listen to DVD [named by the user]" activity for "one-touch" playback, and to be accurate with the keys that he presses on the remote control. The user may respond to this prompt by pressing the "NEXT" soft key, and when such is detected by the remote control, the remote control will go to the routine to power up the particular DVD player. If the user presses the "QUIT" soft key on the remote control, then the remote control will go to the "Setup-Activities" routine and associated screens, and display the "Listen to DVD [named by the user]" activity in the "listen" activities list displayed on the LCD 16.

Figure 60:
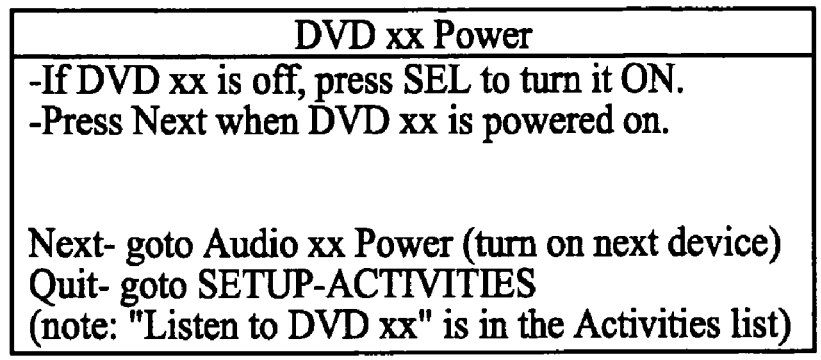
FIG. 60 is an illustration of a screen displayed by the remote control of the present invention in the "guided/one-touch" mode of operation.

Then, as part of the powering up routine for the DVD player, the remote control will display the screen shown in FIG. 60. The remote control will prompt the user to press the select "SEL" key to turn the DVD player on if it is off, and to press the "NEXT" soft key when he sees that the DVD player is powered on. If the user presses the "NEXT" soft key, then the remote control will go to the routine to power up the audio receiver/amplifier, and the routine's associated screen displays. If the user presses the "QUIT" soft key, the remote control will go to the "Setup-Activities" routine and associated screens, and will display as part of the "listen" activities list the "Listen to DVD [named by the user]" activity on the LCD 16 so that the user may choose from this list.

Figure 61:
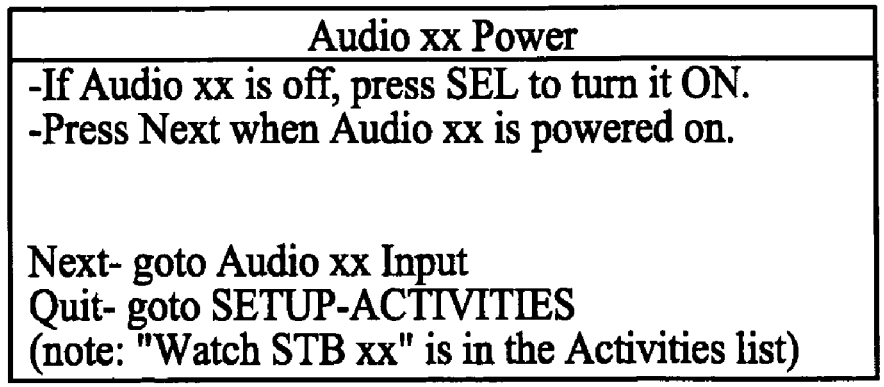
FIG. 61 is an illustration of a screen displayed by the remote control of the present invention in the "guided/one-touch" mode of operation.

In the routine of powering up the audio receiver/amplifier, the remote control will display the screen shown in FIG. 61. The remote control instructs the user to press the select "SEL" key to turn the power on for the audio receiver/amplifier if it is off, and to press the "NEXT" soft key when the user sees that the audio receiver/amplifier is now powered on. If the user presses the "NEXT" soft key, the remote control detects this and goes to the routine where it is going to switch the inputs on the audio receiver/amplifier in order to detect the number of inputs, and the routine's associated screens. If the user presses the "QUIT" soft key, the remote control, detecting the user pressing this key, will go to the "Setup-Activities" routine and associated screen or screens, and will display a list of "listen" activities, which includes the activity "Watch STB [named by the user]", from which the user may choose a desired "listen" activity.

Figure 62:
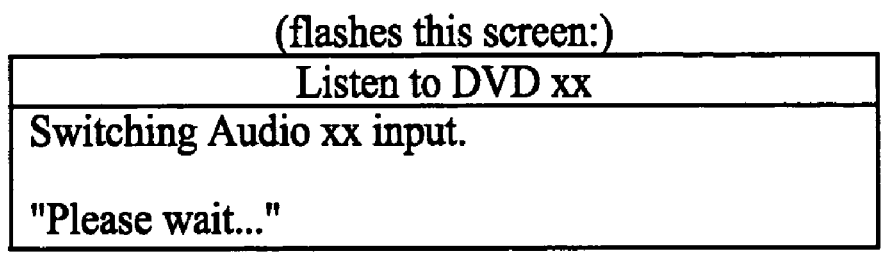
FIG. 62 is an illustration of a screen displayed by the remote control of the present invention in the "guided/one-touch" mode of operation.

The remote control will then flash the screen on its display 16 shown in FIG. 62. By this screen, it advises the user that it is switching the inputs on the audio receiver/amplifier, and that the user should wait.

Figure 63:
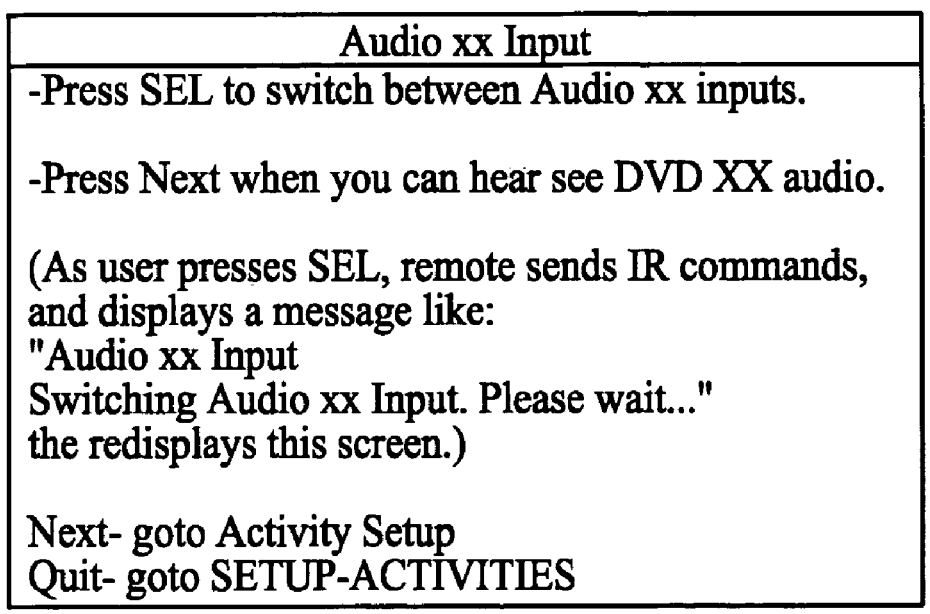
FIG. 63 is an illustration of a screen displayed by the remote control of the present invention in the "guided/one-touch" mode of operation.

Now, the remote control displays the screen relating to the switching of the inputs on the audio receiver/amplifier, as shown in FIG. 63. The remote control prompts the user to press the select "SEL" key on the remote control to switch between the inputs on the audio receiver/amplifier, and to press the "NEXT" soft key when the user can hear audio on the audio receiver/amplifier provided by the DVD player. As the user presses the select "SEL" key, the remote control sends IR or RF command signals to the audio receiver/amplifier to change inputs, and displays a message such as "Audio [named by the user] Input-Switching Audio [named by the user] input. Please wait . . . ", to alert the user that it is now switching the inputs on the audio receiver/amplifier. Then, the remote control re-displays the screen shown in FIG. 63.

If the user presses the "NEXT" soft key when he hears audio from the audio receiver/amplifier, the remote control detects this key being pressed and goes to the "Activity Setup" routine and associated screens. If the user presses the "QUIT"

soft key, then the remote control goes to the "Setup-Activities" routine and displays a list of "listen" activities which the user may choose from.

Up to this point, the mode has been "guided", and the user in this example should now be hearing the desired audio from the DVD player through the audio receiver/amplifier.

Figure 64:
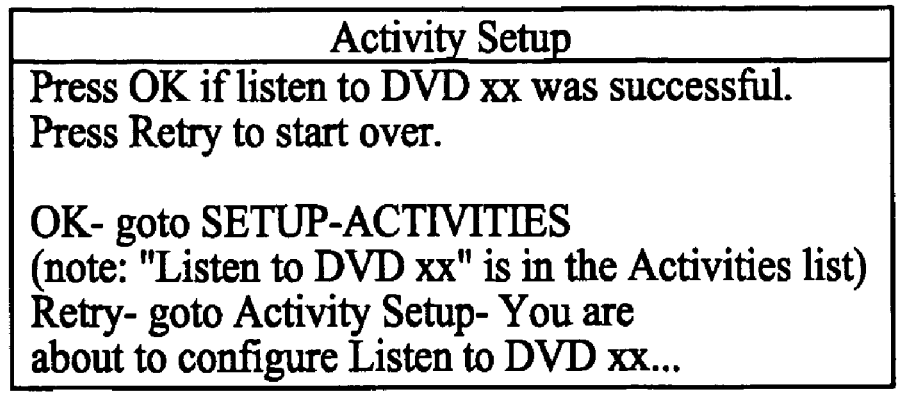
FIG. 64 is an illustration of a screen displayed by the remote control of the present invention in the "guided/one-touch" mode of operation.
Figure 65:
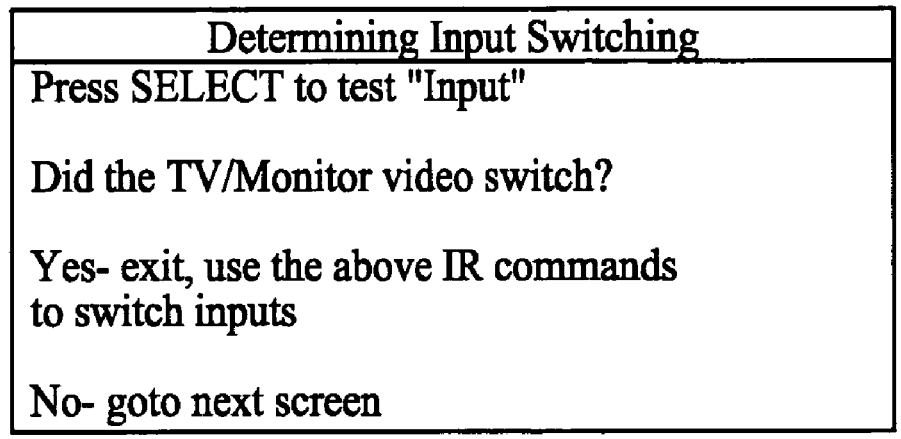
FIG. 65 is an illustration of a screen displayed by the remote control of the present invention used in a procedure for finding a correct key sequence that works with a TV or monitor.

As most audio receiver/amplifiers have direct addressing of the inputs, as opposed to having one input command that cycles through the inputs, at this point, the remote control has the code associated with the last IR or RF signal that were sent to the audio receiver/amplifier that has been used to set the audio receiver/amplifier to the input that is allowing the user to hear the desired audio from his DVD player. The remote control now displays the screen shown in FIG. 64 related to the "Activity Setup" routine, and prompts the user to press the "OK" soft key if he is successfully listening to the DVD player, or to press the "RETRY" soft key to start the procedure over. If the remote control detects that the "OK" soft key was pressed, then the remote control goes to the "Setup-Activities" routine and displays the activities list that includes the name of the particular activity for listening to the DVD player. If the remote control detects that the "RETRY" soft key was pressed, then the remote control goes to the "Activity Setup" routine and associated screens, and displays a prompt to the user that the remote control is going to attempt again to configure the components for listening to audio from the DVD player on the audio receiver/amplifier, as shown in FIG. 64. The procedure has now been completed.

An alternative method in accordance with the present invention for determining the video input switching will now be described. It has been found that, conventionally, there are a number of input sequences that are used with currently marketed remote controls to switch the video inputs on a TV or monitor, and these conventional input sequences (that is, the sequence of keys that are pressed on a remote control) are listed below in Table VIII:

TABLE VIII

Commonly Used Key Sequences

Input Input Cancel
Input Input wait1 sec
Input Input Enter
Input Input Clear
Input Input OK
Input RtArrow Exit
Input RtArrow Enter
Input DnArrow OK
Input DnArrow Enter
TVtnr + 2 stacks (AV + HD)
Input DnArrow OK
Input Input Exit
Input Input Return
Input Input OK
Input Exit
Input Enter
Input Input 7 sec. wait It should be understood that each sequence listed in Table VIII includes one or more presses of the keys listed. In other words, although the sequence "Input DnArrow OK" shows the three keys which are pressed to switch the video inputs on certain televisions or monitors, the televisions or monitors may require the "DnArrow" key to be pressed several times to switch the video inputs, and the sequence shown in the table is envisioned to incorporate multiple presses of the same keys although the key may only be shown once in a sequence listed in Table VIII.

Rather than the remote control trying to implement the list shown in Table VIII, that is, by testing the user's TV or monitor for each of the sequences shown in Table VIII to see if the user's TV or monitor switches video inputs, it has been found that a subset of the sequences listed in Table VIII appear to work for a major number of the televisions or monitors currently being marketed. For example, most of the currently marketed televisions and monitors worked with one of the following four key sequences for switching video inputs shown in Table IX below:

TABLE IX

Preferred Key Sequences

Input
Input Input Terminate
Input RtArrow Terminate
Input DnArrow Terminate

It has been found that many sequences shown in Table VIII will end in "OK", "Enter", "Return", "Exit" or "Clear". In Table IX, the word "Terminate" used in the key sequences which are listed is meant to encompass one or more of these commonly used ending commands. Thus, this final command will "terminate" the sequence. It has been found that these ending commands can be prioritized according to which work best, and the remote control preferably sends all the ending commands that are present for a given code. For example, a given code may have "OK" and "Clear" available, but not "Enter", "Return" or "Exit". Therefore, for the second sequence in Table IX "Input Input Terminate", the remote control preferably sends (i.e., transmits to the component, e.g., the TV) the IR or RF commands for "Input Input OK Clear". Now there is a good chance that this will actually work as "Input Input OK", and the "Clear" command was ignored by the TV as it was then on an input, and there is nothing to "clear".

Also, it has been found that many televisions will respond to the command "OK" the same as the commands "Enter", and "Clear" the same as "Exit".

Therefore, with the remote control knowing these four most-often used sequences of keys for switching the video inputs on a major number of currently marketed televisions and monitors, and with non-technical questions being posed by the remote control to the user, and further with the user's feedback by his pressing one or more of the keys on the remote control, the remote control can easily determine which input switching method the TV or monitor uses.

In order to begin with this alternative method for determining the video input switching, the user is prompted by the remote control to view video on his or her TV or monitor, and then press the "NEXT" soft key.

This procedure initiates the testing of rank-ordered input key sequences listed in Table IX by the remote control prompting the user to press the select "SEL" key if he would like to test a particular key sequence. Upon detecting the user pressing the select "SEL" key, the remote control sends to the TV or monitor the IR or RF command signals that correspond to the particular key sequence, and asks the user if the displayed video switched to another input when the key sequence under test was sent. The user responds by pressing the "YES" soft key or the "NO" soft key on the remote control. If the "YES" soft key is pressed and such is detected by the remote control, the key sequence subroutine just selected becomes the remote control's input key sequence, and is stored in memory 26. If the soft key "NO" is detected by the remote control as being pressed, then the next key sequence subroutine, testing the next key sequence in Table IX, is indexed and the user is again asked to press the select "SEL" key if he would like to test the next key sequence and to attempt to switch away from the displayed video.

If all of the key sequence subroutines, relating to the four cases of key sequences listed in Table IX are indexed (selected using this procedure) and none is correct for the user's TV or monitor, then the remote control presents the user with a choice to either press the "REPLAY" soft key to retry the sequences again, or press the "NEXT" soft key to develop a custom input key sequence macro that will replace the remote control's input key sequence, or for the remote control to describe other options for the user to work around not having a sequence that works with the user's TV or monitor.

It should be noted that each time a key sequence is attempted, the key sequence being used could be displayed to the user by the remote control. This could help the user understand what the remote control is doing and lead to an approach the user may need if the user and the remote control together develop a custom key sequence macro. Another possibility is to have the user select key sequences from a list displayed by the remote control. However, since this is a more complex alternative and provides a higher level of detail or complexity for the user, it is preferred that the remote control attempts to use one of the sequences listed in Table VIII or Table IX to see if the key sequences work for the user's TV or monitor, as opposed to developing a custom macro for the key sequence.

FIGS. 65-69 are examples of screens displayed by the remote control on its LCD 16 to effect this alternative procedure of finding a correct key sequence that works with the user's TV or monitor. First, the remote control displays the screen shown in FIG. 65. It prompts the user to press the select "SEL" key to test the first key sequence listed in Table IX, that is, the sequence using the key labeled "INPUT". After the user presses the select "SEL" key on the remote control, the remote control automatically transmits IR or RF command signals that correspond to the "INPUT" key, and the user is asked whether the TV or monitor video switched. If the user presses the "YES" soft key displayed on the LCD 16 of the remote control, confirming that the highest-ranked (i.e., most often used, as listed in Table IX) key sequence for the key labeled "INPUT" is able to switch the video inputs on his or her TV or monitor, then the remote control will use the above IR or RF command signal associated with the "INPUT" key sequence to switch the inputs on the user's TV or monitor, and will store this information in its memory 12. If the user presses the "NO" soft key on the remote control, to report to the remote control that this particular key sequence does not change the video inputs on his TV or monitor, then the remote control will go to the next screen shown in FIG. 66 to test the next most often used key sequence listed in Table IX.

Figure 66:
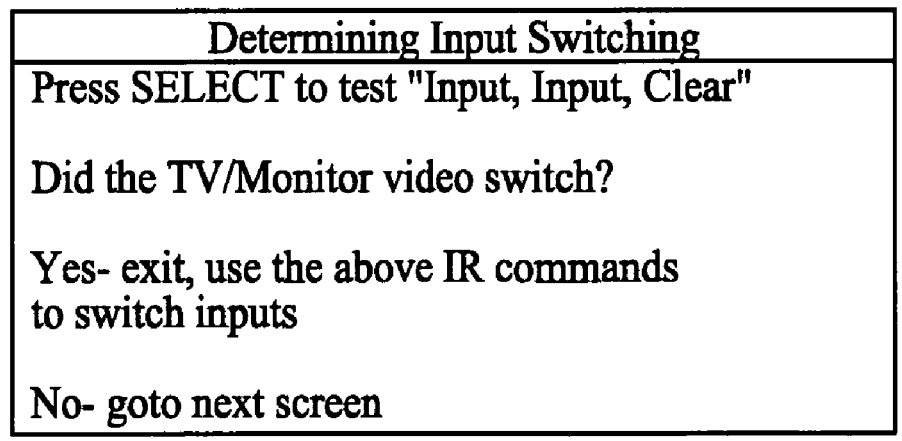
FIG. 66 is an illustration of a screen displayed by the remote control of the present invention used in a procedure for finding a correct key sequence that works with a TV or monitor.

In this next screen displayed on the remote control's LCD 16, the remote control will now test the next key sequence in Table IX, that is, the sequence "INPUT, INPUT, TERMINATE" (except that "TERMINATE" means any one or more of the ending commands, such as "CLEAR", as shown in FIG. 66, "OK", "ENTER", "RETURN" and "EXIT"), referring to the standard labels of the keys found on conventional remote controls which are also used on the remote control of the present invention. The user is prompted by the remote control to press the select "SEL" key if he would like to test this key sequence, and the remote control will automatically transmit IR or RF command signals to the user's TV or monitor corresponding to this particular key sequence (that is, "INPUT-INPUT-TERMINATE (e.g., "CLEAR")"), and the user is asked whether the TV or monitor video switched. If the user presses the "YES" soft key which is detected by the remote control, the remote control exits the routine and uses the IR or RF command signals relating to this particular key sequence to switch inputs on the user's TV or monitor. If the user presses the soft key "NO", in the situation where the key sequence under test does not switch the inputs of his TV or monitor, then the remote control displays the next screen shown in FIG. 67.

The remote control then tests the next sequence shown in Table IX, that is, the key sequence "INPUT, RIGHT ARROW, TERMINATE (e.g., "CLEAR")", as shown in FIG. 67. If the user wishes to test this next sequence, he is instructed to press the select "SEL" key on the remote control and, in response, the remote control will automatically send out the command signals for the key sequence "INPUT, RIGHT ARROW, TERMINATE (e.g., "CLEAR")". Then, in the screen illustrated by FIG. 67, the remote control asks the user whether his or her TV or monitor video switched. If the user responds affirmatively by pressing the "YES" soft key and this is detected by the remote control, then the remote control will use the above IR or RF command signals relating to the key sequence "INPUT, RIGHT ARROW, TERMINATE (e.g., "CLEAR")" to switch inputs on the user's TV or monitor. If the user responds by pressing the "NO" soft key displayed on the LCD 16 of the remote control, then the remote control will display the next screen (see FIG. 68) to test the next key sequence shown in Table IX.

In FIG. 68, the screen for testing the key sequence "INPUT, DOWN ARROW, TERMINATE (e.g., "CLEAR")" shown in Table IX will now be displayed and the key sequence tested by the remote control.

The user is requested in the screen shown in FIG. 68 to press the select "SEL" key if he would like the remote control to test the key sequence "INPUT, DOWN ARROW, TERMINATE (e.g., "CLEAR")". When the remote control detects that the select "SEL" key has been pressed, it will automatically send IR or RF commands to the TV or monitor which relate to the key sequence "INPUT, DOWN ARROW, TERMINATE (e.g., "CLEAR")". The user is then asked by the remote control in the screen displayed on the LCD 16 whether the TV or monitor video switched. If the user answers affirmatively by pressing the "YES" soft key, then the remote control exits the routine and uses the above IR or RF command signals relating to the key sequence "INPUT, DOWN ARROW, TERMINATE (e.g., "CLEAR")" to switch inputs on the user's TV or monitor. If the user presses the "NO" soft key which is detected by the remote control, then the remote control will go to the next routine and the screen shown in FIG. 69.

In the screen shown in FIG. 69, the remote control advises the user on its LCD 16 that he has tested the key sequences previously displayed by the remote control of the present invention in an attempt to use these key sequences for his TV or monitor, and the user is asked whether he would like to try the sequences again. If the user presses the "RETRY" soft key, the remote control will re-test the user's TV or monitor using the key sequences it previously tried, and the remote control will go to the first "Determining Input Switching" screen shown in FIG. 65. If the user presses the "NEXT" soft key, which is detected by the remote control, the remote control will proceed to a routine in which it customizes the required input key sequence for the user's TV or monitor if the standard, previously tested key sequences did not work, and will display customization screens associated with the routine.

The universal smart remote control of the present invention permits a user's entertainment equipment to be set up and controlled without the requirement of an internet connection, website access, personal computer, personal computer keyboard or a universal serial bus connection to a personal computer. The remote control is very user friendly and provides the user with non-technical questions to guide the user in the set up and control of his or her entertainment system. The universal smart remote control of the present invention is simple to operate and requires fewer programming steps than conventional remote controls. Once the universal smart remote control of the present invention is programmed to know the components of the user's entertainment system, it can provide guidance information to the user for setting up his or her entertainment system and can provide a "one touch" capability which allows the user to operate the components of the entertainment system with minimal effort. The remote control of the present invention includes intelligence software, programs and algorithms and microprocessor 10 power which simplify the process for setting up and controlling an entertainment system having one or more components.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An operational method of a remote control for controlling one or more components of an entertainment system of a user, the remote control having a display and a plurality of push button switches, wherein at least one of the components of the entertainment system includes electronic circuitry and signal inputs which may be selectively operatively coupled to the electronic circuitry to provide a video or audio signal to the electronic circuitry for the user to view video or hear audio on his entertainment system, the signal inputs being switchable in an endless loop by the remote control transmitting command signals to the at least one component to selectively operatively couple a selected signal input to the electronic circuitry, which comprises the step of:

displaying on the display messages to the user to achieve a desired activity of the entertainment system using the one or more of the components thereof, the desired activity involving at least one of viewing video and hearing audio on the one or more of the components of the entertainment system, the user observing at least one of whether the user is able to view video and whether the user is able to hear audio on the one or more of the components of the entertainment system, the user pressing one or more push button switches in response to at least one of whether the user is able to view video and whether the user is able to hear audio;

detecting the pressing of one or more push button switches of the plurality of push button switches in response to the user observing at least one of whether the user is able to view video and whether the user is able to hear audio on one or more of the components of the entertainment system;

transmitting command signals to the one or more of the components of the entertainment system in response to the detection of the pressing of the one or more push button switches; and determining the number of signal inputs on the at least one component by counting the number of times it requires to switch signal inputs on the at least one component from a first time that the user is able to view video or hear audio on the user's entertainment system for a selected input to a second time that the user is able to view the same video or hear the same audio on the user's entertainment system for a selected input.

2. An operational method of a remote control as defined by claim 1, wherein the remote control includes a signal input counter for counting the number of signal inputs on the at least one component of the entertainment system, and wherein the step of determining the number of signal inputs on the at least one component includes the substeps of:

a) transmitting a command signal to the at least one component to cause the at least one component to switch inputs so that a selected input is operatively coupled to the electronic circuitry of the at least one component;

b) displaying on the display a message to the user to observe at least one of whether the user is able to view video and whether the user is able to hear audio on the user's entertainment system and to press one or more of the push button switches in response to at least one of whether the user is able to view video and whether the user is able to hear audio on the user's entertainment system;

c) detecting the pressing of the one or more push button switches in response to the user observing at least one of whether the user is able to view video and whether the user is able to hear audio on the user's entertainment system for a selected input operatively coupled to the electronic circuitry of the at least one component;

d) determining from the detection of the pressing of the one or more push button switches in substep c) for a selected input operatively coupled to the electronic circuitry of the at least one component that the user can view video or hear audio on the user's entertainment system;

e) setting the signal input counter to a reference count number if from substep d) it is determined for a first time that the user can view video or hear audio on the user's entertainment system for a selected input operatively coupled to the electronic circuitry of the at least one component; and repeating substeps a)-d) and incrementing the signal input counter by one to a current count number each time the signal inputs are switched on the at least one component to select a signal input to be operatively coupled to the electronic circuitry of the at least one component until the user is able to view the same video or hear the same audio on the user's entertainment system for a second time, the difference between the current count number and the reference count number being equal to the number of signal inputs on the at least one component of the user's entertainment system.

3. An operational method of a remote control as defined by claim 1, wherein the video viewed by the user or audio heard by the user on the entertainment system corresponds to a video or audio signal provided on a particular selectable signal input when the particular selectable signal input is operatively coupled to the electronic circuitry of the at least one component, and wherein the operational method further comprises the steps of:

detecting the pressing by the user of one or more push button switches on the remote control in response to the user desiring to view the video or hear the audio on the entertainment system associated with the video or audio signal provided on the particular signal input; and transmitting command signals to the at least one component to switch inputs from a selectable signal input currently operatively coupled to the electronic circuitry of the at least one component to the particular signal input based on the number of signal inputs on the at least one component determined by the remote control so that the user may view the video or hear the audio on the entertainment system that corresponds to the video or audio signal provided on the particular signal input.

4. An operational method of a remote control as defined by claim 1, wherein the remote control further includes a memory, and wherein the operational method further comprises the steps of:
   storing in memory a list of preferred push button switch sequences;
   detecting the pressing of one or more push button switches in response to the user desiring to view video or hear audio on one or more of the components of the entertainment system;
   retrieving from the memory at least one of the push button switch sequences from the list of preferred push button switch sequences stored in the memory to define a retrieved at least one push button switch sequence; and
   transmitting command signals corresponding to the retrieved at least one push button switch sequence to the one or more of the components of the entertainment system in response to the detection of the pressing of the one or more push button switches.

5. An operational method of a remote control as defined by claim 4, which further comprises the step of:
   arranging in a preferred order in the list the preferred push button switch sequences stored in the memory relative to one another corresponding to which push button switch sequences are most often used with the components of the entertainment system or components that are generally available to the user or other persons for use in an entertainment system;
   and wherein the step of retrieving from the memory at least one of the push button switch sequences includes the further step of retrieving from the memory at least one of the push button switch sequences in an order in which the at least one push button switch sequence is listed in the preferred order in the list to define the retrieved at least one push button switch sequence.

6. An operational method of a remote control as defined by claim 4, wherein the step of retrieving from memory at least one of the push button switch sequences from the list of preferred push button switch sequences stored in the memory includes the further step of retrieving from the memory at least one of the push button switch sequences in an order of preference corresponding to which push button switch sequences are most often used with the components of the entertainment system or components that are generally available to the user or other persons for use in an entertainment system.

7. An operational method of a remote control for controlling one or more components of an entertainment system of a user, the remote control having a display and a plurality of push button switches, wherein at least one of the components of the entertainment system includes electronic circuitry and signal inputs which may be selectively operatively coupled to the electronic circuitry to provide a video or audio signal to the electronic circuitry for the user to view video or hear audio on his entertainment system, the signal inputs being switchable in an endless loop by the remote control transmitting command signals to the at least one component to selectively operatively couple a selected signal input to the electronic circuitry, and wherein the remote control includes a signal input counter for counting the number of signal inputs on the at least one component of the entertainment system, which comprises the steps of:
   displaying on the display messages to the user to achieve a desired activity of the entertainment system using the one or more of the components thereof, the desired activity involving at least one of viewing video and hearing audio on the one or more of the components of the entertainment system, the user observing at least one of whether the user is able to view video and whether the user is able to hear audio on the one or more of the components of the entertainment system, the user pressing one or more push button switches in response to at least one of whether the user is able to view video and whether the user is able to hear audio;
   detecting the pressing of one or more push button switches of the plurality of push button switches in response to the user observing at least one of whether the user is able to view video and whether the user is able to hear audio on one or more of the components of the entertainment system;
   transmitting command signals to the one or more of the components of the entertainment system in response to the detection of the pressing of the one or more push button switches;
   determining the number of signal inputs on the at least one component by counting the number of times it requires to switch signal inputs on the at least one component from a first time that the user is able to view video or hear audio on the user's entertainment system for a selected input to a second time that the user is able to view the same video or hear the same audio on the user's entertainment system for a selected input;
   wherein the step of determining the number of signal inputs on the at least one component includes the substeps of:
      a) transmitting a command signal to the at least one component to cause the at least one component to switch inputs so that a selected input is operatively coupled to the electronic circuitry of the at least one component;
      b) displaying on the display a message to the user to observe at least one of whether the user is able to view video and whether the user is able to hear audio on the user's entertainment system and to press one or more of the push button switches in response to at least one of whether the user is able to view video and whether the user is able to hear audio on the user's entertainment system;
      c) detecting the pressing of the one or more push button switches in response to the user observing at least one of whether the user is able to view video and whether the user is able to hear audio on the user's entertainment system for a selected input operatively coupled to the electronic circuitry of the at least one component;
      d) determining from the detection of the pressing of the one or more push button switches in substep c) for a selected input operatively coupled to the electronic circuitry of the at least one component that the user can view video or hear audio on the user's entertainment system;
      e) setting the signal input counter to a reference count number if from substep d) it is determined for a first time that the user can view video or hear audio on the user's entertainment system for a selected input operatively coupled to the electronic circuitry of the at least one component; and
      f) repeating substeps a)-d) and incrementing the signal input counter by one to a current count number each time the signal inputs are switched on the at least one component to select a signal input to be operatively coupled to the electronic circuitry of the at least one component until the user is able to view the same video or hear the same audio on the user's entertainment system for a second time, the difference between the current count number and the reference count number being equal to the number of signal inputs on the at least one component of the user's entertainment system;

associating the reference count number from the signal input counter with a selectable signal input on the at least one component which allows the user to view video or hear audio on the user's entertainment system from a video or audio signal provided on the signal input associated with the reference count number;

associating an intermediate count number relative to the reference count number with each selectable signal input on the at least one component which is different from the selectable signal input that is associated with the reference count number and that allows the user to view video or hear audio on the user's entertainment system;

detecting the pressing by the user of one or more push button switches on the remote control in response to the user desiring to view the video or hear the audio on the user's entertainment system associated with the video or audio signal provided on the signal input associated with the reference count number;

determining the intermediate count number associated with a selected signal input currently operatively coupled to the electronic circuit of the at least one component;

calculating a difference count number corresponding to the difference between the reference count number and the intermediate count number associated with the selected signal input currently operatively coupled to the electronic circuitry of the at least one component; and transmitting command signals to the at least one component to switch inputs based on the difference count number so that, in response to the transmitted command signals, the signal input associated with the reference count number will be operatively coupled to the electronic circuitry of the at least one component, thereby allowing the user to view the video or hear the audio on the user's entertainment system corresponding to the video or audio signal provided to the signal input associated with the reference count number.

8. An operational method of a remote control for controlling components of an entertainment system of a user, the entertainment system including a signal source component, an audio component and a video component, the signal source component outputting a video signal and an audio signal, the audio component receiving the video signal and audio signal outputted by the signal source component and outputting a video signal, the video component receiving the video signal outputted by the audio component, each of the audio component and the video component having electronic circuitry and switchable signal inputs selectively connectable to the electronic circuitry, the remote control having a display and a plurality of push button switches, the operational method comprising the steps of:

a) displaying on the display of the remote control a query to the user as to whether the user can view video on the video component of the entertainment system, and instructing the user to press one or more push button switches on the remote control in response to whether or not the user is able to view video on the video component;

b) detecting by the remote control the pressing of one or more push button switches by the user in response to whether or not the user is able to view video on the video component;

c) determining by the remote control from the one or more push button switches which are detected as being pressed whether or not the user is able to view video on the video component;

d) if the remote control determines from step c) that the user is able to view video on the video component, then performing the successive steps starting at step g);

e) if the remote control determines from step c) that the user is not able to view video on the video component, then switching by the remote control the signal input of the video component presently connected to the electronic circuitry of the video component to a different signal input of the video component;

f) repeating steps a) through e) a predetermined number of times;

g) displaying on the display of the remote control a query to the user as to whether the user can hear audio from the audio component of the entertainment system, and instructing the user to press one or more push button switches on the remote control in response to whether or not the user is able to hear audio from the audio component;

h) detecting by the remote control the pressing of one or more push button switches by the user in response to whether or not the user is able to hear audio from the audio component;

i) determining by the remote control from the one or more push button switches which are detected as being pressed whether or not the user is able to hear audio from the audio component;

j) if the remote control determines from step i) that the user is able to hear audio from the audio component, and if the remote control has determined from step c) that the user is able to view video on the video component, then performing the step at step t);

k) if the remote control determines from step i) that the user is able to hear audio from the audio component, and if the remote control has determined from step c) that the user is not able to view video on the video component, then performing the successive steps starting at step n);

l) if the remote control determines from step i) that the user is not able to hear audio from the audio component, then switching by the remote control the signal input of the audio component presently connected to the electronic circuitry of the audio component to a different signal input of the audio component;

m) repeating steps g) through l) until the remote control determines in either step j) that the user is able to hear audio from the audio component and the user is able to view video on the video component or step k) that the user is able to hear audio from the audio component and the user is not able to view video on the video component;

n) displaying on the display of the remote control a query to the user as to whether the user can view video on the video component of the entertainment system, and instructing the user to press one or more push button switches on the remote control in response to whether or not the user is able to view video on the video component;

o) detecting by the remote control the pressing of one or more push button switches by the user in response to whether or not the user is able to view video on the video component;

p) determining by the remote control from the one or more push button switches which are detected as being pressed whether or not the user is able to view video on the video component;

q) if the remote control determines from step p) that the user is able to view video on the video component, then performing the step at step t);

r) if the remote control determines from step p) that the user is not able to view video on the video component, then switching by the remote control the signal input of the video component presently connected to the electronic circuitry of the video component to a different signal input of the video component;

s) repeating steps n) through r) until the remote control determines in step q) that the user is able to view video on the video component; and t) ending the operational method, as the user is able to hear audio from the audio component and the user is able to view video on the video component.

* * * * *